(12) United States Patent
Islam

(10) Patent No.: US 7,522,836 B2
(45) Date of Patent: Apr. 21, 2009

(54) OPTICAL LOGIC GATE BASED OPTICAL ROUTER

(75) Inventor: Mohammed N. Islam, Ann Arbor, MI (US)

(73) Assignee: Cheetah Omni, LLC, Ann Arbor, MI (US)

( * ) Notice: Subject to any disclaimer, the term of this patent is extended or adjusted under 35 U.S.C. 154(b) by 255 days.

(21) Appl. No.: 11/565,158

(22) Filed: Nov. 30, 2006

(65) Prior Publication Data

US 2007/0086780 A1    Apr. 19, 2007

Related U.S. Application Data

(63) Continuation of application No. 11/225,684, filed on Sep. 12, 2005, now Pat. No. 7,145,704.

(51) Int. Cl.
    *H04J 14/02*    (2006.01)
(52) U.S. Cl. .......................... 398/48; 398/50
(58) Field of Classification Search ........... 398/48–51
    See application file for complete search history.

(56) References Cited

U.S. PATENT DOCUMENTS

| 3,986,020 | A | 10/1976 | Kogelnik ............... 250/199 |
| 4,011,009 | A | 3/1977 | Lama et al. ........... 350/162 R |
| 4,269,481 | A | 5/1981 | Yeh et al. .............. 350/356 |
| 4,450,554 | A | 5/1984 | Steensma et al. ......... 370/4 |
| 4,573,070 | A | 2/1986 | Cooper ................... 358/36 |
| 4,589,737 | A | 5/1986 | Sashital ................ 350/356 |
| 4,662,746 | A | 5/1987 | Hornbeck ............... 350/269 |
| 4,728,185 | A | 3/1988 | Thomas ................. 353/122 |
| 4,736,132 | A | 4/1988 | Culp .................... 310/328 |
| 4,775,971 | A | 10/1988 | Bergmann ................. 370/3 |
| 4,786,128 | A | 11/1988 | Birnbach .............. 350/96.14 |
| 4,797,879 | A | 1/1989 | Habbab et al. ............. 370/3 |
| 4,827,334 | A | 5/1989 | Johnson et al. ........... 358/60 |
| 4,836,649 | A | 6/1989 | Ledebuhr et al. ......... 350/331 |
| 4,856,863 | A | 8/1989 | Sampsell et al. ...... 250/227.26 |
| 4,873,681 | A | 10/1989 | Arthurs et al. ............. 370/3 |

(Continued)

FOREIGN PATENT DOCUMENTS

CA    2246559    3/2000

(Continued)

OTHER PUBLICATIONS

J. Hecht, "Active Components," *Understanding Fiber Optics*, Third Edition, Chapter 16, ISBN: 0-13-956145-5, 13 pages (includes book cover and copyright page).

(Continued)

*Primary Examiner*—Leslie Pascal
(74) *Attorney, Agent, or Firm*—Baker Botts L.L.P.

(57) ABSTRACT

A switching element capable of being used in an optical processing device includes an optical signal separator operable to separate a multiple wavelength optical signal into one or more optical signal wavelengths. The switching element further includes a plurality of semiconductor optical amplifiers located on a single semiconductor substrate. The plurality of semiconductor optical amplifiers operable to perform an optical switching operation on at least one of the optical signal wavelengths. The switching element also includes a controller operable to generate a control signal that affects the optical switching operation performed by one or more of the plurality of semiconductor optical amplifiers.

20 Claims, 18 Drawing Sheets

U.S. PATENT DOCUMENTS

| | | | |
|---|---|---|---|
| 4,900,119 A | 2/1990 | Hill et al. | 350/96.15 |
| 4,926,299 A | 5/1990 | Gilson | 362/184 |
| 4,941,747 A | 7/1990 | Dakin | 356/346 |
| 4,953,935 A | 9/1990 | Suchoski, Jr. et al. | 350/96.16 |
| 4,956,619 A | 9/1990 | Hornbeck | 330/4.3 |
| 4,970,714 A | 11/1990 | Chen et al. | 370/17 |
| 4,970,717 A | 11/1990 | Haas | 370/60 |
| 4,977,593 A | 12/1990 | Ballance | 380/2 |
| 5,005,167 A | 4/1991 | Arthurs et al. | 370/4 |
| 5,023,845 A | 6/1991 | Crane et al. | 364/508 |
| 5,032,924 A | 7/1991 | Brown et al. | 358/231 |
| 5,061,049 A | 10/1991 | Hornbeck | 359/224 |
| 5,063,612 A | 11/1991 | McKeown | 455/607 |
| 5,068,749 A | 11/1991 | Patel | 359/93 |
| 5,078,479 A | 1/1992 | Vuilleumier | 359/290 |
| 5,079,544 A | 1/1992 | DeMond et al. | 340/701 |
| 5,083,857 A | 1/1992 | Hornbeck | 359/291 |
| 5,093,743 A | 3/1992 | Eng et al. | 359/578 |
| 5,103,340 A | 4/1992 | Dono et al. | 385/46 |
| 5,105,265 A | 4/1992 | Sato et al. | 358/60 |
| 5,130,835 A | 7/1992 | Stegmeier | 359/124 |
| 5,140,655 A | 8/1992 | Bergmann | 385/46 |
| 5,153,752 A | 10/1992 | Kurematsu et al. | 359/40 |
| 5,173,794 A | 12/1992 | Cheung et al. | 359/127 |
| 5,191,626 A | 3/1993 | Stern | 385/24 |
| 5,206,638 A | 4/1993 | McKeown | 340/825.51 |
| 5,206,920 A | 4/1993 | Cremer et al. | 385/37 |
| 5,212,586 A | 5/1993 | Van Delden | 359/281 |
| 5,212,743 A | 5/1993 | Heismann | 385/11 |
| 5,214,527 A | 5/1993 | Chang et al. | 359/189 |
| 5,239,322 A | 8/1993 | Takanashi et al. | 353/31 |
| 5,257,113 A | 10/1993 | Chen et al. | 358/426 |
| 5,278,652 A | 1/1994 | Urbanus et al. | 358/160 |
| 5,278,689 A | 1/1994 | Gitlin et al. | 359/137 |
| 5,287,096 A | 2/1994 | Thompson et al. | 345/147 |
| 5,291,502 A | 3/1994 | Pezeshki et al. | 372/20 |
| 5,301,052 A | 4/1994 | Audouin et al. | 359/124 |
| 5,311,360 A | 5/1994 | Bloom et al. | 359/572 |
| 5,343,542 A | 8/1994 | Kash et al. | 385/31 |
| 5,345,306 A | 9/1994 | Ichimura et al. | 356/346 |
| 5,355,237 A | 10/1994 | Lang et al. | 359/130 |
| 5,361,254 A | 11/1994 | Storck et al. | 370/57 |
| 5,365,358 A | 11/1994 | Stein | 359/117 |
| 5,374,968 A | 12/1994 | Haven et al. | 353/31 |
| 5,386,253 A | 1/1995 | Fielding | 348/745 |
| 5,392,151 A | 2/1995 | Nelson | 359/223 |
| 5,394,489 A | 2/1995 | Koch | 385/14 |
| 5,396,359 A | 3/1995 | Abramovitz | 359/127 |
| 5,402,184 A | 3/1995 | O'Grady et al. | 348/764 |
| 5,414,548 A | 5/1995 | Tachikawa et al. | 359/130 |
| 5,424,780 A | 6/1995 | Cooper | 348/428 |
| 5,428,470 A | 6/1995 | Labriola, II | 359/119 |
| 5,430,454 A | 7/1995 | Refregier et al. | 342/375 |
| 5,440,416 A | 8/1995 | Cohen et al. | 359/127 |
| 5,444,566 A | 8/1995 | Gale et al. | 359/291 |
| 5,450,229 A | 9/1995 | Wiesenfeld | 359/238 |
| 5,452,024 A | 9/1995 | Sampsell | 348/755 |
| 5,452,115 A | 9/1995 | Tomioka | 359/123 |
| 5,455,699 A | 10/1995 | Glance et al. | 359/125 |
| 5,455,701 A | 10/1995 | Eng et al. | 359/135 |
| 5,457,493 A | 10/1995 | Leddy et al. | 348/164 |
| 5,459,610 A | 10/1995 | Bloom et al. | 359/572 |
| 5,469,284 A | 11/1995 | Haas | 359/139 |
| 5,477,363 A | 12/1995 | Matsuda | 359/128 |
| 5,483,443 A | 1/1996 | Milstein et al. | 364/401 |
| 5,485,297 A | 1/1996 | Sotom | 359/123 |
| 5,490,009 A | 2/1996 | Venkateswar et al. | 359/291 |
| 5,500,761 A | 3/1996 | Goossen et al. | 359/290 |
| 5,500,858 A | 3/1996 | McKeown | 370/60 |
| 5,506,712 A | 4/1996 | Sasayama et al. | 359/123 |
| 5,515,361 A | 5/1996 | Li et al. | 370/15 |
| 5,519,526 A | 5/1996 | Chua et al. | 359/152 |
| 5,521,732 A | 5/1996 | Nishio | 359/120 |
| 5,526,051 A | 6/1996 | Gove et al. | 348/388 |
| 5,526,155 A | 6/1996 | Knox et al. | 359/130 |
| 5,530,482 A | 6/1996 | Gove et al. | 348/441 |
| 5,530,575 A | 6/1996 | Acampora et al. | 359/128 |
| 5,539,559 A | 7/1996 | Cisneros et al. | 359/117 |
| 5,550,373 A | 8/1996 | Cole et al. | 250/338.1 |
| 5,550,666 A | 8/1996 | Zirngibl | 359/125 |
| 5,552,922 A | 9/1996 | Magarill | 359/224 |
| 5,583,636 A | 12/1996 | Bulow | 356/345 |
| 5,583,688 A | 12/1996 | Hornbeck | 359/291 |
| 5,591,679 A | 1/1997 | Jakobsen et al. | 437/228 |
| 5,600,466 A | 2/1997 | Tsushima et al. | 359/124 |
| 5,606,488 A | 2/1997 | Gustafson | 361/782 |
| 5,608,468 A | 3/1997 | Gove et al. | 348/771 |
| 5,617,233 A | 4/1997 | Boncek | 359/123 |
| 5,631,758 A | 5/1997 | Knox et al. | 359/127 |
| 5,636,045 A | 6/1997 | Okayama et al. | 359/140 |
| 5,654,812 A * | 8/1997 | Suzuki | 398/98 |
| 5,654,819 A | 8/1997 | Goossen et al. | 359/291 |
| 5,658,060 A | 8/1997 | Dove | 353/33 |
| 5,658,850 A | 8/1997 | Taniguchi et al. | 503/227 |
| 5,659,418 A | 8/1997 | Yurke | 359/290 |
| 5,661,592 A | 8/1997 | Bornstein et al. | 359/291 |
| 5,680,234 A | 10/1997 | Darcie et al. | 359/110 |
| 5,680,257 A | 10/1997 | Anderson | 359/727 |
| 5,684,631 A | 11/1997 | Greywall | 359/565 |
| 5,689,283 A | 11/1997 | Shirochi | 345/132 |
| 5,696,619 A | 12/1997 | Knipe et al. | 359/224 |
| 5,701,193 A | 12/1997 | Vogel et al. | 359/290 |
| 5,706,061 A | 1/1998 | Marshall et al. | 348/743 |
| 5,710,656 A | 1/1998 | Goossen | 359/291 |
| 5,715,076 A | 2/1998 | Alexander et al. | 359/130 |
| 5,724,165 A | 3/1998 | Wu | 359/117 |
| 5,729,527 A | 3/1998 | Gerstel et al. | 370/228 |
| 5,739,935 A | 4/1998 | Sabella | 359/128 |
| 5,739,945 A | 4/1998 | Tayebati | 359/291 |
| 5,742,274 A | 4/1998 | Henry et al. | 345/132 |
| 5,745,271 A | 4/1998 | Ford et al. | 359/130 |
| 5,745,613 A | 4/1998 | Fukuchi et al. | 385/24 |
| 5,751,469 A | 5/1998 | Arney et al. | 359/291 |
| 5,754,217 A | 5/1998 | Allen | 347/239 |
| 5,757,355 A | 5/1998 | Ogura et al. | 345/127 |
| 5,760,965 A | 6/1998 | Kim | 359/651 |
| 5,764,821 A | 6/1998 | Glance | 385/14 |
| 5,771,116 A | 6/1998 | Miller et al. | 359/295 |
| 5,774,244 A | 6/1998 | Tandon et al. | 359/125 |
| 5,774,252 A | 6/1998 | Lin et al. | 359/224 |
| 5,780,875 A | 7/1998 | Tsuji et al. | 257/81 |
| 5,781,537 A | 7/1998 | Ramaswami et al. | 370/254 |
| 5,784,183 A | 7/1998 | Aoki et al. | 359/124 |
| 5,793,746 A | 8/1998 | Gerstel et al. | 370/228 |
| 5,793,912 A | 8/1998 | Boord et al. | 385/37 |
| 5,796,504 A | 8/1998 | Sonderegger et al. | 359/144 |
| 5,799,118 A | 8/1998 | Ogusu et al. | 385/14 |
| 5,825,528 A | 10/1998 | Goossen | 359/291 |
| 5,825,949 A | 10/1998 | Choy et al. | 385/24 |
| 5,826,959 A | 10/1998 | Atsuchi | 353/20 |
| 5,826,961 A | 10/1998 | Kim et al. | 353/74 |
| 5,834,646 A | 11/1998 | Kvisterøy et al. | 73/514.29 |
| 5,835,255 A | 11/1998 | Miles | 359/291 |
| 5,835,336 A | 11/1998 | Knipe et al. | 361/233 |
| 5,838,470 A | 11/1998 | Radehaus et al. | 359/124 |
| 5,838,484 A | 11/1998 | Goossen | 359/282 |
| 5,838,854 A | 11/1998 | Taneya et al. | 385/50 |
| 5,841,579 A | 11/1998 | Bloom et al. | 359/572 |
| 5,842,762 A | 12/1998 | Clarke | 353/122 |
| 5,847,852 A | 12/1998 | Domon et al. | 359/118 |
| 5,847,859 A | 12/1998 | Murata | 235/462.35 |
| 5,850,492 A | 12/1998 | Morasca et al. | 385/11 |
| 5,864,414 A | 1/1999 | Barnsley et al. | 359/125 |
| 5,867,320 A | 2/1999 | Park et al. | 359/618 |

| Patent | Type | Date | Inventor | Class |
|---|---|---|---|---|
| 5,870,221 | A | 2/1999 | Goossen | 359/290 |
| 5,886,313 | A | 3/1999 | Krause et al. | 219/121.6 |
| 5,889,600 | A | 3/1999 | McGuire | 359/128 |
| 5,897,191 | A | 4/1999 | Clarke | 353/31 |
| 5,905,545 | A | 5/1999 | Poradish et al. | 348/743 |
| 5,905,571 | A | 5/1999 | Butler et al. | 356/328 |
| 5,909,303 | A | 6/1999 | Trezza et al. | 359/248 |
| 5,912,749 | A | 6/1999 | Harstead et al. | 359/123 |
| 5,912,751 | A | 6/1999 | Ford et al. | 359/128 |
| 5,912,758 | A | 6/1999 | Kaipe et al. | 359/290 |
| 5,914,804 | A | 6/1999 | Goossen | 359/291 |
| 5,915,054 | A | 6/1999 | Ota | 385/46 |
| 5,918,968 | A | 7/1999 | Choi | 362/268 |
| 5,920,391 | A | 7/1999 | Grasdepot et al. | 356/352 |
| 5,923,449 | A | 7/1999 | Doerr et al. | 359/125 |
| 5,923,644 | A | 7/1999 | McKeown et al. | 370/230 |
| 5,926,299 | A | 7/1999 | Bayart et al. | 359/121 |
| 5,930,016 | A | 7/1999 | Brorson et al. | 359/127 |
| 5,943,155 | A | 8/1999 | Goossen | 359/247 |
| 5,943,158 | A | 8/1999 | Ford et al. | 359/295 |
| 5,943,454 | A | 8/1999 | Aksyuk et al. | 385/22 |
| 5,943,571 | A | 8/1999 | Goossen | 359/247 |
| 5,946,331 | A | 8/1999 | Amersfoort et al. | 372/23 |
| 5,949,571 | A | 9/1999 | Goossen et al. | 359/291 |
| 5,949,801 | A | 9/1999 | Tayebati | 372/20 |
| 5,960,133 | A | 9/1999 | Tomlinson | 385/18 |
| 5,974,207 | A | 10/1999 | Aksyuk et al. | 385/24 |
| 5,978,518 | A | 11/1999 | Oliyide et al. | 382/260 |
| 5,982,554 | A | 11/1999 | Goldstein et al. | 359/629 |
| 5,986,796 | A | 11/1999 | Miles | 359/260 |
| 5,987,040 | A | 11/1999 | Nesset et al. | 372/8 |
| 5,990,982 | A | 11/1999 | Gove et al. | 348/750 |
| 5,993,007 | A | 11/1999 | Jung | 353/34 |
| 5,999,227 | A | 12/1999 | Doherty et al. | 348/564 |
| 5,999,306 | A | 12/1999 | Atobe et al. | 359/295 |
| 5,999,319 | A | 12/1999 | Castracane | 359/573 |
| 6,002,513 | A | 12/1999 | Goossen et al. | 359/291 |
| 6,008,785 | A | 12/1999 | Hewlett et al. | 345/85 |
| 6,011,631 | A | 1/2000 | Broddin et al. | 358/298 |
| 6,014,237 | A | 1/2000 | Abeles et al. | 359/124 |
| 6,025,944 | A | 2/2000 | Mendez et al. | 359/136 |
| 6,025,950 | A | 2/2000 | Tayebati et al. | 359/244 |
| 6,025,951 | A | 2/2000 | Swart et al. | 359/245 |
| 6,034,812 | A | 3/2000 | Naito | 359/341 |
| 6,041,071 | A | 3/2000 | Tayebati | 372/64 |
| 6,046,840 | A | 4/2000 | Huibers | 359/291 |
| 6,061,166 | A | 5/2000 | Furlani et al. | 359/224 |
| 6,072,923 | A | 6/2000 | Stone | 385/16 |
| 6,075,631 | A | 6/2000 | Bala et al. | 359/124 |
| 6,085,005 | A | 7/2000 | Gates et al. | 385/88 |
| 6,085,233 | A | 7/2000 | Jeffrey et al. | 709/216 |
| 6,091,867 | A | 7/2000 | Young et al. | 349/197 |
| 6,097,533 | A | 8/2000 | Atlas | 359/337 |
| 6,097,589 | A | 8/2000 | Ito et al. | 361/600 |
| 6,104,375 | A | 8/2000 | Lam | 345/150 |
| 6,108,112 | A | 8/2000 | Touma | 359/110 |
| 6,108,311 | A | 8/2000 | Ramaswami et al. | 370/258 |
| 6,113,239 | A | 9/2000 | Sampsell et al. | 353/31 |
| 6,123,985 | A | 9/2000 | Robinson et al. | 427/162 |
| 6,137,941 | A | 10/2000 | Robinson | 385/140 |
| 6,141,039 | A | 10/2000 | Poetsch | 348/96 |
| 6,144,420 | A | 11/2000 | Jung | 349/8 |
| 6,147,786 | A | 11/2000 | Pan | 359/124 |
| 6,151,144 | A | 11/2000 | Knox | 359/125 |
| 6,151,160 | A | 11/2000 | Ma et al. | 359/341 |
| 6,153,927 | A | 11/2000 | Raj et al. | 257/680 |
| 6,160,651 | A | 12/2000 | Chang et al. | 359/124 |
| 6,163,363 | A | 12/2000 | Nelson et al. | 355/32 |
| 6,169,624 | B1 | 1/2001 | Godil et al. | 359/237 |
| 6,172,796 | B1 | 1/2001 | Kowarz et al. | 359/224 |
| 6,175,442 | B1 | 1/2001 | Booth, Jr. et al. | 359/290 |
| 6,184,969 | B1 | 2/2001 | Fergason | 349/196 |
| 6,188,477 | B1 | 2/2001 | Pu et al. | 356/351 |
| 6,188,523 | B1 | 2/2001 | Choi | 359/649 |
| 6,191,877 | B1 | 2/2001 | Chraplyvy et al. | 359/124 |
| 6,192,172 | B1 | 2/2001 | Fatehi et al. | 385/17 |
| 6,192,173 | B1 | 2/2001 | Solheim et al. | 285/24 |
| 6,204,946 | B1 | 3/2001 | Aksyuk et al. | 359/131 |
| 6,208,318 | B1 | 3/2001 | Anderson et al. | 345/1 |
| 6,208,392 | B1 | 3/2001 | Miller et al. | 349/84 |
| 6,212,182 | B1 | 4/2001 | McKeown | 370/390 |
| 6,212,309 | B1 | 4/2001 | Nguyen et al. | 385/17 |
| 6,215,534 | B1 | 4/2001 | Raj et al. | 349/84 |
| 6,219,017 | B1 | 4/2001 | Shimada et al. | 345/88 |
| 6,222,954 | B1 | 4/2001 | Riza | 375/18 |
| 6,231,190 | B1 | 5/2001 | Dewald | 353/31 |
| 6,236,005 | B1 | 5/2001 | Kvisterocy et al. | 200/61.45 |
| 6,239,783 | B1 | 5/2001 | Hill et al. | 345/152 |
| 6,247,814 | B1 | 6/2001 | Lin | 353/20 |
| 6,263,123 | B1 | 7/2001 | Bishop et al. | 385/15 |
| 6,268,952 | B1 | 7/2001 | Godil et al. | 359/247 |
| 6,271,052 | B1 | 8/2001 | Miller et al. | 438/50 |
| 6,275,317 | B1 | 8/2001 | Doerr et al. | 359/180 |
| 6,282,005 | B1 | 8/2001 | Thompson et al. | 359/173 |
| 6,282,010 | B1 | 8/2001 | Sulzbach et al. | 359/249 |
| 6,285,810 | B1 | 9/2001 | Fincato et al. | 385/24 |
| 6,299,312 | B1 | 10/2001 | Choi et al. | 353/31 |
| 6,301,274 | B1 | 10/2001 | Tayebati et al. | 372/20 |
| 6,301,402 | B1 | 10/2001 | Bhalla et al. | 385/16 |
| 6,304,827 | B1 | 10/2001 | Blixhavn et al. | 702/104 |
| 6,307,660 | B1 | 10/2001 | Cordell et al. | 359/189 |
| 6,309,071 | B1 | 10/2001 | Huang et al. | 353/31 |
| 6,313,888 | B1 | 11/2001 | Tabata | 348/790 |
| 6,314,115 | B1 | 11/2001 | Delfyett et al. | 372/6 |
| 6,317,171 | B1 | 11/2001 | Dewald | 348/756 |
| 6,319,729 | B1 | 11/2001 | Kvisterocy et al. | 436/743 |
| 6,323,975 | B1 | 11/2001 | Kurki | 359/127 |
| 6,333,803 | B1 | 12/2001 | Kurotori et al. | 359/188 |
| 6,334,014 | B1 | 12/2001 | Nitta et al. | 385/39 |
| 6,341,039 | B1 | 1/2002 | Flanders et al. | 359/578 |
| 6,346,430 | B1 | 2/2002 | Raj et al. | 438/64 |
| 6,348,991 | B1 | 2/2002 | Smith et al. | 359/321 |
| 6,354,707 | B1 | 3/2002 | Jeon et al. | 353/69 |
| 6,356,544 | B1 | 3/2002 | O'Connor | 370/353 |
| 6,366,387 | B1 | 4/2002 | Wilson | 359/237 |
| 6,373,632 | B1 | 4/2002 | Flanders | 359/578 |
| 6,377,730 | B1 | 4/2002 | Bergmann et al. | 385/39 |
| 6,381,387 | B1 | 4/2002 | Wendland, Jr. | 385/37 |
| 6,384,816 | B1 | 5/2002 | Tabata | 345/204 |
| 6,388,782 | B1 | 5/2002 | Stephens et al. | 359/124 |
| 6,388,798 | B2 | 5/2002 | Smith et al. | 359/290 |
| 6,393,145 | B2 | 5/2002 | Betrisey et al. | 382/162 |
| 6,398,389 | B1 | 5/2002 | Bohler et al. | 362/293 |
| 6,401,851 | B1 | 6/2002 | Keen | 180/89.17 |
| 6,406,019 | B1 | 6/2002 | Joyner et al. | 385/14 |
| 6,407,851 | B1 | 6/2002 | Islam et al. | 359/291 |
| 6,411,410 | B1 | 6/2002 | Wright et al. | 359/125 |
| 6,411,424 | B1 | 6/2002 | Raj | 359/291 |
| 6,411,502 | B1 | 6/2002 | Burrell | 359/291 |
| 6,417,820 | B1 | 7/2002 | Choi | 345/8 |
| 6,417,944 | B1 | 7/2002 | Lahat et al. | 359/124 |
| 6,424,445 | B1 | 7/2002 | Tsushima et al. | 359/177 |
| 6,430,328 | B1 | 8/2002 | Culver et al. | 385/16 |
| 6,439,728 | B1 | 8/2002 | Copeland | 359/515 |
| 6,445,502 | B1 | 9/2002 | Islam et al. | 359/571 |
| 6,445,844 | B1 | 9/2002 | Neukermans et al. | 385/18 |
| 6,450,645 | B1 | 9/2002 | Jeon | 353/20 |
| 6,456,753 | B1 | 9/2002 | Gee et al. | 385/18 |
| 6,457,830 | B1 | 10/2002 | Choi | 353/33 |
| 6,459,516 | B1 | 10/2002 | Mizrahi et al. | 359/127 |
| 6,471,356 | B1 | 10/2002 | Gohman et al. | 353/33 |
| 6,483,962 | B1 | 11/2002 | Novotny | 385/18 |
| 6,493,488 | B1 | 12/2002 | Islam et al. | 385/47 |
| 6,501,600 | B1 | 12/2002 | Godil et al. | 359/569 |
| 6,508,556 | B1 | 1/2003 | Ueda | 353/74 |
| 6,512,612 | B1 | 1/2003 | Fatehi et al. | 359/123 |

| | | | |
|---|---|---|---|
| 6,522,435 B1 | 2/2003 | Chang et al. | 359/124 |
| 6,522,800 B2 | 2/2003 | Lucero | 385/16 |
| 6,525,850 B1 | 2/2003 | Chang et al. | 359/124 |
| 6,525,860 B1 | 2/2003 | Holz et al. | 359/251 |
| 6,529,637 B1 | 3/2003 | Cooper | 382/267 |
| 6,530,666 B1 | 3/2003 | Smith et al. | 353/121 |
| 6,532,088 B1 | 3/2003 | Dantu et al. | 359/119 |
| 6,532,090 B1 | 3/2003 | Doerr et al. | 359/128 |
| 6,538,784 B1 | 3/2003 | Lee et al. | 359/128 |
| 6,538,816 B2 | 3/2003 | Fuchs et al. | 359/578 |
| 6,563,615 B2 | 5/2003 | Milton et al. | 359/110 |
| 6,567,195 B1 | 5/2003 | Ford et al. | 359/118 |
| 6,580,469 B1 | 6/2003 | Rieche et al. | 348/744 |
| 6,580,537 B1 | 6/2003 | Chang et al. | 359/124 |
| 6,587,159 B1 | 7/2003 | Dewald | 348/744 |
| 6,594,268 B1 | 7/2003 | Aukia et al. | 370/400 |
| 6,597,491 B2 | 7/2003 | Islam et al. | 359/291 |
| 6,610,974 B1 | 8/2003 | Hunt et al. | 250/227.22 |
| 6,611,366 B2 | 8/2003 | Islam et al. | 359/291 |
| 6,619,804 B2 | 9/2003 | Davis et al. | 353/98 |
| 6,633,346 B1 | 10/2003 | Yamamoto | 348/744 |
| 6,633,694 B2 | 10/2003 | Tew | 385/18 |
| 6,639,631 B1 | 10/2003 | Hall, Jr. et al. | 348/744 |
| 6,642,969 B2 | 11/2003 | Tew | 348/743 |
| 6,647,209 B1 | 11/2003 | Boord et al. | 398/84 |
| 6,654,157 B2 | 11/2003 | Islam et al. | 359/291 |
| 6,657,603 B1 | 12/2003 | Demetrescu et al. | 345/32 |
| 6,658,177 B1 | 12/2003 | Chertkow | 385/18 |
| 6,661,942 B1 | 12/2003 | Gharavi | 385/16 |
| 6,665,495 B1 | 12/2003 | Miles et al. | 398/54 |
| 6,666,557 B1 | 12/2003 | Choi | 353/31 |
| 6,668,108 B1 | 12/2003 | Helkey et al. | 385/18 |
| 6,674,563 B2 | 1/2004 | Chui et al. | 359/291 |
| 6,678,473 B1 | 1/2004 | Morthier | 398/56 |
| 6,678,474 B1 | 1/2004 | Masuda et al. | 398/75 |
| 6,684,699 B1 | 2/2004 | Lapadatu et al. | 73/514.29 |
| 6,711,024 B1 | 3/2004 | Johansson et al. | 361/760 |
| 6,718,080 B2 | 4/2004 | Ofek et al. | 385/15 |
| 6,721,475 B1 | 4/2004 | Islam et al. | 385/24 |
| 6,725,726 B1 | 4/2004 | Adolfs et al. | 73/756 |
| 6,751,369 B1 | 6/2004 | Lewis | 385/18 |
| 6,763,191 B1 | 7/2004 | Handelman | 398/45 |
| 6,795,605 B1 | 9/2004 | Islam et al. | 385/22 |
| 6,810,211 B1 | 10/2004 | Castanon | 398/47 |
| 6,819,870 B1 | 11/2004 | Ge et al. | 398/51 |
| 6,823,112 B2 | 11/2004 | Deliwala | 385/37 |
| 6,825,835 B2 | 11/2004 | Sano et al. | 345/204 |
| 6,826,330 B1 | 11/2004 | Godil et al. | 385/37 |
| 6,826,368 B1 | 11/2004 | Koren et al. | 398/50 |
| 6,839,322 B1 | 1/2005 | Smith | 370/235 |
| 6,844,974 B1 | 1/2005 | Islam et al. | 359/573 |
| 6,847,479 B1 | 1/2005 | Islam et al. | 359/359 |
| 6,856,459 B1 | 2/2005 | Islam et al. | 359/485 |
| 6,864,876 B2 | 3/2005 | Shin et al. | 345/108 |
| 6,870,836 B1 | 3/2005 | Dyke et al. | 370/355 |
| 6,877,859 B2 | 4/2005 | Silverstein et al. | 353/20 |
| 6,882,771 B1 | 4/2005 | Islam et al. | 385/24 |
| 6,920,287 B1 | 7/2005 | Hinds et al. | 398/9 |
| 6,937,378 B2 | 8/2005 | Yamazaki et al. | 359/244 |
| 6,943,925 B1 | 9/2005 | Islam | 359/108 |
| 6,943,950 B2 | 9/2005 | Lee et al. | 359/571 |
| 6,972,886 B2 | 12/2005 | Islam et al. | 359/225 |
| 6,980,747 B1 | 12/2005 | DeSalvo et al. | 398/202 |
| 7,034,975 B1 | 4/2006 | Islam et al. | 359/223 |
| 7,110,669 B2 | 9/2006 | Ofek et al. | 398/47 |
| 7,110,671 B1 | 9/2006 | Islam | 398/51 |
| 7,116,862 B1 | 10/2006 | Islam et al. | 385/24 |
| 7,133,399 B1 | 11/2006 | Brewer et al. | 370/360 |
| 7,136,588 B1 | 11/2006 | Islam et al. | 398/83 |
| 7,142,347 B2 | 11/2006 | Islam | 359/290 |
| 7,145,704 B1 * | 12/2006 | Islam | 359/108 |
| 7,209,657 B1 | 4/2007 | Islam | 398/45 |
| 7,260,655 B1 | 8/2007 | Islam | 709/252 |
| 7,263,288 B1 | 8/2007 | Islam | 398/49 |
| 7,305,186 B2 | 12/2007 | Islam | 398/51 |
| 2001/0055147 A1 | 12/2001 | Little et al. | 359/293 |
| 2002/0015230 A1 | 2/2002 | Pilossof et al. | 359/558 |
| 2002/0018263 A1 | 2/2002 | Ge et al. | 359/128 |
| 2002/0021485 A1 | 2/2002 | Pilossof | 359/295 |
| 2002/0044722 A1 | 4/2002 | Tew | 385/18 |
| 2002/0064165 A1 | 5/2002 | Boroditsky et al. | 370/401 |
| 2002/0079432 A1 | 6/2002 | Lee et al. | 250/216 |
| 2002/0081070 A1 | 6/2002 | Tew | 385/39 |
| 2002/0083195 A1 | 6/2002 | Beshai et al. | 709/238 |
| 2002/0085543 A1 | 7/2002 | O'Connor | 370/353 |
| 2002/0093721 A1 | 7/2002 | Knipe | 359/291 |
| 2002/0105697 A1 | 8/2002 | Fabiny | 359/128 |
| 2002/0105725 A1 | 8/2002 | Sweatt et al. | 359/566 |
| 2002/0143926 A1 | 10/2002 | Maltz et al. | 709/224 |
| 2002/0159161 A1 | 10/2002 | Ouchi | 359/649 |
| 2002/0191250 A1 | 12/2002 | Graves et al. | 359/128 |
| 2002/0196491 A1 | 12/2002 | Deng et al. | 359/124 |
| 2003/0020809 A1 | 1/2003 | Gibbon et al. | 348/51 |
| 2003/0035193 A1 | 2/2003 | Islam et al. | 359/290 |
| 2003/0081878 A1 | 5/2003 | Joyner et al. | 385/14 |
| 2003/0086465 A1 | 5/2003 | Peters et al. | 372/50 |
| 2003/0095736 A1 | 5/2003 | Kish, Jr. et al. | 385/14 |
| 2003/0095737 A1 | 5/2003 | Welch et al. | 385/14 |
| 2003/0215231 A1 | 11/2003 | Weston-Dawkes et al. | 398/19 |
| 2004/0213229 A1 | 10/2004 | Chang et al. | 370/390 |
| 2005/0025410 A1 | 2/2005 | Zhou et al. | 385/15 |
| 2005/0063196 A1 | 3/2005 | Li | 362/551 |
| 2005/0073737 A1 | 4/2005 | Islam et al. | 359/291 |
| 2005/0088738 A1 | 4/2005 | Islam et al. | 359/484 |
| 2005/0099692 A1 | 5/2005 | Islam et al. | 359/573 |
| 2006/0132899 A1 | 6/2006 | Islam et al. | 359/321 |
| 2008/0075460 A1 | 3/2008 | Islam | 398/45 |

FOREIGN PATENT DOCUMENTS

| | | |
|---|---|---|
| EP | 0 412 220 A1 | 8/1989 |
| EP | 0 439 646 A1 | 1/1990 |
| EP | 0 364 043 A1 | 4/1990 |
| EP | 0 419 840 A2 | 8/1990 |
| EP | 0 492 661 A2 | 7/1992 |
| EP | 0 492 721 A2 | 7/1992 |
| EP | 0 509 630 A2 | 10/1992 |
| EP | 0 667 690 A2 | 1/1995 |
| EP | 0 667 548 A1 | 8/1995 |
| EP | 0 689 078 A1 | 12/1995 |
| EP | 1 001 306 A2 | 5/2000 |
| EP | 1 211 534 A2 | 6/2002 |
| GB | 2 071 896 A | 9/1981 |
| GB | 2 142 203 A | 1/1985 |
| JP | 60-132476 | 7/1985 |
| JP | 63-292880 | 11/1988 |
| JP | 64-47180 | 2/1989 |
| JP | 2-216187 | 8/1990 |
| JP | 2-250081 | 10/1990 |
| JP | 2-278132 | 11/1990 |
| JP | 6-350563 | 12/1994 |
| JP | 8-163048 | 6/1996 |
| JP | 9-326780 | 12/1997 |
| WO | WO 98/05995 | 8/1997 |
| WO | 98/05995 | 2/1998 |
| WO | 99/22496 | 5/1999 |
| WO | 99/56433 | 11/1999 |
| WO | 00/05832 | 2/2000 |
| WO | WO 01/57577 A2 | 2/2001 |
| WO | 01/15368 A2 | 3/2001 |
| WO | 01/18576 A1 | 3/2001 |

| | | |
|---|---|---|
| WO | WO 01/18573 | 3/2001 |

OTHER PUBLICATIONS

Noé et al, "Endless Polarization Control Systems for Coherent Optics," 0733-8724/88/0700-1999, IEEE, Journal of Light Technology, vol. 6, No. 7, 9 pages, Jul. 1988.

Heismann, "Analysis of a Reset-Free Polarization Controller for Fast Automatic Polarization Stabilization in Fiber-optic Transmission Systems," IEEE, Journal of Lightwave Technology, vol. 12, No. 4, 10 pages, Apr. 1994.

Sandei et al., "Automatic polarisation mode dispersion compensation in 40 Gbit/s optical transmission system,"Electronics Letters, vol. 34, No. 23, 2 pages, Nov. 12, 1998.

Pua, et al., "An Adaptive First-Order Polarization-Mode Dispersion Compensation System Aided by Polarization Scrambling: Theory and Demonstration," 0733-8724/00, IEEE, Journal of Lightwave Technology, vol. 18, No. 6, Jun. 2000.

Kudou, et al., "Theoretical Basis of Polarization Mode Dispersion Equalization up to the Second Order," 0733-8724/00, IEEE, Journal of Lightwave Technology, vol. 18, No. 4 pages, Apr. 2000.

Kogelnik, et al., "Jones matrix for second-order polarization mode dispersion," Bell Labs, 0146-9592/00/010019-03, Optical Society of America, Optics Letters, vol. 25, No. 1, Jun. 1, 2000.

Noú et al., "Polarisation mode dispersion compensation at 20 Gbit/s with fibre-based distributed equaliser," Electronics Letters, vol. 34, No. 25, 2 pages, Dec. 10, 1998.

Watley et al., "Compensation of polarisation-mode dispersion exceeding one bit period using single high-birefringence fibre," Electronics Letters, vol. 35, No. 13, 2 pages, Jun. 24, 1999.

Sunnerud, et al., "Analytical Theory for PMD-Compensation," 1041-1135/00, IEEE Photonics Technology Letters, vol. 12, No. 1, 3 pages, Jan. 2000.

LeFevre, "Single-Mode Fibre Fractional Wave Devices and Polarisation Controllers," Electronics Letters, vol. 16, No. 20, 3 pages, Sep. 25, 1980.

Winters, et al., "Experimental Equalization Polarzation dispersion," 1041-1135/90/0800-0591, IEEE Photonics Technology Letters, vol. 2, No. 8, 3 pages, Aug. 1990.

Chbat et al., "Long Term Field Demonstration of Optical PMD Compensation on an Installed OC-192 Link," Alcatel USA, Optical Networks, PD12-1, 3 pages, undated.

Girard, et al., "PDM: The New Telecommunication Frontier Emerges," Lasers & Optronics, Fiberoptics, 6 pages, Feb. 1997.

B. Lavigne, et al., "Low input power All-Optical 3R Regenerator based on SOA devices for 42.66Gbit/s ULH WDM RZ transmissions with 23dB span loss and all-EDFA amplification," PD15-1, 3 pages, Optical Society of America, Copyright 2002.

J.P. Sokoloff, et al., "A Terahertz Optical Asymmetric Demultiplexer (TOAD)," 1041-1135/93S03.00, IEEE Photonics Technology Letters, vol. 5, No. 7, Jul. 1993.

Islam, Optical Logic Gate Based Optical Router, U.S. Appl. No. 11/225,684, 120 pages, currently pending, filed Sep. 12, 2005.

Arthurs et al., "HYPASS: An Optoelectronic Hybrid Packet Switching System," IEEE Journal on Selected Areas in Communications, vol. 6, No. 9, pp. 1500-1510, Dec. 1988.

Chen et al., "A Media-Access Protocol for Packet-Switched Wavelength Division Multiaccess Metropolitan Area Networks," IEEE Journal on Selected Areas in Communications, vol. 8, No. 6, pp. 1048-1057, Aug. 1990.

Hill et al., "39·5 Million-Way WDM Broadcast Network Employing Two Stages of Erbium-Doped Fibre Amplifiers," Electronics Letters, vol. 26, No. 22, pp. 1882-1884, Oct. 25, 1990.

Forrester et al., "39·81 Gbit/s, 43·8 Million-Way WDM Broadcast Network with 527 km Range," Electronics Letters, vol. 27, No. 22, pp. 2051-2053, Oct. 24, 1991.

Appleton et al., "Modelling WDM Video Distributive Networks," The Institution of Electrical Engineers, pp. 1-4, 1993.

Agrawal, "Fiber-Optic Communication Systems," A Wiley-Interscience Publication, The Institute of Optics University of Rochester NY, pp. 284-360, 1997.

Ford et al., "Fiber-Coupled Variable Attenuator Using a MARS Modulator," Invited Paper, SPIE, vol. 3226, pp. 86-93, 1997.

Sadot et al., "Tunable Optical Filters for Dense WDM Networks," IEEE Communications Magazine, pp. 50-55, Dec. 1998.

Carena et al., "OPERA: An Optical Packet Experimental Routing Architecture with Label Swapping Capability," Journal of Lightwave Technology, vol. 16, No. 12, pp. 2212-2219, Dec. 1998.

Misawa et al. "WDM Knockout Switch with Multi-Output-Port Wavelength-Channel Selectors," Journal of Lightwave Technology, vol. 16, No. 12, pp. 2212-2219, Dec. 1998.

Sadot et al., "Optical Switching Speed Requirements for Terabit/Sec Packet Over WDM Networks," ECOC, 1999.

Elhanany et al., "A Novel Tbit/sec Switch Architecture for ATM/WDM High-Speed Networks," IEEE/IEICE ATM Workshop, Japan, pp. 97-101, 1999.

"A New Architecture for Switch and Router Design," PMC-Sierra, Inc., pp. 1-8, Dec. 22, 1999.

Tsukada et al., "WDM/SCM Broadcast-and-select Architecture for Streaming-media," IEEE, pp. 358-359, 2000.

Pesach et al., "Free-space optical cross-connect switch by use of electroholography," Applied Optics, vol. 39, No. 5, pp. 746-758, Feb. 10, 2000.

Sadot et al., "Optical Switching Speed Requirements for Terabit/Second Packet Over WDM Networks," IEEE Photonics Technology Letters, vol. 12, No. 4, pp. 440-442, Apr. 2000.

Goossen, "MEMS-Based Variable Optical Interference Device," IEEE, Invited MB1, pp. 17-18, Aug. 2000.

Shrikhande et al., "Hornet: A Packet-Over-WDM Multiple Access Metropolitan Area Ring Network," IEEE Journal on Selected Areas in Communications, vol. 18, No. 10, pp. 2004-2016, Oct. 2000.

McKeown, "A quick tutorial on IP Router design," Optics and Routing Seminar, pp. 1-42, Oct. 10, 2000.

McKeown, "How might optics be used in IP routers and the Internet?," Optics and Routing Seminar, pp. 1-36, Oct. 24, 2000.

Chao et al., "An Optical Interconnection Network for Terabit IP Routers," Journal of Lightwave Technology, vol. 18, No. 12, pp. 2095-2112, Dec. 2000.

Elhanany et al., "A Prioritized Packet Scheduling Architecture for Provision of Quality-of-Service in Tbit/sec WDM Networks," IEEE, pp. 695-700, 2000.

Plastow et al., "Tunable lasers key to data-network migration," Lightwave, www.light-wave.com, pp. 148-152, Mar. 2001.

Dhar, "Seamless Optical Scaling: Enabling a Dynamic Network," Fiberoptic Product News, Aug. 2001.

Dhar et al., "Tunable lasers create dynamic networking capabilities," WDM Solutions, pp. 82, 84, 86, and 88, Sep. 2001.

Bayne et al., "Broadcast-and-select OADM enables low-cost transparency," Lightwave, www.light.wave.com, pp. 69-74, Dec. 2001.

Molinero-Fernandez, "Where Does Circuit Switching Make Sense In the Internet?," High Performance Networking Group, Stanford University, 19 pages, printed Sep. 5, 2001.

Pending patent application, U.S. Appl. No. 10/004,095, entitled "Optical Routing Using a Star Switching Fabric," by Islam et al., pp. 1-92, filed Dec. 3, 2001.

Pending patent provisional patent application, U.S. Appl. No. 60/336,779, entitled "High Speed MEMS Device," by Islam et al., pp. 1-, filed Dec. 3, 2001.

Pending patent application, U.S. Appl. No. 10/006,001, entitled "Optical Routing Using Star Switching Fabric with Reduced Effective Switching Time," by Islam, pp. 1-94, filed Dec. 3, 2001.

Pending patent application, U.S. Appl. No. 10/004,996, entitled "Broadcast and Select Optical Networking," by Islam et al., pp. 1-63, filed Dec. 3, 2001.

E. Yamada et al., "150 Channel Supercontinuum CW Optical Source with High SNR and Precise 25 GHz Spacing for 10 Gbit/s DWDM Systems," Electronics Letters, vol. 37, No. 5, Mar. 1, 2001.

SLM, "The Scanned Grating Light Valve Display Architecture," www.siliconlight.com, 1999.

D.A. Chapman, et al., "Use of reflected light for low data rate upstream signaling in a single mode passive optical network," IEE Proceedings, 137, Pt. J, No. 2, Apr. 1990.

N.J. Frigo, et al., "A wavelength-division multiplexed passive optical network with cost-shared components," IEEE Photonics Tech. Letters, 6, No. 11, Nov. 1994.

H.D. Kim, et al., "A low-cost WDM source with an ASE injected fabry-perot semiconductor laser," IEEE Photonics Tech. Letters, 12, No. 8, Aug. 2000.

G. Nicholson. "Use of a fiber loop reflector as downstream receiver and upstream modulator in passive optical network," Electronics Letters. 26, No. 12, Jun. 7, 1990.

M. Shibutani, et al., "A Gigabit-to-the-home system for future broadband infrastructure," IEEE, 1997.

G. Maier, et al., "Design and cost performance of the multistage WDM-PON access networks," J. Lightwave Tech., 18, No. 2, Feb. 2000.

B. Mukherjee, "WDM optical communications networks: progress and challenges," IEEE J. Selected areas in Comm., 18, No. 10, Oct. 2000.

J.R. Stern, et. al, "Passive Optical Local Networks for Telephony Applications and Beyond," Electronics Letters, vol. 23, No. 24, pp. 1255-1257, Nov. 19, 1987.

Ueda, et. al. , "Deployment Status and Common Technical Specifications for a B-PON System," IEEE Communications Magazine, pp. 134-140, Dec. 20, 2001.

Faulkner, et al., "Optical Networks for Local Loop Applications," Journal of Lightwave Technology, vol. 7, No. 11, pp. 1741-1751, Nov. 1989.

Wood, et. al, "Demonstration of a Cost-Effective, Broadband Passive Optical Network System," IEEE Photonics Technology Letters, vol. 6, No. 4, pp. 575-578, Apr. 1994.

Amemiya, et al., "Low-cost FTTH system based on PDS architecture," Proc. Global Telecom Conf. GLOBECOM'97, v. 2, pp. 878-882, 1997.

Van de Voorde, et al., "Full service optical access networks: ATM transport on passive optical networks," IEEE Communications Magazine, pp. 70-75, Apr. 1997.

ITU-T. Recommendation G.982. "Optical access networks to support services up to the ISDN primary rate or equivalent bit rates" 28 pages, Nov. 1996.

ITU-T. Recommendation G.983.1. Broadband optical access systems based on Passive Optical Networks (PON), 124 pages, 1998.

ITU-T. Recommendation G.983.2. "ONT management and control interface specification for ATM PON," 370 pages, 2000.

ITU-T. Recommendation G.983.3. "A broadband optical access system with increased service capability by wavelength allocation," 59 pages, 2001.

ITU-T. Recommendation G.983.4. "A broadband optical access system with increased service capability using dynamic bandwidth assignment," 92 pages, 2001.

ITU-T. Recommendation G.983.7, "ONT management and control interface specification for dynamic bandwidth assignment (DBA) B-PON system," 24 pages, 2001.

Chang, I.C., et al., "Bandpass response of collinear beam accousto-optic filters," Ultrasonics Symposium, 1997 Proceedings, 1997 IEEE vol. 1 pp. 745-748, Oct. 5-8, 1997.

Tsai, C.S., et al., Integrated acousto-optic tunable filters in LiNbO3 for blue-green spectra region, Ultrasonics Symposium, 1997 Proceedings, 1997 IEEE vol. 1 pp. 739-743, Oct. 5-8, 1997.

Diez, A., et al., "High strain-induced wavelength tunability in tapered fibre acousto-optic filters," Electronics Letters vol. 36, Issue 14, pp. 1187-1188, Jul. 6, 2000.

Islam, "Optical Logic Gate Based Optical Router," U.S. Appl. No. 11/225,684, filed Sep. 12, 2005.

* cited by examiner

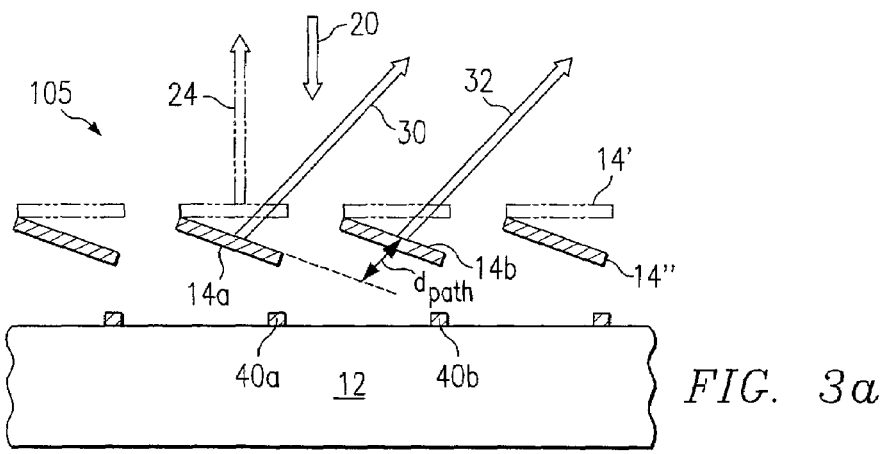
FIG. 3a
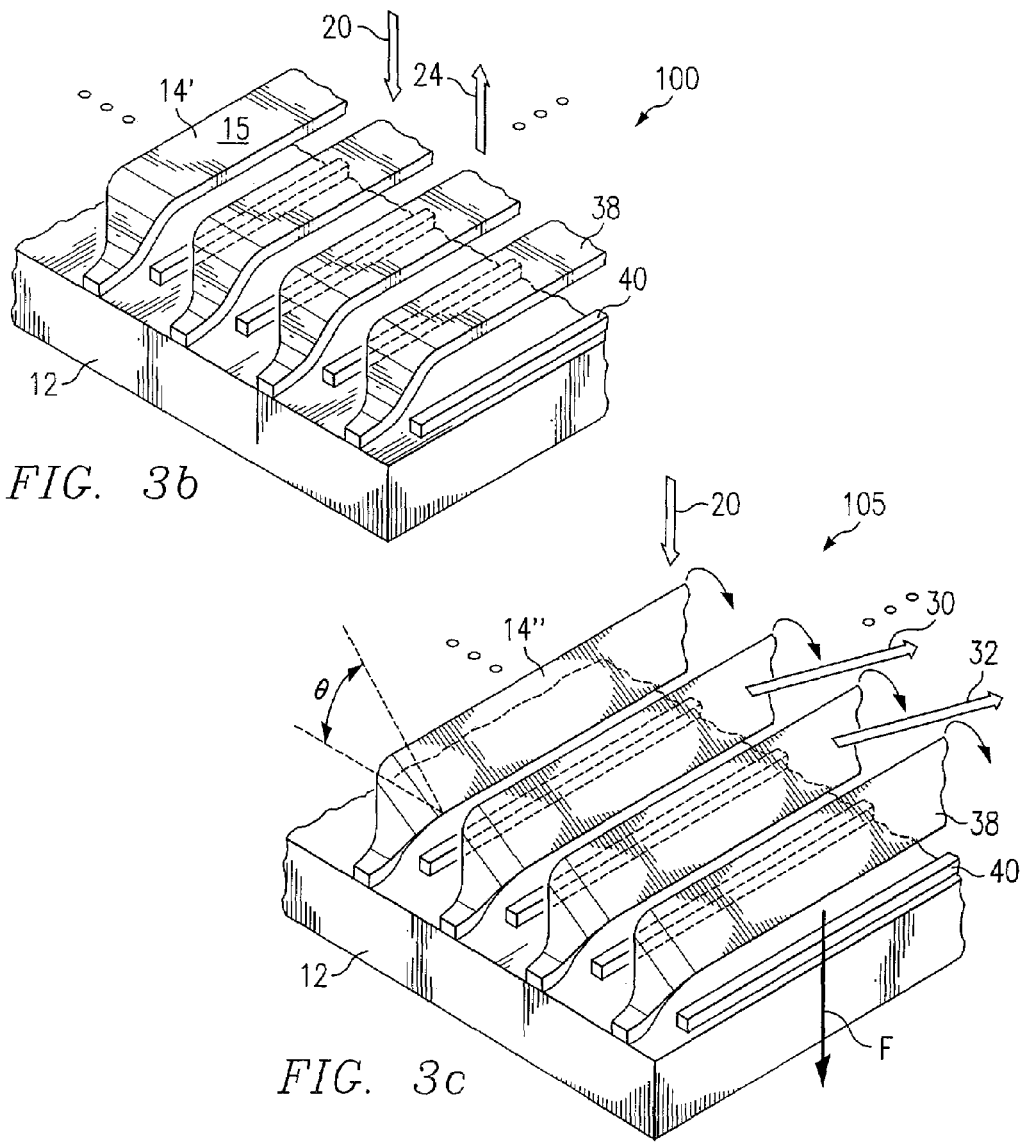
FIG. 3b
FIG. 3c

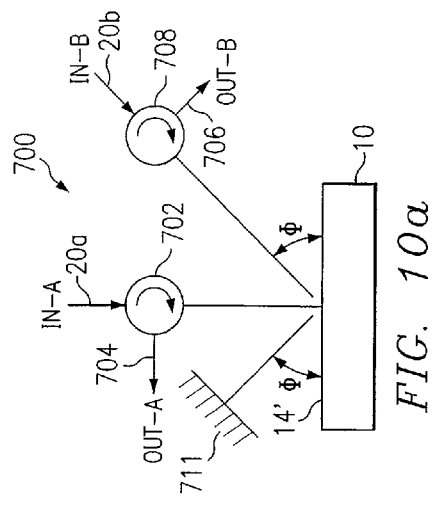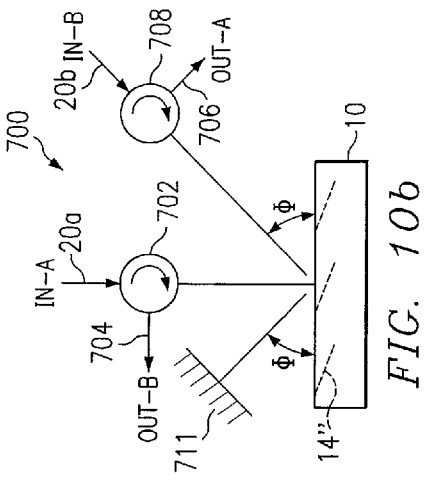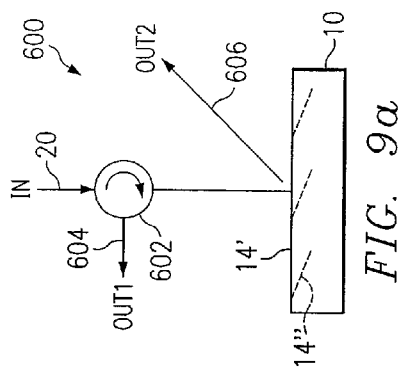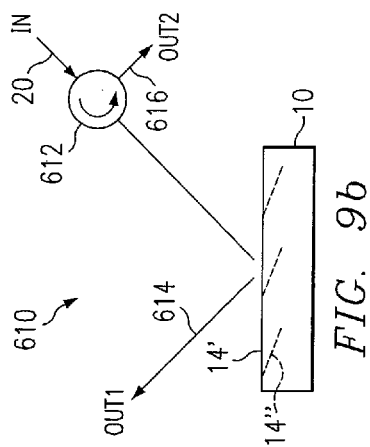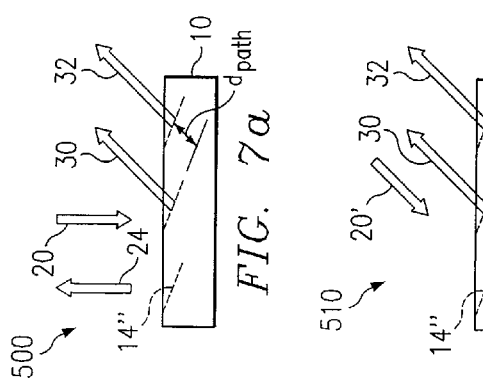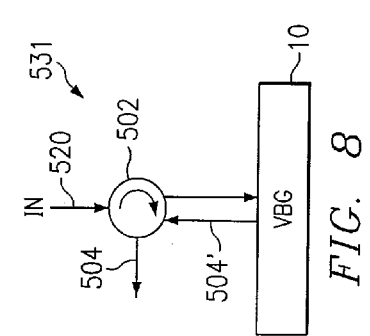

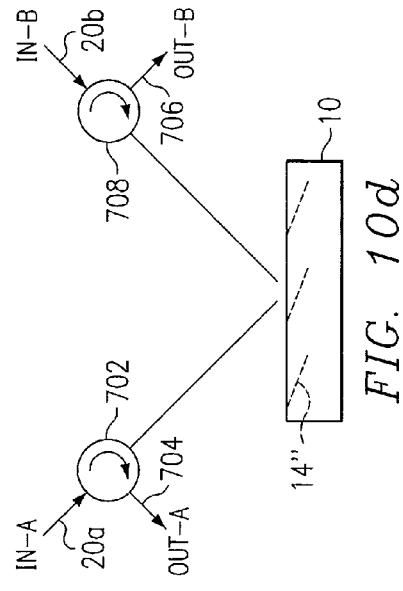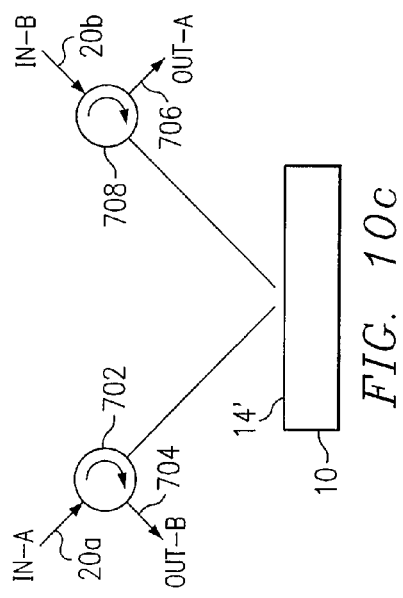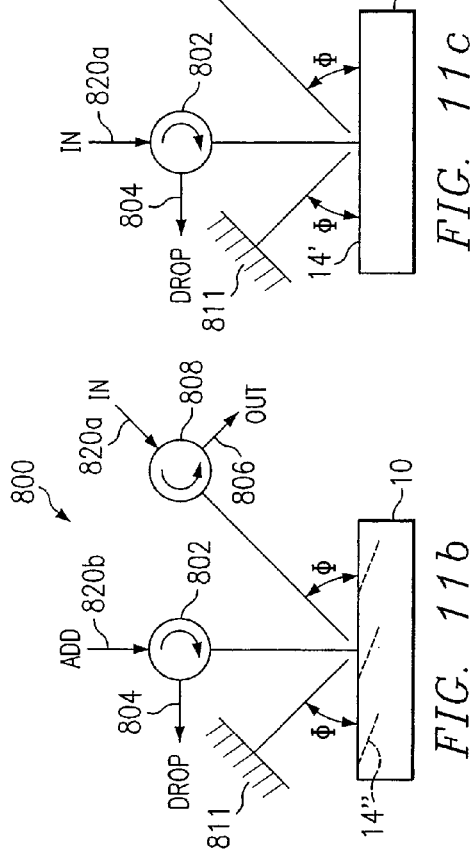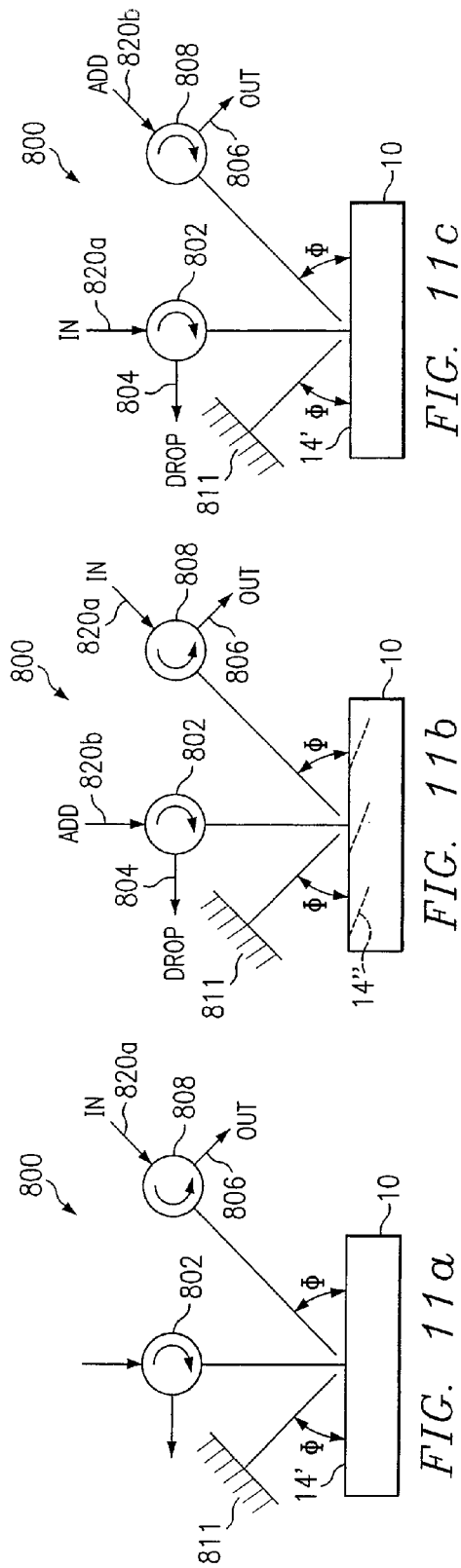

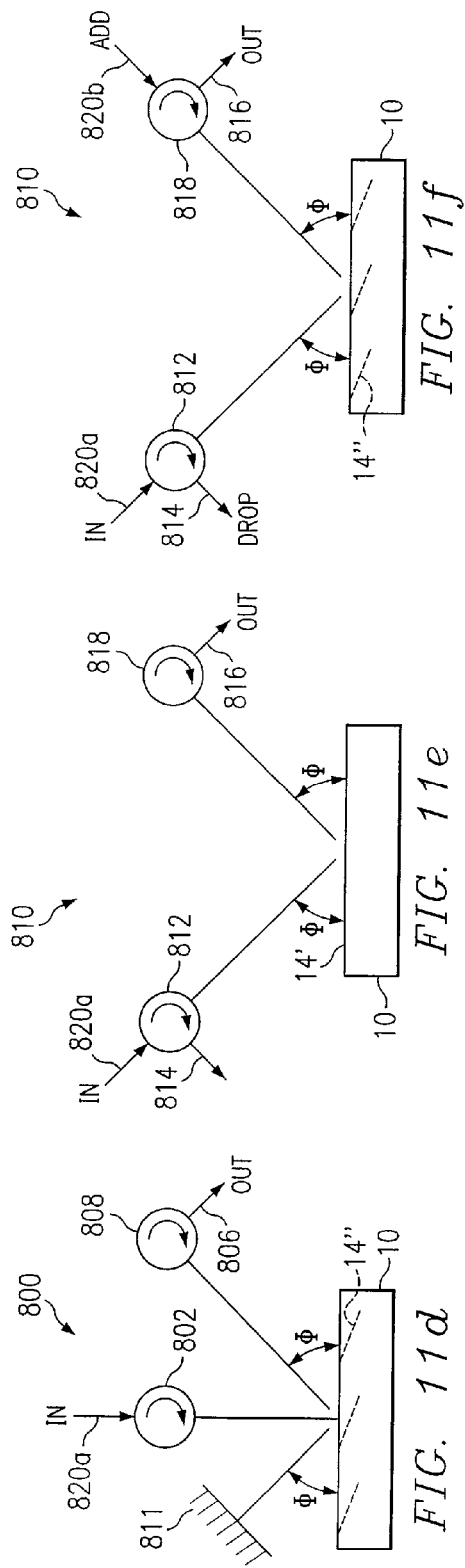
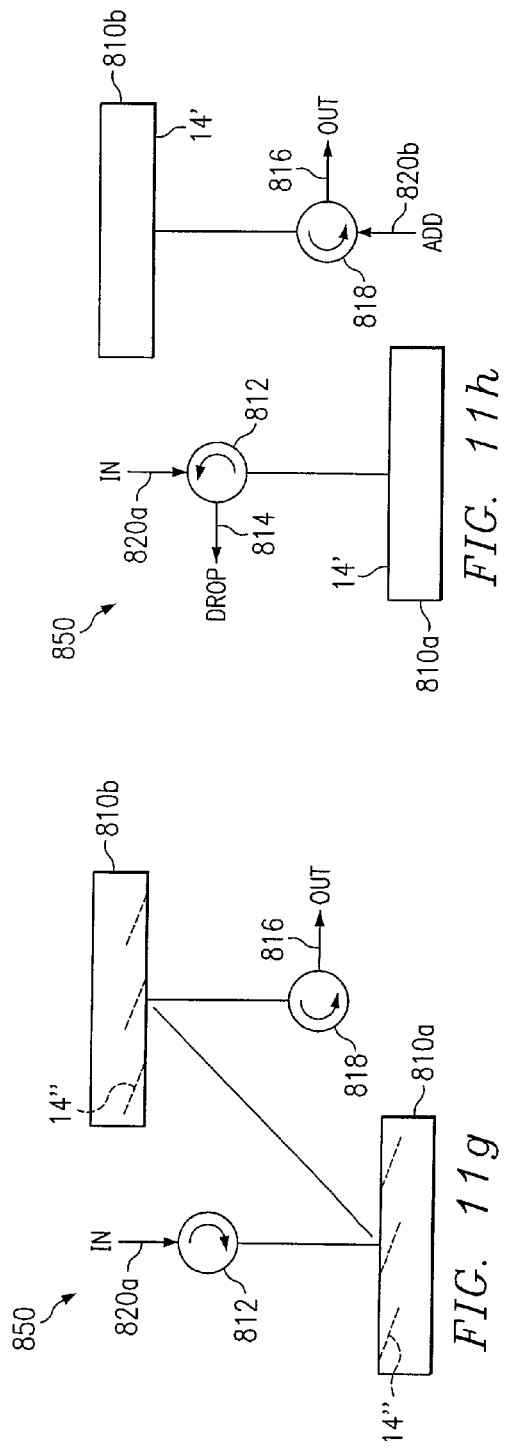

2250
AND:

2275
REGEN:

OPTICAL LOGIC GATE BASED OPTICAL ROUTER

CROSS REFERENCE TO RELATED APPLICATIONS

This application is a continuation of application Ser. No. 11/225,684 by Mohammed N. Islam, filed Sep. 12, 2005 now U.S. Pat. No. 7,145,704, entitled "Optical Logic Gate Based Optical Router," which is a continuation of application Ser. No. 10/723,107 by Mohammed N. Islam, filed Nov. 25, 2003 now U.S. Pat. No. 6,943,925, entitled "Optical Logic Gate Based Optical Router," which is a continuation-in-part of application Ser. No. 09/776,052 by Mohammed N. Islam, filed Feb. 2, 2001 now U.S. Pat. No. 6,721,473, entitled "Variable Blazed Grating Based Signal Processing." application Ser. No. 09/776,052 is related to application Ser. No. 09/776,051, entitled "Variable Blazed Grating," filed on Feb. 2, 2001.

TECHNICAL FIELD OF THE INVENTION

This invention relates in general to the field of electro-optical systems and more particularly to a system and method capable of using an optical router having one or more all-optical logic gates.

OVERVIEW

The ability to transmit information in the optical domain has greatly enhanced the speed and bandwidth of data communications. Optical communication networks that transmit information in the optical domain typically require optical-to-electrical and electrical-to-optical conversions as the optical signals are routed through the network. Converting information between the optical and electrical domains can, in most cases, reduce and/or limit the transmission speed and bandwidth of the optical communication network. In addition, the inability of conventional systems to route the information in the optical domain has restricted the ability of network designers to accomplish data communications solely in the optical domain.

SUMMARY OF EXAMPLE EMBODIMENTS

In one embodiment, a blazed grating based electro-optic switching system comprises a fiber optic tap. The fiber optic tap operable to receive an optical signal having header information and payload information and to form a first signal copy comprising at least the header information and a second signal copy comprising at least the payload information. The system also comprises an electronic processor operable to receive the first signal copy and to perform electronic processing on the header information. The system further comprises an array of blazed grating based optical switch elements operable to receive the first and second signal copies and to perform an optical switching operation on the first and second signal copies.

In another embodiment, a logic gate capable of being used in an optical processing device comprises at least a first optical amplifier and a second optical amplifier located approximately symmetrically in a Mach Zehnder Interferometer (MZI). The first optical amplifier operable to receive a first data signal and the second optical amplifier operable to receive a second data signal. In one particular embodiment, the first data signal and the second data signal are received substantially simultaneously. The logic gate further comprises a light source coupled to the Mach Zehnder Interferometer and operable to generate a clock signal, wherein the clock signal traverses the first optical amplifier in a direction that is counter to a direction that the first data signal traverses the first optical amplifier.

In yet another embodiment, a switching element capable of being used in an optical processing device comprises an optical signal separator operable to separate a multiple wavelength optical signal into one or more optical signal wavelengths. The switching element also comprises a plurality of semiconductor optical amplifiers located on a single semiconductor substrate. The plurality of semiconductor optical amplifiers operable to perform an optical switching operation on at least one of the optical signal wavelengths. The switching element further comprises controller operable to generate a control signal that affects the optical switching operation performed by one or more of the plurality of semiconductor optical amplifiers.

In still another embodiment, an logic gate capable of being used in an optical router comprises a plurality of semiconductor optical amplifiers located in an interferometer. At least some of the plurality of semiconductor optical amplifiers operable to receive at least one data signal. In one particular embodiment, at least one of the plurality of semiconductor optical amplifiers operates at transparency. The logic gate also comprises a light source coupled to the plurality of optical amplifiers and operable to generate a clock signal.

In another embodiments, an optical switching system comprises a fiber optic tap operable to receive an optical signal having at least one packet label and packet data. The tap also operable to separate the optical signal into a first signal copy and a second signal copy comprising at least packet label. The switching system also comprises a first all-optical processing device operable to receive the second signal copy and to perform optical processing on the at least one packet label. The switching system further comprises a second all-optical processing device operable to receive the first signal copy and the processed second signal copy, and to perform an optical switching operation on the first signal copy. In one particular embodiment, at least one of the first and second all-optical processing devices comprises a plurality of semiconductor optical amplifiers located approximately symmetrically in an interferometer.

In yet another embodiment, a regenerative device capable of regenerating one or more optical signals comprises an optical signal separator operable to separate a multiple wavelength optical signal into one or more optical signal wavelengths. The device further comprises a plurality of semiconductor optical amplifiers located on a single semiconductor substrate. The plurality of semiconductor optical amplifiers collectively operable to perform an optical switching operation on at least one of the plurality of optical signal wavelengths. The device also comprises a light source coupled to the plurality of optical amplifiers and operable to generate at least a modulated clock signal.

Depending on the specific features implemented, particular embodiments of the present invention may exhibit some, none, or all of the following technical advantages. For example, various embodiments may be capable of minimizing and/or avoiding contention within the communication network and/or the optical data router. Some embodiments may be amenable to semiconductor chip level integration. Other embodiments may be capable of maintaining one or more packet data associated with an optical signal in the optical domain.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIGS. 3a-c are cross-sectional and planar diagrams showing one example of a blazed grating device;

FIGS. 7a and 7b illustrate blazed grating based variable optical attenuators;

FIG. 8 is a block diagram showing a combination of a variable blazed grating and an optical circulator;

FIGS. 9a-9b are block diagrams illustrating examples of blazed grating based 1×2 optical switches;

FIGS. 10a-10d are block diagrams illustrating various modes of operation of a blazed grating based 2×2 optical switch;

FIGS. 11a-11h are block diagrams illustrating examples of various embodiments of blazed grating based optical add/drop multiplexers;

DETAILED DESCRIPTION OF EXAMPLE EMBODIMENTS

Generally, a variable blazed grating device is an element having a diffraction grating that can be selectively displaced relative to an incoming optical signal, with the result that the majority of the diffracted portions of the optical signal are communicated in one direction. One aspect of one embodiment of the present invention relates to a novel configuration of a variable blazed grating device.

Figure 1A:
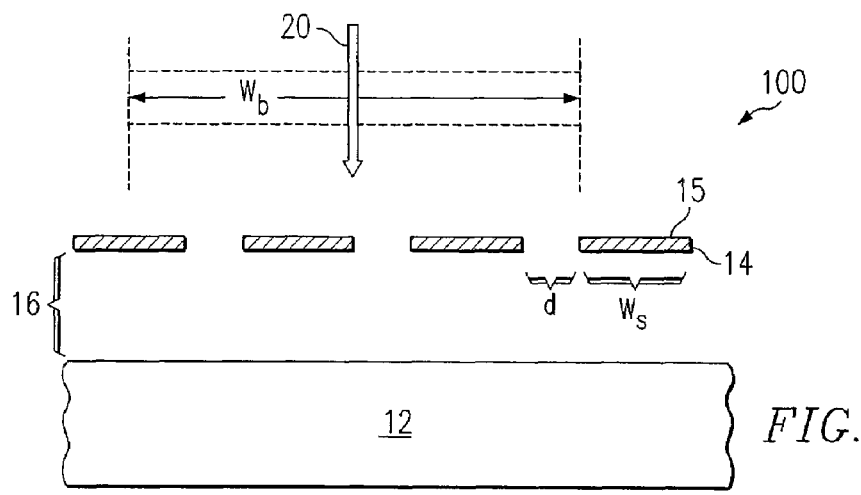
FIGS. 1a-1c are block diagrams illustrating greatly enlarged cross-section views of various exemplary embodiments of blazed grating-based apparatus operable to facilitate high speed optical signal processing.

FIG. 1a shows a cross-section view of one exemplary embodiment of a variable blazed grating-based apparatus 100 operable to facilitate high speed optical signal processing. Throughout this document, the term "signal processing" includes attenuation, switching, phase shifting, or any other manipulation of one or more optical signals.

In this example, apparatus 100 includes a substrate 12 and a plurality of strips 14 disposed outwardly from substrate 12. In a particular embodiment, substrate 12 comprises a semiconductor substrate formed, for example, from silicon. Other materials could be used for substrate 12 without departing from the scope of the invention.

Each strip 14 has a width ($W_s$), and is separated from adjacent strips by a distance (d). The width ($W_s$) and the distance (d) define a periodicity associated with the strips. Multiple strips 14 are operable to receive a single input optical signal 20 having a beam width ($W_b$). Strips 14 are sized and spaced from one another in a manner to ensure that the width ($W_b$) of received optical beam 20 covers at least two strips 14. In this example, strips 14 residing at position 14' are spaced from substrate 12 by a distance 16. Although strips 14 are shown as generally rectangular in shape, any shape can be used consistent with the invention. In addition, although strips 14 are shown as having a constant width ($W_s$), that measurement could vary between strips, or even along the same strip 14.

As one particular non-limiting example of particular dimensions, the width of optical beam 20 may comprise approximately 21,000 nanometers, while each strip 14 comprises a width of approximately 3,000 nanometers (3 microns) and is spaced from adjacent strips 14 by approximately 600 nanometers. In this particular example, strips 14 are spaced from substrate 12 by approximately 2000 nanometers. These dimensions are provided for illustrative purposes only. Other device dimensions and configurations could be used without departing from the scope of the invention.

At least outer surface 15 of each strip 14 comprises an at least partially reflective material. It is not necessary for surface 15 to be completely or even mostly reflective. Of course, the more reflective the material or materials comprising outer surface 15, the less lossy the device will be. Reflective surface 15 may comprise the outer surface of strips 14 where strips 14 are formed from a reflective material. For example, strips 14 may be formed from a metal, such as aluminum, chromium, or gold. As a further example, strips 14 could be formed from polysilicon formed at a thickness sufficient to render the strips at least partially reflective of at least the wavelengths being processed by apparatus 100. Other materials could be used to form strips 14 without departing from the scope of the invention.

In another embodiment, reflective surface 15 may comprise a layer of reflective material disposed outwardly from another layer of strip 14. For example, strips 14 could be formed from a material, such as, silicon nitride, and a layer of partially reflective material 15 could be formed outwardly from strip 14. In that embodiment, the layer of material supporting layer 15 may, but need not be reflective of the incident signals.

Figure 1B:
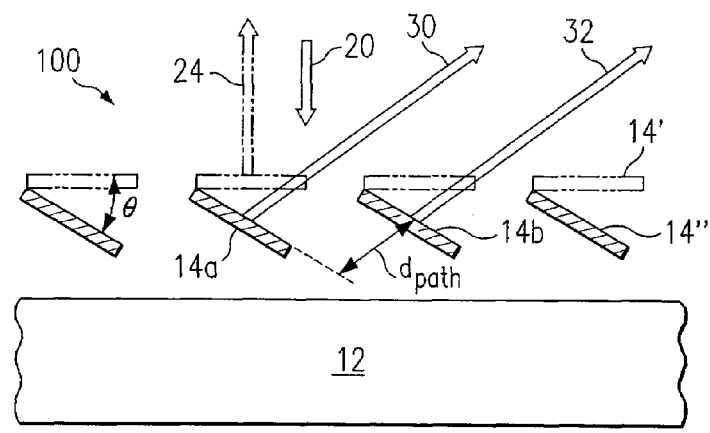

FIG. 1*b* illustrates one example of operation of apparatus 100. In this example, strips 14 receive optical input beam 20 at an angle normal to the surface of strips 14 at position 14.' Strips 14 at position 14' (shown in dotted lines) show apparatus 100 operating in "reflection mode," where strips 14 operate to reflect input optical beam 20 as reflected signal 24. In this case, because input beam 20 is oriented normally to the surfaces of strips 14, reflected beam 24 is communicated back in the same direction from which input beam 20 originated. As will be discussed below, non-normal input angles could also be used.

Strips at positions 14" (shown in solid lines) depict strips 14 during a second mode of operation, "diffraction mode." In diffraction mode, strips 14 are each rotated by approximately a blaze angle THETA from the original position of strips 14. In a particular embodiment, strips 14 can obtain a maximum blaze angle that is greater than two degrees. Implementing a design that facilitates a wide range of strip rotation provides significant advantages over other approaches by, for example, providing flexibility in system configuration. Input optical beam 20 impinges on surfaces 15 of strips 14. In this example, a first portion of input optical beam 20 impinges on strip 14*a*, while a second portion of beam 20 impinges on strip 14*b*, which is adjacent to strip 14*a*. While beam 20 may experience some scattering, because of the rotation of strips 14 to position 14", the majority of the diffracted portions of input beam 20 are directed in one direction, as illustrated (at least in part) by output rays 30 and 32.

Output ray 30 represents the portion of input beam 20 reflected by strip 14*a* at position 14" and output beam 32 represents the portion of input beam 20 that is reflected by strip 14*b* at position 14". Although FIG. 1*b* shows just two output rays 30 and 32, it should be appreciated that any strips 14' that receive a portion of input beam 20 will reflect an output portion in the direction indicated by arrows 30 and 32.

Because output rays 30 and 32 result from diffractions from surfaces laterally offset from one another and positioned at an angle to input beam 20, output rays 30 and 32 experience a relative difference ($d_{path}$) in their path lengths. This path length difference ($d_{path}$) results in a phase difference between the output rays. For a given wavelength and strip periodicity, apparatus 100 can introduce any level of phase difference between output rays by varying the angle THETA by which the strips 14 are rotated. When using a normal incident input beam 20, the diffracted output signal comprising a combination of diffracted rays, such as 30 and 32, is at a maximum when the path difference $d_{path}$ corresponds to one wavelength (or an integral multiple of wavelengths) of beam 20. Other path differences $d_{path}$ result in an attenuation of the output signal compared to the maximum condition.

Figure 1C:
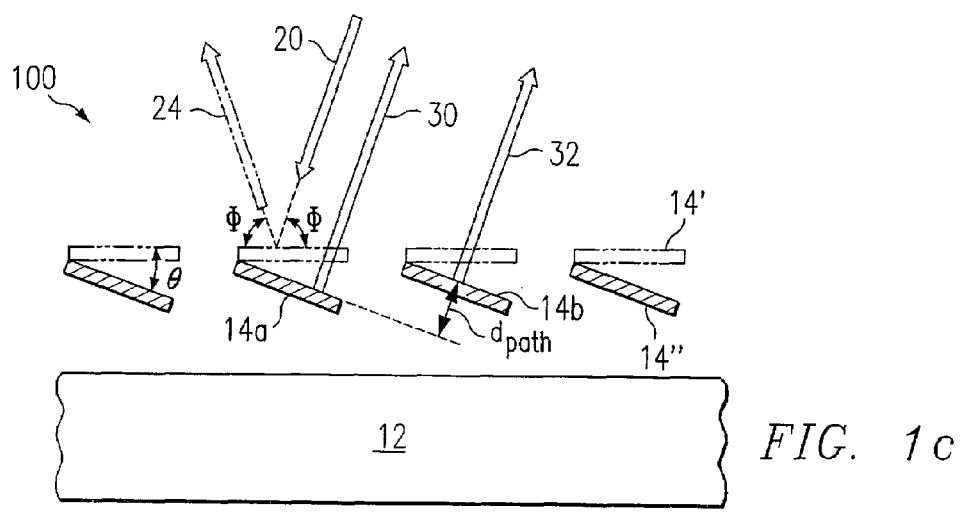

FIG. 1*c* illustrates another example of operation of apparatus 100. In this example, strips 14 receive optical input beam 20 at a non-normal angle PHI. In this particular example, the angle of incidence PHI of input beam 20 is equal to the angle of diffraction of output rays 30 and 32. As a result, the diffracted output rays travel back in the same direction as input beam 20. This condition is commonly referred to as the Littrow case.

In this embodiment, apparatus 100 operates in reflection mode when strips 14 reside at positions 14'. In that mode, input beam 20 impinges on strips 14 at angle PHI and is reflected as shown by output beam portion 24 at an angle of 180 degrees minus PHI. In diffraction mode, strips 14 reside at positions 14" at an angle THETA from position 14'. In this case, grazing angle PHI is selected to result in a diffraction angle that is approximately equal to the incident angle (ninety degrees minus PHI), resulting in input beam 20 being diffracted back in approximately the same direction as the origin of input beam 20, as shown by output rays 30 and 32.

Again, output rays 30 and 32 experience a relative path difference, which results in a relative phase shift between the signal portions. In this case, the beam portions experience a path difference before and after impinging on strips 14. As a result, the parallel distance between strips 14 at positions 14" equals one half of the resulting path difference. Operating blazed grating devices using non-normal incident angles— such as in the Littrow condition—can provide an advantage of facilitating the necessary phase shift between output rays while requiring only a portion of the strip rotation otherwise required. This results in less required drive voltage and more economical operation. Alternatively, the same drive voltage can be used with more rigid strips, facilitating faster device operation.

Previous systems using variable blazed gratings either implemented continuous deformable membranes or implemented multiple-piece membranes requiring very wide slats (typically ranging in width from nearly 60,000 nanometers (60 microns) to over 80,000 nanometers (80 microns)). The systems using slats require wide slats due to the high power of the optical signals being redirected and, as a consequence, are severely limited in their ability to rotate to change the blaze angle (typically limited to a maximum blaze angle of approximately 1.8 degrees).

One aspect of the present invention uses narrow strips, no wider than 40,000 nanometers (40 microns), to ensure greater blaze angle capabilities, lower drive voltage, and faster operation, while maintaining good contrast ratios and high output beam resolution as compared to other approaches.

The maximum switching speed, the minimum required drive voltages, and the maximum attainable blaze angle depend, at least in part, on the width of strips 14 and the ratio of that width to the space 16 separating strips 14 from substrate 12 (or another layer disposed outwardly from substrate 12). These devices operate by introducing a path difference $d_{path}$ between diffracted signal portions to create a desired phase shift between the portions. The path difference is typically some fraction of a wavelength of the signal being processed. In a particular embodiment, the spacing 16 can be selected to facilitate a maximum strip displacement of approximately one wavelength of the signal being processed. This facilitates introduction of any path difference up to a full wavelength of the signal.

For a given wavelength signal, the strip width and maximum strip displacement can be selected to provide any desired blaze angle. Typical telecommunication signals have wavelengths of approximately 1400-1600 nanometers. The following table shows example values of strip widths that can be useful using, for example, a 1400 nanometer maximum strip displacement.

Assuming maximum strip displacement=1400 nanometers,

| Maximum Blaze Angle | Strip Width |
| --- | --- |
| 2 degrees | 40 microns |
| 5 degrees | 16 microns |
| 7.5 degrees | 10.6 microns |
| 10 degrees | 7.9 microns |
| 15 degrees | 5.3 microns |
| 20 degrees | 3.8 microns |
| 25 degrees | 3.0 microns |
| 30 degrees | 2.4 microns |
| 45 degrees | 1.4 microns |

The foregoing table is intended to provide example dimensions only. Other device configurations could be used using other spacings 16, strip widths, and/or maximum blaze angles.

Various aspects of the present invention provide advantages over previous approaches by providing blazed grating having a number of narrow strips. Narrow strips facilitate larger maximum blaze angles for a given distance 16 from substrate 12. This provides increased flexibility in component configuration for applications using these devices. In addition, the narrow width of strips 14 allows the strips to be placed closer to substrate 12 while maintaining flexibility in the attainable blaze angles. Placing the strips closer to substrate 12 provides an advantage of reducing the energy needed to rotate the strips (whether in the form of an electrostatic force between the strips and the substrate or in the form of a forced caused by thermal expansion of a material between the substrate and the strips).

Moreover, reducing the width of strips 14 facilitates faster device operation and lower drive voltages. Using a number of narrow strips 14 further provides an advantage of increasing the resolution of the diffracted output of the device. One aspect of the invention recognizes that the resolution of the output signal comprising the majority of the diffracted portions of input beam 20 increases as the number of strips illuminated by input beam 20 increases. This aspect of the invention, therefore, facilitates enhancing the resolution of the diffracted output by sizing strips 14 so that input beam 20 illuminates a number of strips 14.

As will be discussed in more detail below, the ability of blazed grating apparatus 100 to selectively attenuate and/or switch optical input beams quickly, while requiring a low drive voltage and maintaining a good contrast ratio renders apparatus 100 useful in a myriad of applications, such as variable attenuators, gain equalizers, optical switches, and optical add/drop multiplexers, to name a few.

Figure 2A:
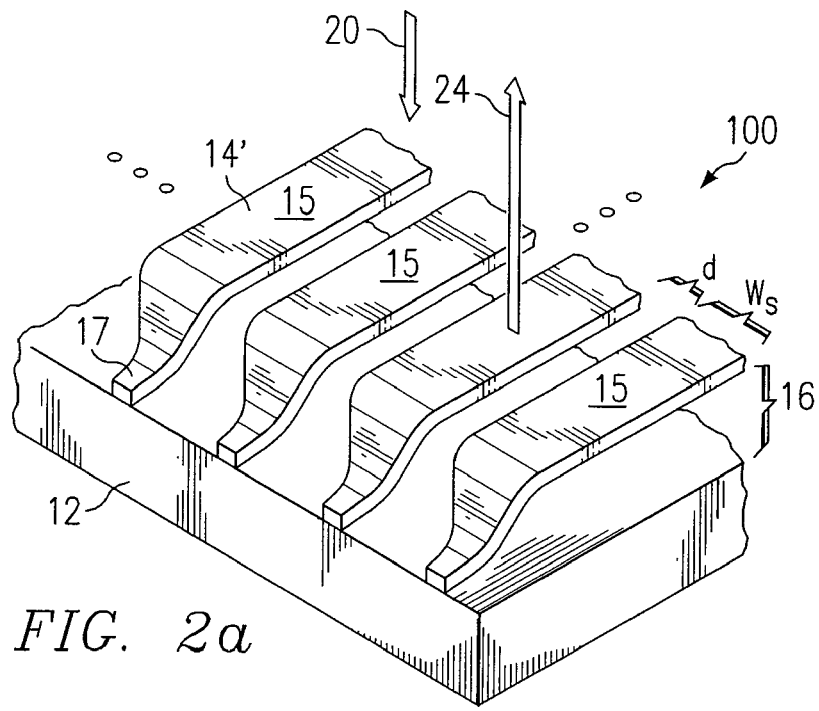
FIGS. 2a and 2b illustrate planar views of one particular embodiment of an apparatus operable to facilitate high speed optical signal processing.
Figure 2B:
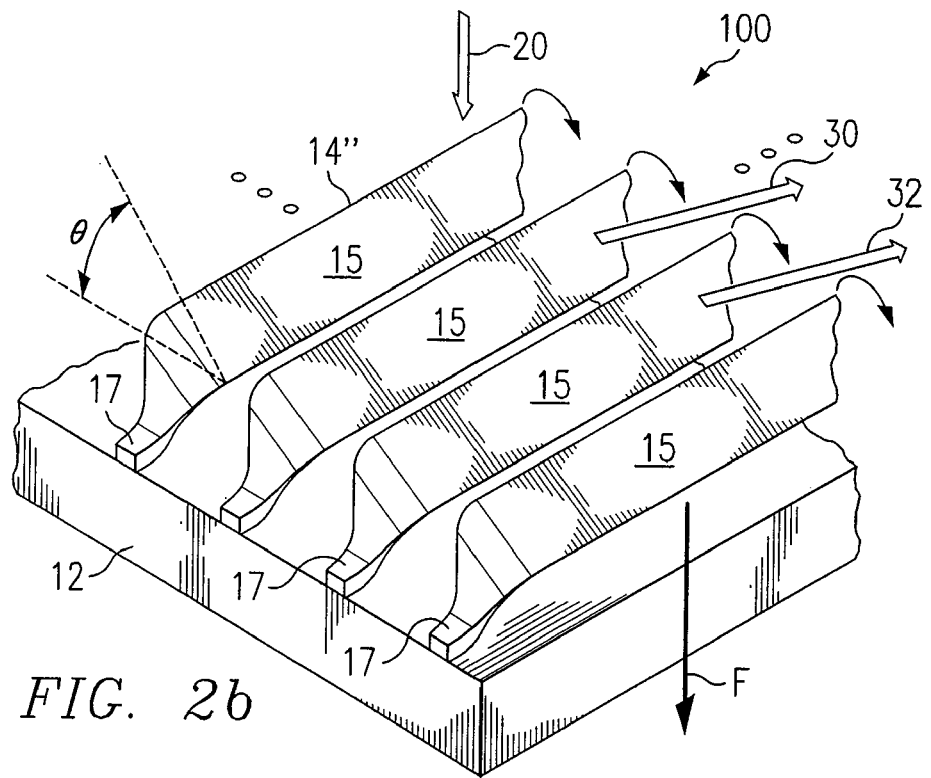

FIGS. 2a and 2b illustrate planar views of one particular embodiment of apparatus 100. As shown in these figures, strips 14 can be anchored to substrate 12 at anchor points 17. In this embodiment, anchor points have a width ($W_s$) that is smaller than the width ($W_s$) of at least a portion of strip 14. In this manner, strips 14 operate to undergo a partial rotation as shown in FIG. 2b when a force (F) is applied to one side of each strip 14. Apparatus 100 controls the grating angle THETA by applying a selected level of force (F) in selected locations of strips 14. Other methods of anchoring strips 14 to facilitate rotation could be used consistent with the invention.

FIGS. 3a-c are cross-sectional and planar diagrams showing one example of a mechanism operable to generate and apply a force (F) to cause a partial rotation of strips 14 in a blazed grating apparatus 105. The illustrated embodiment assumes that force (F) is an electrostatic force generated by a voltage differential between an inner conductive layer and at least a portion of grating 14. Alternatively, force (F) could comprise a force pushing up on strips 14 and created by applying a heat source to the inner conductive layer causing that layer to physically expand and push up on a portion of strip 14, causing strip 14 to rotate. In that embodiment, the inner conductive layer could be considerably thicker than the embodiment shown in FIGS. 3a-3c.

Apparatus 105 is similar in structure and operation to apparatus 100 shown in FIGS. 1-2. In one particular embodiment, strips 14 can be constructed from an at least substantially conductive material. For example, strips 14 may be formed from a metal such as aluminum, gold, or titanium, or may be formed from polysilicon. Where strips 14 are formed from polysilicon, the strips may, if desired, be doped to achieve additional conductivity.

The illustrated embodiment of apparatus 105 includes an inner conductive layer 40, which in this case takes the form of a plurality of elongated conductors, each disposed inwardly from one side of(perhaps along an edge 38 of) strip 14 that is desired to be pulled toward substrate 12. Each conductor of inner conductive layer 40 may be formed, for example, from a metal such as aluminum, chromium, or gold. Other at least substantially conductive materials could be used without departing from the scope of the invention. Although this example assumes creation of an electrostatic force (F), similar results could be obtained by thermally expanding the inner conductive layer to cause a rotation in strip 14.

By applying a voltage difference between conductors 40 and strips 14 desired to be rotated, an electrostatic force (F) is generated that acts to pull edge 38 of strip 14 toward conductor 40. This, in turn, operates to partially rotate strip 14 as shown in FIG. 3c. The voltage difference between strips 14 and conductors 40 may be established, for example, by grounding strips 14 while applying a voltage to conductors 40, grounding conductors 40 while applying a voltage to strips 14, or applying a differential voltage between strips 14 and conductors 40. In the illustrated example, a common voltage (or ground) is applied to all strips 14. Alternatively, selected strips 14 could be rotated while others remain stationary.

Figure 4A:
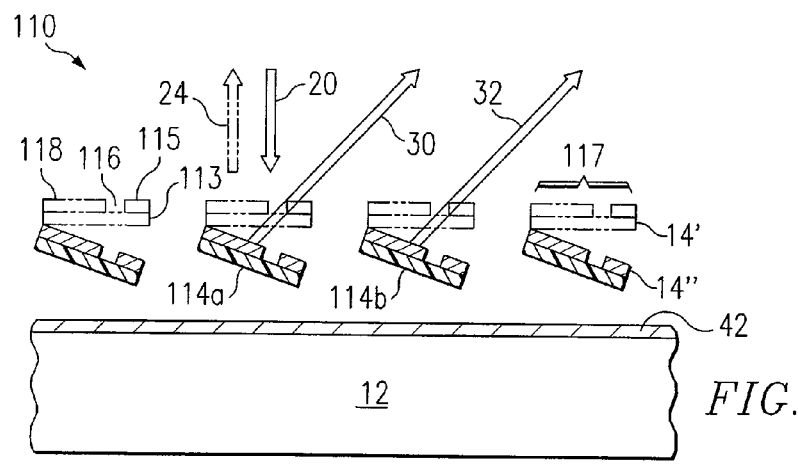
FIGS. 4a-c are cross-sectional and planar diagrams showing another example of a blazed grating device.
Figure 4B:
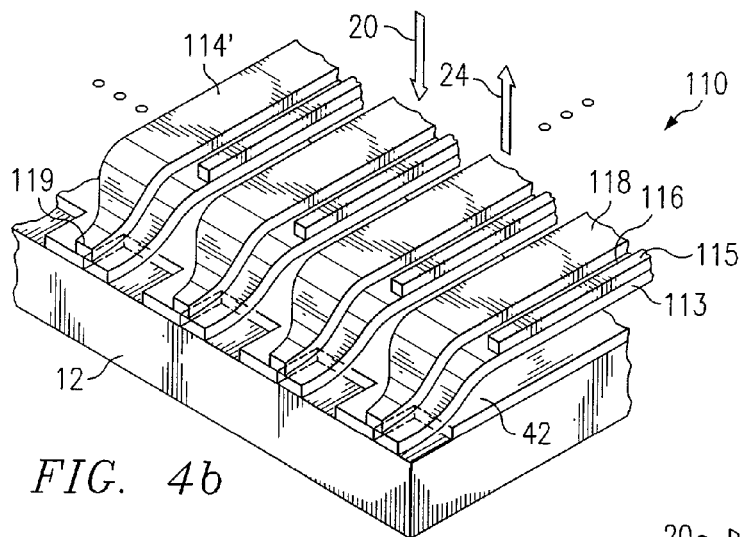
Figure 4C:
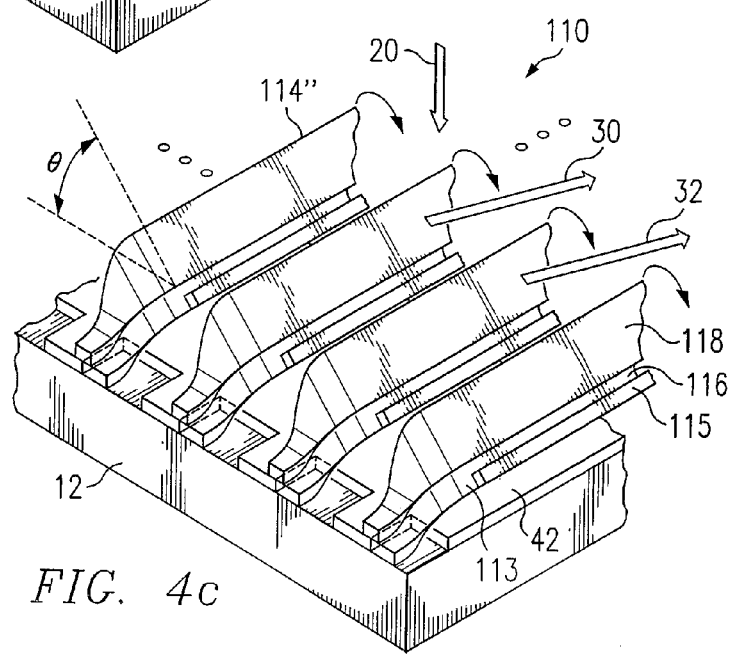

FIGS. 4a-4c are cross-sectional and planar diagrams showing another example of a mechanism operable to generate and apply a force (F) to cause a partial rotation of strips 114 in an apparatus 110. In this example, strips 114 are similar in function to strips 14 of FIGS. 1-3. However, in this case, strips 114 each comprise a multi-layered structure. In this example, each strip 114 includes a layer of insulating material 113. Insulating material 113 may comprise, for example, silicon nitride, oxide, or any other substantially insulating material.

In the illustrated embodiment, a layer 117 of material that is at least partially reflective is formed outwardly from layer 113 of insulating material. For example, layer 117 may comprise a metal or doped polysilicon. Layer 117 includes a first portion 115 and a second portion 118. Portions 115 and 118 are electrically separated, in this example by a channel 116. Channel 116 may comprise an open channel, or may be filled with an insulating material, such as oxide, or silicon nitride.

Portions 115 and 118 may be formed, for example by first forming a continuous layer 117 of material, and then etching channel 116 to form the first and second portions on either side of channel 116. Alternatively, portions 115 and 118 may be formed by first masking channel 116, and then forming first and second portions 115 and 118 14 on either side of channel 116. First and second portions 115 and 118 may, but need not be formed from the same material.

Blazed grating apparatus 110, like apparatus 105, also includes an inner conductive layer. While apparatus 105 includes an inner conductive layer 40 in the form of a plurality of elongated conductors, apparatus 110 comprises an inner conductive layer 140 in the form of a continuous conductor layer disposed outwardly from substrate 12. In an alternative embodiment, inner conductive layer 140 could comprise substrate 12, where substrate 12 comprises a substantially conductive material, such as metal or doped polysilicon. Inner conductive layer 40 may comprise any configuration of at least substantially conductive material operable to cause a partial rotation of some or all of strips 14.

As illustrated, for example, by FIGS. 4b and 4c, first portion 115 of reflective conducting layer 117 is at least substantially electrically isolated from inner conductive layer 140. Second portion 118 of reflective conducting layer 117, however, is electrically coupled to inner conductive layer 140, in this case, by physically contacting that layer at region 119. This construction, and others similar to it, maintain a partially reflective outer surface of strips 114, while facilitating creation of a voltage differential between inner conductive layer 140 and only the edges of strips 114 that carry first portions 115 of conductive reflecting layer 117. This, in turn, facilitates partial rotation of strips 114 upon application of a differential voltage between inner conductive layer 140 and first portions 115 of strips 114.

In operation, blazed grating apparatus 110 receives optical input beam 20, in this example, at a normal angle of incidence. Although this description assumes a normal angle of incidence for optical beam 20, non-normal incident angles could be used without departing from the scope of the invention. In reflection mode (as indicated in FIG. 4a by dashed lines) apparatus 110 substantially reflects input optical beam 20 back in the same direction as output beam 24. In diffraction mode, apparatus 110 diffracts input optical beam 20 primarily in a direction as indicated by output rays 30 and 32. By varying the angle THETA between strip position 114' position 114", apparatus 110 can control the phase difference introduced between rays 30 and 32, and therefore control the intensity of the output signal.

In this example, rotation of strips 114 is accomplished by creating a voltage differential between inner conductive layer 140 and first portion 115 of reflective conducting layer 117. Because second portion 118 of reflective conducting layer 117 is electrically coupled to inner conductive layer 140, little or no electrostatic force is generated between inner conductive layer 140 and second portion 118 of reflective conducting layer 117. Because, however, first portion 115 of reflective conducting layer 117 is electrically isolated from inner conductive layer 140, a voltage difference between those substantially conducting structures creates an electrostatic force, which operates to pull first portion 115 toward inner conductive layer 140. This, in turn, operates to partially rotate strip 114, causing diffraction of the majority of input beam 20 in one direction as indicated by output rays 30 and 32. The example shown in FIG. 4 is intended to illustrate one possible embodiment of apparatus 110. Various changes to the configuration and materials described herein could be made without departing from the scope of the invention.

Figure 5A:
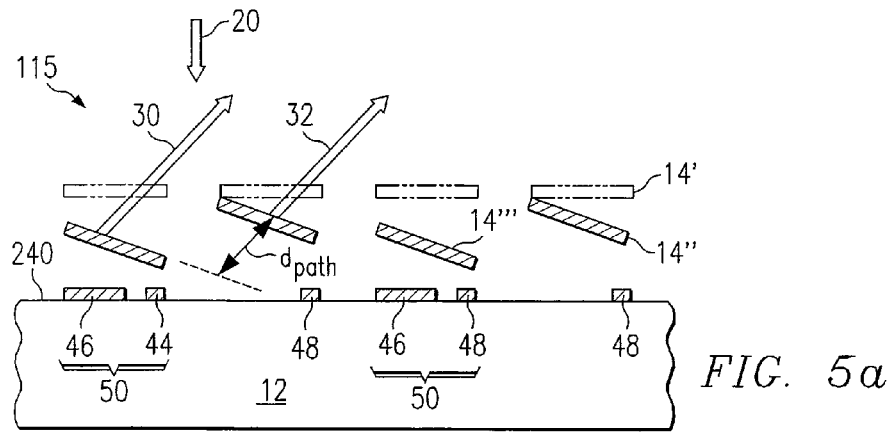
FIGS. 5a-c are cross-sectional and planar diagrams showing still another example of a blazed grating device.
Figure 5B:
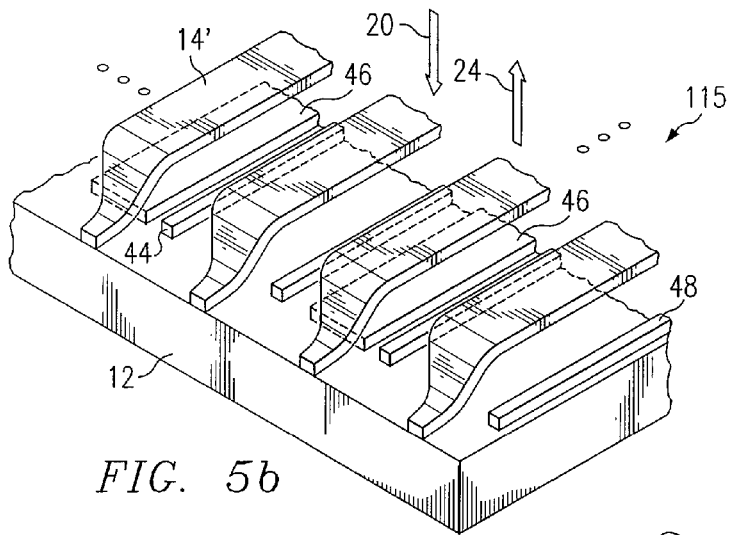
Figure 5C:
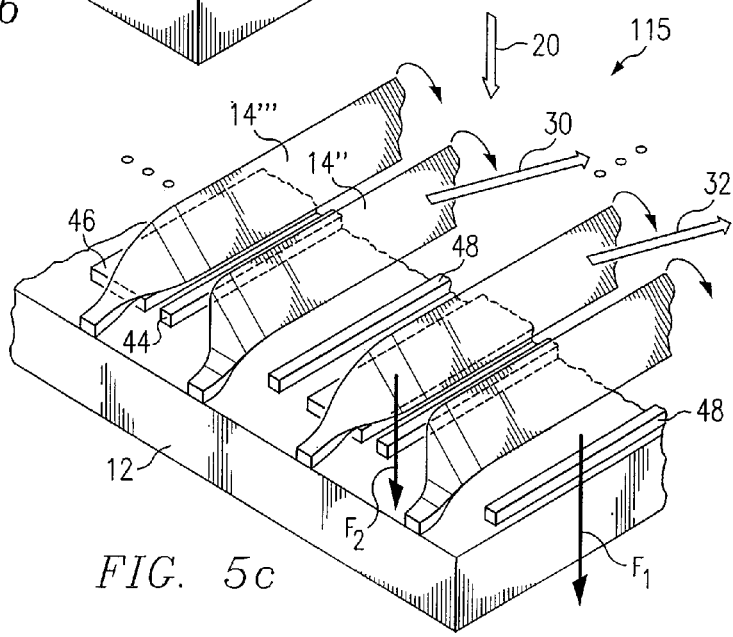

FIGS. 5a-5c are cross-sectional and planar diagrams showing still another example of a mechanism operable to generate and apply a force (F) to cause a partial rotation of strips 14 in a blazed grating apparatus 115. In addition, the embodiment shown in FIGS. 5a-c operates to cause alternate strips 14 to not only partially rotate, but also to move in their entirety toward substrate 12. The result of this alternating strip translation is a diffraction mode of operation wherein all strips 14 are partially rotated, and wherein alternate strips reside in different planes relative to their adjacent strips 14. This configuration can provide additional phase shift between diffracted output rays for a given angle THETA of strip rotation.

In this example, strips 14 are similar in structure and function to strips 14 shown in FIGS. 3a-3c. Strips 14 may comprise any material or combination of materials operable to render an at least substantially conductive and at least partially reflective strip 14. The illustrated embodiment of apparatus 115 includes an inner conductive layer 240. Inner conductive layer 240 in this embodiment, comprises alternating sets of single elongated conductors 48 and pairs 50 of conductor sets 44 and 46, all disposed outwardly from substrate 12. Single elongated conductors 48 and conductors 46 of set of conductors 50 reside approximately inwardly from the edges of strips 14 desired to be rotated toward substrate 12. Conductors 46 also reside inwardly from strips 14, but are electrically separated from conductors 44. The illustrated embodiment provides just one example of a conductor configuration operable to achieve the above-described results. Other configurations could be used without departing from the scope of the invention.

In operation, where it is desired to switch blazed grating apparatus 115 from a reflection mode to a diffraction mode, a voltage differential is created between strips 14 and inner conductive layer 240. In this particular embodiment, a first voltage differential is created between strips 14 and conductors 26, and a second and larger voltage differential is created between strips 14 and conductors 44 and 48. Creating a voltage differential between edges 38 of each strip and the conductors 44 and 48 residing inwardly from those edges causes all strips to rotate. In addition, creating a voltage differential between all or a portion of the remainder of alternated strip cross sections and conductors 46 causes alternate strips to move inwardly relative to adjacent strips. By creating a larger voltage differential between strips 14 and conductors 44,48 (which pull edges 38 toward substrate 12) than the differential between strips 14 and conductors 46 (which pull edges opposite edges 38 of the alternate strips toward substrate 12), this arrangement facilitates rotating all strips 14 while pulling alternate strips 14 closer to inner conductive layer 240 than adjacent strips 14.

In a reflection mode of operation, blazed grating apparatus 115 receives optical input beam 20, and reflects beam 20 at an angle equal to the angle of incidence of beam 20. Where strips 14 receive beam 20 at a normal incident angle, output beam 24 is reflected at an angle normal to strips 14. In a diffraction mode of operation, all strips 14 partially rotate toward substrate 12, and alternate strips 14 move inwardly toward substrate 12. The motion of strips 14 results in a phase shift between portions of the output beam, which may create constructive or destructive interference, depending on the grating angle THETA and amount of relative motion between adjacent strips.

Although this example describes a normal incident input beam, other angles of incidence could be used.

Figure 6A:
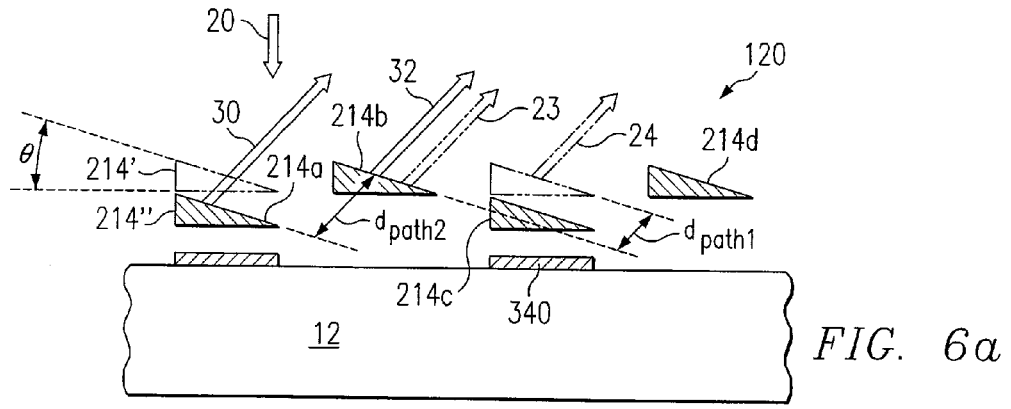
FIGS. 6a-c are cross-sectional and planar diagrams showing yet another example of a blazed grating device.
Figure 6B:
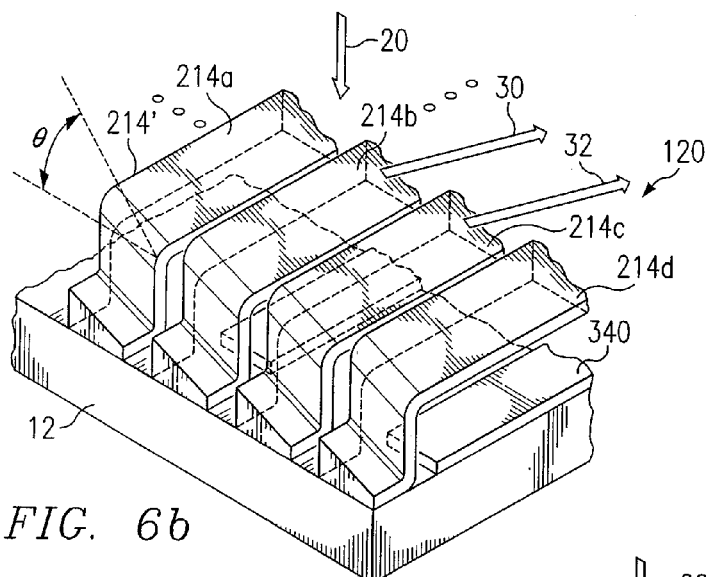
Figure 6C:
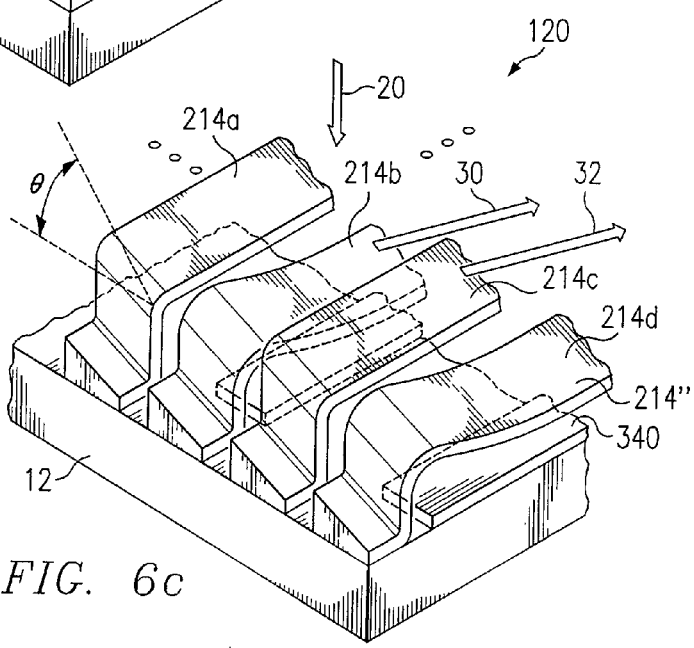

FIGS. 6a-6c are cross-sectional and planar diagrams showing still another embodiment of a blazed grating apparatus 120. Blazed grating apparatus 120, in this embodiment, includes a plurality of adjacent strips 214 disposed outwardly from substrate 12. In this example, each strip 214 has an approximately triangular shaped cross-section. Each strip comprises an outer surface 215 formed at an angle THETA to its inner surface 211. In a particular embodiment, each strip 214 may be formed from one or more at least partially reflective and at least substantially conductive materials.

Strips 214 may be formed, for example, by repeatedly disposing layers of conductive reflective material, one on top of the other, and after each new layer is disposed, etching a portion of the new layer to expose a portion of the underlying layer. By repeating those processing steps, a staircase-like structure can be formed comprising numerous layers of reflective conductive material, wherein the staircase provides an approximate angle THETA measured from the base of the staircase to its top point.

Apparatus 120 includes an inner conductive layer 340 disposed outwardly from substrate 12 and inwardly from strips 214. In this embodiment, inner conductive layer 340 comprises a plurality of at least substantially conductive strips 340 disposed inwardly from alternate strips 214. As a particular example, conductors of inner conductive layer 340 may comprise strips having a width approximately equal to the width of strips 214. Other configurations of inner conductive layer 340 may be used without departing from the scope of the invention.

In operation, blazed grating apparatus 120 receives optical beam 20, in this case at a normal incident angle, and diffracts optical beam 20 so that a majority of the diffracted beam travels in one direction as shown by output rays 30 and 32. When strips 214 reside at location 214', a path difference ($d_{path1}$) is created between output rays. For a given wavelength and a given strip periodicity, the path difference between output beam portions is dependent on the angle THETA that outer surface 215 of strips 214 makes with inner surface 211 of strips 214. In one mode of operation, this angle THETA can be selected, for example, to provide a path difference of one wavelength of optical beam 20 when strips 214 reside at position 214'. In that case, the diffracted output rays constructively interfere to render a maximum intensity output.

In a diffraction mode, alternate strips 214 are pulled toward substrate 12. This may be accomplished, for example, by creating a differential voltage between alternate strips 214 and conducting strips 340 corresponding to those strips 214. Pulling alternate strips 214 toward substrate 12 creates an increased path difference ($d_{path2}$) between output rays 30 and 32. This increased path difference results in a further phase difference between output rays 30 and 32.

The variable blazed grating apparatus depicted in FIGS. 1-6 can be useful in a myriad of applications. For example, FIGS. 7a and 7b illustrate variable optical attenuators using blazed grating technology. In particular, FIG. 7a illustrates a variable attenuator 500 operable to receive optical input beam 20 at a normal incident angle and to introduce any desired amount of attenuation into that signal by controlling the grazing angle THETA between blazed grating 10 at position 14' and position 14".

For a given wavelength of optical beam 20 and for a given periodicity of blazed grating 14, variable attenuator 500 can control the amount of phase shift between output rays 30 and 32 by selectively controlling the angle THETA of blazed grating 10 between position 14' and 14". Blazed grating 10 residing at position 14" operates to diffract the majority of input optical beam 20 in substantially one direction. Path differences between diffracted output rays result in interference, affecting the intensity of the output beam.

For example, where diffracted rays 30 and 32 are used as an output and when using an approximately normal incident input signal, by choosing an angle THETA to result in a path difference ($d_{path}$) of one wavelength, output rays 30 and 32 constructively interfere with one another, maximizing the intensity of the output beam. At the opposite end of the spectrum, by choosing an angle THETA to result in a path difference ($d_{path}$) of one-half wavelength (or an odd multiple thereof), output rays 30 and 32 destructively interfere with each other to completely cancel the output beam. Selectively controlling the position of blazed grating 10 through a control voltage attenuator 500 to provide any level of output signal between zero and maximum intensity.

The foregoing example has assumed that diffracted rays 30 and 32 are used as an output to attenuator 500. Alternatively, reflected rays, such as ray 24 could serve as the output to attenuator 500. In that embodiment, the intensity of rays 24 is a maximum when blazed grating 10 operates to reflect substantially all of input beam 20. As the diffraction efficiency of blazed grating 30 increases, the intensity of reflected output rays 24 generally decreases. Blazed grating 10 can, therefore, selectively attenuate output rays 24 relative to input beam 20 by changing its position in response to a control signal thereby changing the diffraction efficiency of diffracted rays 30 and 32, and the intensity of reflected rays 24.

FIG. 7b illustrates another variable attenuator 510. Variable attenuator 510 is similar in structure to variable attenuator 500 shown in FIG. 7a. Variable attenuator 510, however, operates with an input optical beam 20 having a non-normal incident angle. In particular, in this embodiment variable attenuator 510 operates in the Littrow condition where the angle of incidence of optical beam 20 equals the angle of diffraction of output portions 30 and 32. As previously discussed, this configuration facilitates attaining a given phase difference while requiring only a portion of the blazed grating displacement associated with other configurations.

Variable attenuators implementing blazed grating technology provide a significant advantage of increasing the efficiency and performance of the device, by diffracting a majority of the input beam in a single direction. For example, one embodiment of the invention increases the intensity of the output beam, without requiring additional optical components to collect and recombine diffracted output portions traveling in different directions.

By implementing variable blazed gratings, such as those depicted in FIGS. 1-6, one aspect of the invention facilitates true variability in attenuation by providing a plurality of strips having widths no greater than 40 microns, thus ensuring a wide selection of blaze angles. Unlike other approaches, which are limited to blaze angles of less than two degrees, and therefore limited variation in the amount of attenuation introduced, this aspect of the invention provides an advantage of true variable attenuation. In another aspect of the invention, the apparatus shown in FIGS. 1-6 can operate as a digital switch, for example, by configuring grating 14 to vary its position so that path difference ($d_{path2}$) results in an odd multiple of one-half wavelengths of the input optical beam. In that manner, the apparatus can be operated to switch between a first state where output rays constructively interfere to provide a maximum output and a second state where output rays destructively interfere to reduce or eliminate the output beam.

By appropriate selection of, for example, material type, amounts of materials, grating dimensions, strip tensions, and/or drive voltages, one aspect of the invention facilitates tuning of switching speeds to maximize switching efficiency. This can be extremely useful in tuning switching speeds to correspond to, for example, common information packet sizes.

For example, the following table shows IP packet sizes in bytes and the total number of packets percent bytes during the years 1998 and 1999.

| PACKET SIZE (IN BYTES) | TOTAL PACKETS (%) | TOTAL BYTES (%) |
|---|---|---|
| 40 | 38.9 | 4.4 |
| 1,500 | 11.5 | 48.7 |
| 552 | 10.1 | 15.8 |
| 44 | 6.1 | 0.8 |
| 576 | 4.9 | 7.9 |

This data shows that almost fifty percent of IP packets are between 40 and 44 bytes long. Assuming a data rate of 2.5 Gigabytes per second, switching these packets takes approximately 128 nanoseconds. Thus, for current packet sizes and data rates, a switching speed of approximately 100 nanoseconds is desirable. Existing switching technologies are either too expensive, or too slow for this application. For example, Lithium Niobate, semiconductor optical amplifiers, or electro-absorption modulators can switch in less than one nanosecond, a rate much faster than the optimal 100 nanosecond rate. These devices are prohibitively expensive, particularly when compared to the present invention. In addition, these devices tend to be polarization sensitive. Liquid crystal devices, thermo-optic devices, and micro-electro-optic switches using a single continuous membrane as a moveable mirror are capable of switching speeds of only up to one microsecond, too slow for optimal operation. Likewise, approaches using wide slightly rotatable slats to form a variable diffraction grating for high power spectral analyzers are too slow and inflexible in configuration for these applications.

One aspect of the present invention facilitates tuning an optical switch element to provide a desired switching speed. In a particular embodiment, the switch element can be tuned to provide a switching speed commensurate with a specified packet size or range of packet sizes. For example, the switch element can be tuned to provide switching speeds commensurate with average packet sizes encountered by the switch element. Various embodiments of the present invention facilitate switching speeds of up to 20 nanoseconds, and can be tuned to provide an optimum switching speed of, for example, approximately 100 to 300 nanoseconds.

A separate aspect of the invention, which is not necessarily applicable to only those embodiments shown in FIGS. 1-6 of this disclosure, recognizes that variable blazed gratings, both those described above and some pre-existing designs, can be combined with other optical components in novel ways to provide useful optical signal processing functions. For example, FIG. 8 shows a system 531 using a variable blazed grating 10 coupled to a circulator 502.

In some aspects of operation, variable blazed gratings operate to reflect or diffract signals along the signal path of the same or another input signal. To avoid interference between the input signal and the output of the blazed grating, it is desirable to redirect the output signal from the path of the input signal. FIG. 8 shows an example of a variable blazed grating 10 receiving an optical input signal 520 at a normal incident angle to the grating. In this example, input signal 520 is reflected back along the path of input signal 520 as an output signal 504'. A circulator 502 receives the reflected signal 504' and redirects that signal as output signal 504 away from the path of input 520.

Although this example shows input signal 520 received at a normal incident angle, this aspect of the invention is equally applicable to non-normal incident angles. In addition, although this example shows output signal 504' reflected back along the signal path of its own input signal, the invention can also apply to signals that are reflected or diffracted into the input path of another optical signal. This aspect of the invention finds application anywhere an output signal is directed from a variable blazed grating into the path of an incoming signal.

System 531 advantageously couples a circulator with the variable blazed grating to redirect the output signal 504' without incurring a three decibel loss between redirected output signal 504 and reflected output signal 054', as has been the case in previous approaches using beam splitters to redirect signals. In addition, circulator 502 operates to isolate reflected output signal 504' from adversely affecting input signal 502. The unique combinations of variable blazed gratings and circulators facilitates system configurations in optical switches, optical add/drop multiplexers, and wavelength division add/drop multiplexers to name a few examples.

FIGS. 9a-9b are block diagrams illustrating particular examples of 1×2 optical switches using variable blazed grating devices 10 coupled to optical circulators. Optical switch 600 utilizes an optical input beam 20 having a normal angle of incidence. In addition to blazed grating device 10, optical switch 600 includes a circulator 602 coupled between input beam 20 and strips 14 of blazed grating 10.

Optical switch 600 can switch input beam 20 to a first output 604 or a second output 606, depending on the position of blazed grating 10. In a reflection mode of operation, where blazed grating 10 resides at position 14', input optical beam 20 is reflected off of blazed grating 10, and back to circulator 602 where the signal is routed to first output 604. Optical switch 600 can switch input optical beam 20 to second output 606 by displacing blazed grating 10 to position 14". In this position, a majority of input optical beam 20 will be diffracted in a single direction, in this case the direction indicated as output 606. For a given wavelength of optical input beam 20 and a given periodicity of blazed grating 10, an angle THETA can be selected to result in a full wavelength phase difference between diffracted portions of input beam 20 to result in a maximum input intensity.

FIG. 9b illustrates an example of another 1×2 optical switch 610. In this case, optical switch 610 operates with a non-normal incident optical signal 20. In particular, optical switch 10 operates in the Littrow condition where the angle of incidence of optical beam 20 equals the angle of diffraction of the output rays.

In a reflection mode of operation, optical switch 610 can communicate optical input beam 20 toward first output 614 by having that beam reflected off of blazed grating 10 positioned at location 14'. Optical switch 610 can also switch input optical beam 20 to second output 616 by operating in a diffraction mode where blazed grating 10 is displaced to position 14", and input beam 20 is diffracted back toward a circulator 612. Circulator 612 directs the output beam toward second output 616. By using non-normal angles of incidence, the angle THETA necessary to achieve the desired phase shift can be reduced as compared to other configurations.

FIGS. 10a-10d are block diagrams illustrating various embodiments of 2×2 optical switches constructed from variable blazed gratings and optical circulators. FIGS. 10a and 10b show an embodiment using one normal incident and one non-normal incident input signal. FIGS. 10c and 10d show an embodiment using two non-normal incident input signals.

In the embodiment shown in FIGS. 10a-10b, 2×2 optical switch 700 receives one optical input beam 20a at a normal incident angle, and receives another optical input beam 20b at a non-normal incident angle. FIG. 10a illustrates operation of 2×2 optical switch 700 in a reflection mode. In reflection mode of operation, optical switch 700 receives input optical beams 20*a* and 20*b*, and reflects each signal at an angle equal to its angle of incidence. In particular, blazed grating 10 residing at position 14' receives input optical beam 20*a* at a normal incident angle and reflects that beam back to a circulator 702, which directs the beam to first output 704. In a similar manner, blazed grating 10 residing at position 14' receives input optical beam 20*b* at angle PHI and reflects that signal toward a partially reflective surface 711, which is positioned to reflect a signal back toward blazed grating 10 at the same angle PHI and ultimately back to a circulator 708, which directs the beam to second output 706.

FIG. 10*b* illustrates the same optical switch 700 operating in a diffraction mode. In diffraction mode, blazed grating 10 is displaced to position 14" at an angle THETA from position 14'. Blazed grating 10 receives optical input beam 20*a* and diffracts a majority of that beam toward circulator 708, which directs that portion of the beam to output 706. In a similar manner, blazed grating 10 positioned at location 14" receives input optical beam 20*b* and diffracts a majority of that beam toward circulator 702, which directs the beam toward output 704.

In the embodiment shown in FIGS. 10*c*-10*d*, 2×2 optical switch 700 receives both optical input beams 20*a* and 20*b* at a non-normal incident angle and operate in a Littrow condition. FIG. 10*c* illustrates operation of 2×2 optical switch 700 in a reflection mode. In reflection mode of operation, optical switch 700 receives input optical beams 20*a* and 20*b*, and reflects each signal at an angle equal to its angle of incidence. In particular, blazed grating 10 residing at position 14' receives input optical beams 20*a* and 20*b* at angle PHI and reflects those signals toward circulator 702 and 708. Circulators 702 and 708 redirect the reflected signals from the path of input signals 20*a* and 20*b* to avoid interference between the signals.

FIG. 10*d* illustrates the same optical switch 700 operating in a diffraction mode in the Littrow condition. In diffraction mode, blazed grating 10 is displaced to position 14" at an angle THETA from position 14'. Blazed grating 10 receives optical input beam 20*b* and diffracts a majority of that beam back toward circulator 708, which directs that portion of the beam to output 706. Blazed grating 10 positioned at location 14" also receives input optical beam 20*a* and diffracts a majority of that beam toward circulator 702, which directs the beam toward output 704.

These examples show two particular configurations for using a blazed grating as a 2×2 optical switch. It should be noted that any number of 2×2 optical switches can be combined to form an array of n×n switches. Moreover, although particular configuration has been described with respect to FIGS. 10*a*-10*d*, numerous modifications could be made without departing from the scope of the invention. For example, switches implementing different geometric configurations, or different numbers of blazed grating elements, circulators, reflective surfaces, or other optical elements are contemplated as being within the scope of the invention.

FIGS. 11*a*-11*h* show illustrative examples of various embodiments of optical add/drop multiplexers using blazed grating technology coupled with optical circulators. FIGS. 11*a*-11*b* show examples of a reflection mode of operation and a diffraction mode of operation, respectively, of one embodiment of an optical add/drop multiplexer 800 using a blazed grating 10. In this embodiment, reflection mode of add/drop multiplexer 800 corresponds to a pass-through mode of operation. In this example, blazed grating element 10 receives input optical beam 820*a* at a non-normal incident angle PHI, and is operable to receive added optical beam 820*b* at a normal incident angle. While blazed grating 10 resides at position 14', input optical beam 820*a* is reflected from to a mirror 811, which reflects the signal back to blazed grating 10 and on to a circulator 806. Circulator 806 directs input optical beam 820*a* to output port 806 for pass through operation.

This embodiment of add/drop multiplexer 800 facilitates add/drop operation by operating in a diffraction mode. In this example, for operation in add/drop mode, blazed grating 10 is displaced to position 14" at an angle THETA to its original position 14". Input optical beam 820*a* impinges on blazed grating 10 at position 14". The majority of input optical beam 20*a* is diffracted in a single direction, in this case, toward circulator 802, which directs those diffracted portions of input beam 820*a* toward drop port 806. Blazed grating 10 residing at position 14" receives added optical signal 820*b* and diffracts the majority of that signal toward circulator 808, which receives the majority portions of the diffracted added signal 820*b*, and directs those signal portions to output port 806.

Add/drop multiplexer 800 provides an advantage of facilitating pass-through operation when no voltage is applied to blazed grating elements 10. In this manner, multiplexer 800 facilitates some level of fault tolerance, in the event of a failure of one or more blazed grating elements 10.

FIGS. 11*c*-11*d* show additional examples of a reflection mode of operation and a diffraction mode of operation, respectively, of another embodiment of an optical add/drop multiplexer 805 using a blazed grating 10. Add/drop multiplexer 805 is similar in structure and function to add/drop multiplexer 800, but uses different ports for receiving input and added signals 820*a*, 820*b*.

In this embodiment, reflection mode of add/drop multiplexer 805 corresponds to an add/drop mode of operation. In this example, blazed grating element 10 receives input optical beam 820 at a normal incident angle, and receives added optical beam 820*b* at a non-normal incident angle PHI. With blazed grating 10 residing at position 14', input optical beam 820*a* is reflected back to a circulator 802, which directs input optical beam 820*a* to be dropped at port 804 blazed grating 10 receives added optical beam 820*b* at incident angle PHI, and reflects that beam toward a mirror 811. Mirror 811 reflects the beam back to blazed grating 10 at the same angle PHI, causing added signal 820*b* to be directed toward a circulator 808. Circulator 808 communicates added signal 820*b* as output 806.

This embodiment of add/drop multiplexer 805 facilitates pass-through operation by operating in a diffraction mode. In this example, for operation in pass-through mode, blazed grating 10 is displaced to position 14" at an angle THETA to its original position 14". Input optical beam 820*a* impinges on blazed grating 10 at position 14". The majority of input optical beam 20*a* is diffracted in a single direction, in this case, toward circulator 808, which directs those diffracted portions of input beam 820*a* toward output 806.

Although FIGS. 11*a*-11*d* depict configurations where circulator 802 couples to drop port 804 and circulator 808 couples to output port 806, the invention also contemplates coupling circulator 802 to output port 806 and coupling circulator 808 to drop port 804. In a manner analogous to that described above, input signal 820*a* and added signal 820*b* can each be applied along the path of circulator 802 or circulator 808, depending on the particular device characteristics desired.

FIGS. 11*e*-11*f* show still another example of an add/drop multiplexer 810 and its operation in a reflection mode and a diffraction mode, respectively. Optical add/drop multiplexer 810 operates to receive input optical beams at non-normal angles of incidence PHI. To operate in a pass-through mode, optical add/drop multiplexer 810 operates in reflection mode. In that case, blazed grating 10 remains at position 14', where it receives optical input signal 820a at incident angle PHI, and reflects that signal at an angle equal to 180° minus PHI toward a circulator 818. Circulator 818 receives optical input beam 820a and directs that beam toward an output 816.

FIG. 11f shows the same optical add/drop multiplexer 810 operating in a diffraction mode of operation to effect dropping of the input optical beam 820a in favor of an added optical beam 820b. In particular, when it is desired to drop input optical beam 820a, blazed grating 10 is displaced to position 14". Blazed grating 10 also receives added optical beam 820b at incident angle PHI to the original position 14'. In this particular example, blazed grating 10 operates in the Littrow condition such that the angle of incidence PHI of added signal 820b equals the angle of diffraction of output rays 30 and 32. As a result, diffracted portions of added optical beam 820b are communicated back toward circulator 818, which directs those portions of added optical beam 820b to an output 816.

Although FIGS. 11e-11f depict configurations where circulator 812 couples to drop port 814 and circulator 818 couples to output port 816, the invention also contemplates coupling circulator 812 to output port 816 and coupling circulator 818 to drop port 814. In a manner analogous to that described above, input signal 820a and added signal 820b can each be applied along the path of circulator 812 or circulator 818, depending on the particular device characteristics desired.

FIGS. 11g and 11h are block diagrams showing still another embodiment of an optical add/drop multiplexer 850 implementing blazed grating technology. In this example, add/drop multiplexer 850 includes two blazed grating elements 810a and 810b, each communicating with one of circulators 812 and 818. Circulator 812 receives input signal 820a and is coupled to a drop port 814, while circulator 818 receives added signal 820b and is coupled to output port 816.

FIG. 11g shows add/drop multiplexer 850 in a diffraction mode, which in this case corresponds to a pass through mode of operation. In this mode of operation, circulator 812 passes input signal 820a to blazed grating 810a residing at position 14". A majority of input signal 820a is diffracted toward blazed grating 810b, which also resides at position 14" and operates to diffract a majority of the signal received toward circulator 818. Circulator 818 communicates the diffracted portions of the input signal 820a to output port 816.

FIG. 11h depicts add/drop multiplexer 850 in a reflection mode, which in this case corresponds to an add/drop mode of operation. In this mode of operation, circulator 812 passes input signal 820a to blazed grating 810a residing at position 14', which reflects input signal 820a back to circulator 812 and on to drop port 814. Circulator 818 passes added signal 820b to blazed grating 810b residing at position 14'. Blazed grating 810b reflects added signal 820b back to circulator 818, which directs added signal 820 toward output port 816.

Again, the location of inputs for input signal 820a and added signal 820b could be reversed without departing from the scope of the invention. In addition the connections of circulators 812 and 818 to output port 816 and drop port 814 could be reversed without departing from the scope of the invention. The application of input signals and added signals to particular input ports and the designation of particular ports as either drop ports or output ports merely affects the modes of operation when blazed gratings 10 reside in reflection or diffraction modes.

Figure 12:
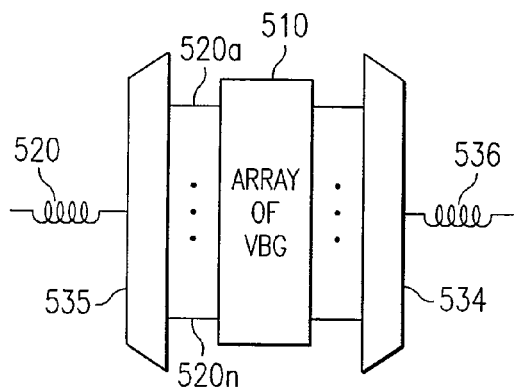
FIG. 12 is a block diagram showing one example of a novel system for facilitating multiple-wavelength signal processing.

Another aspect of the invention involves constructing an array of variable blazed grating devices and coupling those devices to a wavelength division demultiplexer to facilitate signal processing one wavelength or a subset of wavelengths using blazed grating technology. FIG. 12 is a block diagram showing an array 510 of variable blazed grating devices coupled to a wavelength division demultiplexer 535. In this example, array 510 is further coupled to a wavelength division multiplexer 534.

In operation, wavelength division demultiplexer 535 receives an optical input signal 520 carrying a plurality of wavelength signals 520a-520n. In this disclosure, the term "wavelength signal" is used to denote a signal that is part of another signal carrying additional wavelengths beyond those carried in the "wavelength signal." The term "wavelength signal" does not preclude that signal from itself carrying more than one wavelength of light. In other words, each "wavelength signal" can carry one or a number of wavelengths of light. Input signal 520 carries a plurality of wavelength signals 520a-520n, which may each carry one or more wavelengths of light.

Wavelength division demultiplexer 535 separates the wavelength signals 520a-520n and communicates at least some of those signals to array 510 for processing. Wavelength signals 520a-520n communicated to array 510 can undergo various signal processing, such as variable attenuation, optical switching, and/or add/drop multiplexing to name a few examples. Array 510 then communicates processed signals 520a-520n to an output. In this example, array 510 communicates those signals to wavelength division multiplexer 534 for combination into a multiple-wavelength output signal.

Figure 14A:
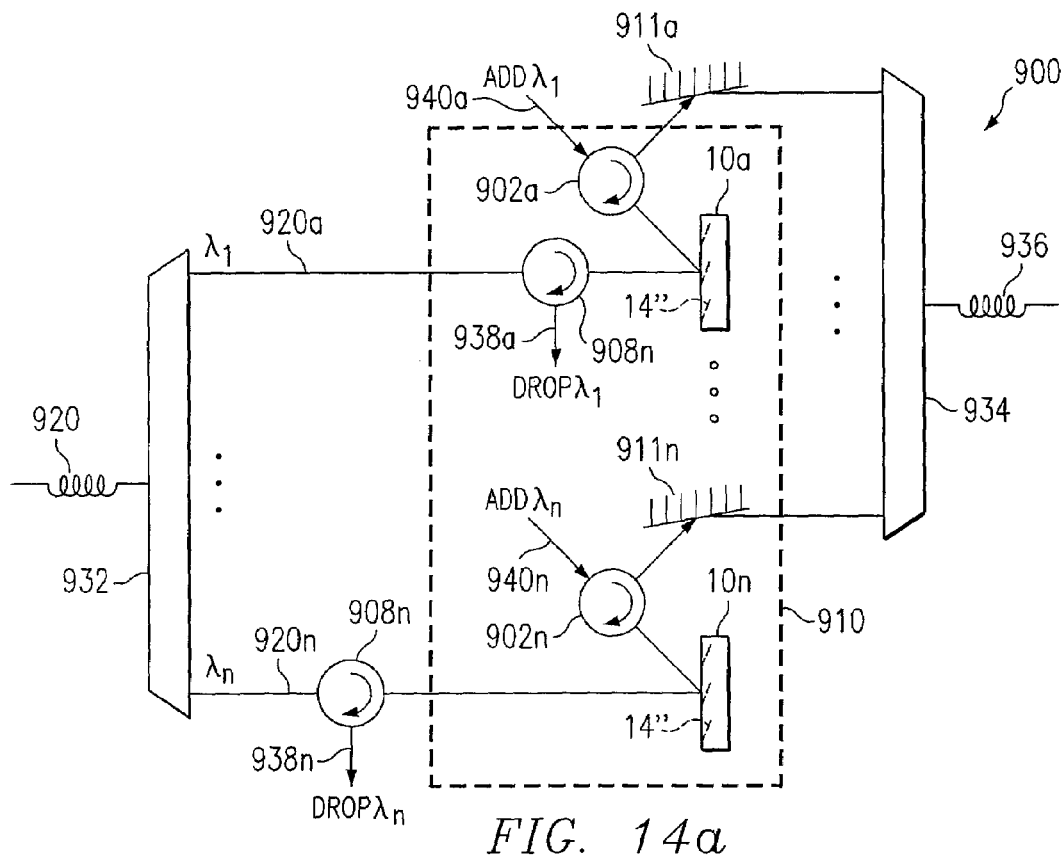
FIGS. 14a and 14b are block diagrams illustrating example embodiments of blazed grating based wavelength division optical add/drop multiplexer.
Figure 14B:
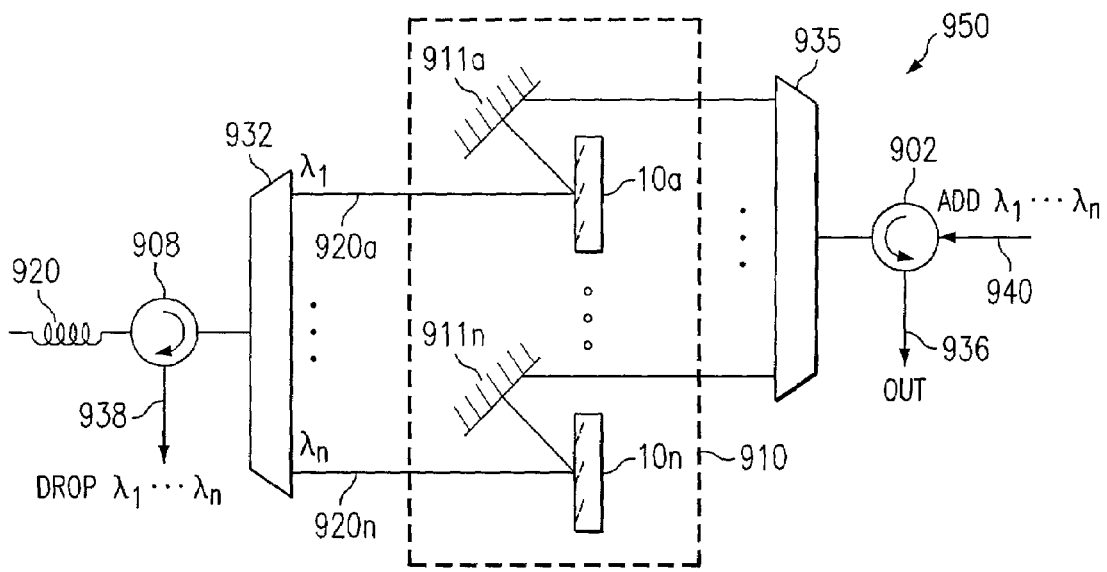
Figure 15:
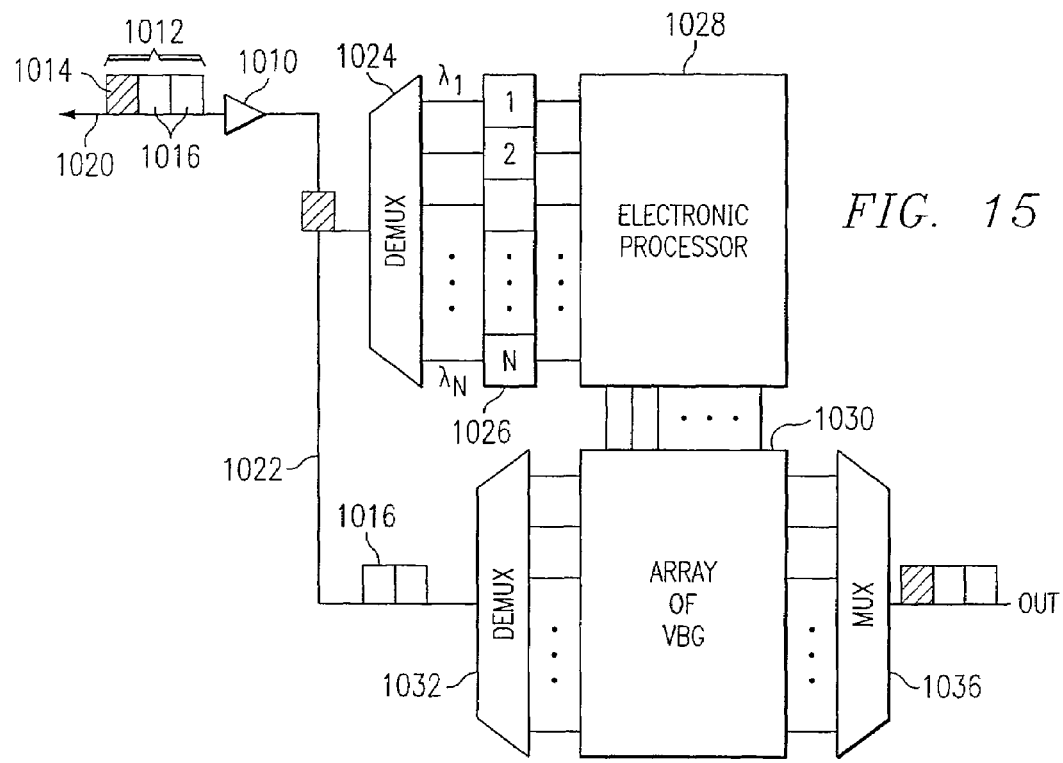
FIG. 15 is a block diagram of an exemplary blazed grating based electro-optic router.

FIGS. 13-15 are block diagrams showing examples of particular systems implementing arrays of variable blazed grating devices coupled to wavelength division demultiplexers.

Figure 13A:
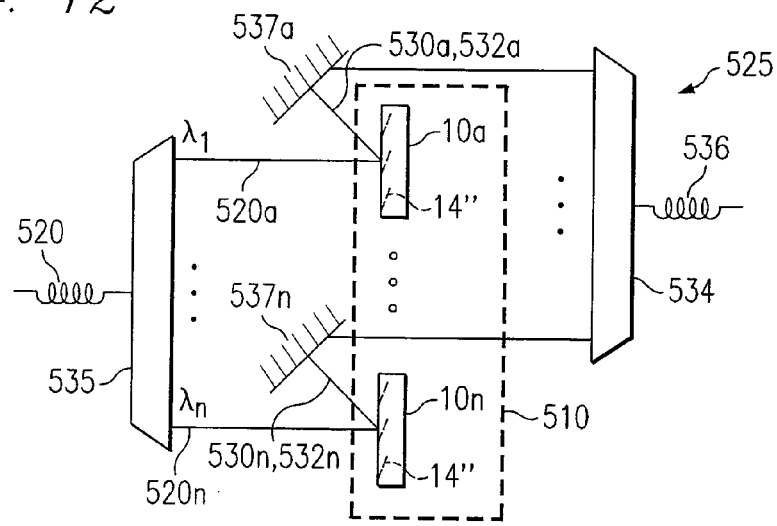
FIGS. 13a-13b are block diagrams illustrating examples of various embodiments of a blazed grating based optical gain equalizer.
Figure 13B:
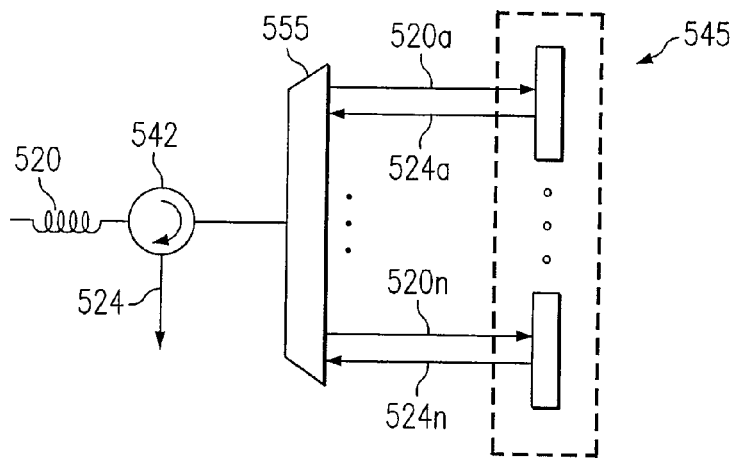

FIGS. 13a and 13b are block diagrams showing examples of optical gain equalizers 525 and 545 using variable blazed grating technology.

FIG. 13a is a block diagram illustrating an example of one possible embodiment of an optical gain equalizer 525. In this example, optical gain equalizer 525 includes a wavelength division demultiplexer 535 operable to receive an optical signal 520 carrying a plurality of individual wavelength signals 520a-520n. Wavelength division demultiplexer 535 separates optical signal 520 into its plurality of wavelength signals 520a-520n, each signal carrying one more wavelengths of light.

Optical gain equalizer 525 includes an array 510 of blazed grating devices 10a-10n. In this example, each blazed grating device 10 operates to produce an output comprising a combination of diffracted output rays 530 and 532. Each blazed grating 10 can provide a selected level of attenuation to the wavelength signal 520a-n it receives, depending on control signals received by the device. As a particular example, each blazed grating device 10 may comprise a plurality of rotatable strips, and may operate to receive a control voltage that creates a voltage differential between some or all of the rotatable strips and an inner conductive layer. This voltage differential can be selected to cause a rotation of the strips by an angle THETA, to create a desired phase difference between diffracted output rays 530 and 532, and a corresponding attenuation of the output beam comprising a combination of diffracted rays 530 and 532. Other blazed grating devices could be used without departing from the scope of the invention.

In this embodiment, optical gain equalizer 525 further includes a wavelength division demultiplexer 534 operable to receive signals processed by blazed grating devices 10 and to multiplex individual wavelength signals into an optical output signal 536 carrying multiple wavelength signals. In this particular embodiment, reflective surfaces 537a-537n assist in communicating processed signals from blazed grating devices 10 to wavelength division multiplexer 534. Depending on the desired configuration of blazed grating array 10 relative to wavelength division demultiplexer 532 and wavelength division multiplexer 534, various combinations of reflective surfaces and other optical communication devices may be implemented without departing from the scope of the invention.

Although the illustrated embodiment describes processing each wavelength signal 520a-520n, a bypass path could alternatively be provided between demultiplexer 523 and multiplexer 534 to facilitate bypassing blazed grating array 510 for those signals not intended to be processed.

FIG. 13b provides another example of an optical gain equalizer 545 using an array 510 of blazed gratings 10a-10n to facilitate variable attenuation of multiple wavelength signals. Gain equalizer 545 is similar to gain equalizer 525, except gain equalizer 545 uses reflected rays 524 as output signals, rather than diffracted rays 530, 532 as in gain equalizer 525.

Gain equalizer 545 includes a wavelength division multiplexer/demultiplexer 555, which operates to receive a multiple wavelength signal 520 and to separate optical signal 520 into multiple wavelength signals 520a-520n, each carrying one or more wavelengths of light. Each wavelength signal 520a-520n is communicated toward one of blazed gratings 10a-10n. Blazed gratings 10a-10n can be controlled through application of control signals to vary the diffraction efficiency of the blazed grating and, therefore, control the intensity of the reflected output rays 524.

Wavelength division multiplexer/demultiplexer 555 receives reflected rays 524a-524n, and multiplexes those wavelength signals into a multiple wavelength output signal 524. In this embodiment, a circulator 542 receives output signal 524, and directs that signal away from the path of input signal 520.

Constructing an optical gain equalizer using an array of blazed grating elements provides significant advantages in facilitating large-scale replication of each attenuation stage. For example, numerous blazed grating stages can be simultaneously formed on a single semiconductor substrate to form an array of blazed grating devices operable to serve any number of individual wavelength signals. One aspect of the invention, therefore, facilitates construction of gain equalizers capable of processing numerous wavelengths for a small incremental cost over a single stage of attenuators. This aspect of the invention provides significant cost savings in processing signals carrying information on multiple channels or wavelengths.

The novel configuration shown in FIG. 12 can also apply to an optical add/drop multiplexer design. FIG. 14a is a block diagram illustrating one example embodiment of a wavelength division optical add/drop multiplexer 900. In this example, wavelength division optical add/drop multiplexer 900 includes a wavelength division demultiplexer 932 operable to receive an optical signal 920 carrying a plurality of individual wavelength signals 920a-920n. Each individual wavelength signal 920a-920n carries one or more wavelengths of information. Wavelength division demultiplexer 932 communicates individual wavelength signals to an array 910 of optical add/drop multiplexers.

In this example, each add/drop multiplexer of array 910 is similar in structure and function to optical add/drop multiplexer 805 shown and described with respect to FIGS. 12c and 12d. Other configurations of optical add/drop multiplexers using blazed grating technology could alternatively be implemented without departing from the scope of the invention. Wavelength division optical add/drop multiplexer also includes a wavelength division multiplexer 934 operable to receive processed signals from array 910 of optical add/drop multiplexers and to multiplex those individual wavelength signals into an optical output signal 936 carrying a plurality of individual wavelength signals. In operation, wavelength division demultiplexer 932 receives optical signal 920 and separates the individual wavelength signals 920a-920n. Again, each wavelength signal 920a-920n may include one or more wavelengths of light. In a particular embodiment, wavelength signals not intended to be processed may bypass array 910 of add/drop multiplexers for recombination at multiplexer 934 without further processing.

Each of the wavelengths to be processed by array 910 is communicated to an optical add/drop multiplexer implementing a blazed grating 10. Optical add/drop multiplexers operate to either pass through the wavelength signals 920a-920n or to drop those signals at ports 938 in favor of added wavelength signals 940. Wavelength division multiplexer 934 receives processed signals from array 910 and any signals that bypassed array 910 and combines those signals into optical signal 936 carrying a plurality of wavelength signals.

FIG. 14b is a block diagram illustrating another example of a wave-division optical add/drop multiplexer 950. Wave-division add/drop multiplexer 950 is similar in operation to wave-division add/drop multiplexer 900 shown in FIG. 13a, except add/drop multiplexer 950 is configured to use common circulators 902 and 908 to be shared among multiple wavelength signals.

Like add/drop multiplexer 900, add drop multiplexer 950 includes a wavelength division demultiplexer 932 operable to receive a multiple wavelength input signal 920 and to separate that signal into a plurality of wavelength signals 920a-920n, each carrying one or more wavelengths of light. Add/drop multiplexer 950 also includes a wave-division multiplexer/demultiplexer 935 operable to receive an added signal 940 containing a plurality of added wavelength signals 940a-940n, and to separate the constituent added wavelength signals 940a-940n.

Add/drop multiplexer 950 further includes an array 910 of blazed gratings 10a-10n. Each blazed grating 10 is operable to receive one of the wavelength signals 920a-920n from demultiplexer 932 and an added signal 940a-940n from wavelength division multiplexer/demultiplexer 935. Depending on the position of each of blazed gratings 10, either the input wavelengths 920 or the added signals 940 received can selectively be communicated toward multiplexer/demultiplexer 935 for communication to a circulator 902 and on to output port 936. Where variable blazed grating 10 operates to reflect or diffract signals back in the direction of any input signal to the system, circulators could be used to redirect the reflected or diffracted signals to enhance system performance. This embodiment provides an advantage of reducing the number of circulators by sharing circulators among a plurality of wavelengths. A similar embodiment could be constructed using multiple arrays of blazed gratings arranged similarly to add/drop multiplexer 850 shown in FIGS. 11g-11h.

As in the case of the blazed grating based gain equalizer, the blazed grating based wavelength division optical add/drop multiplexer provides significant economies over other approaches. For example, by facilitating fabrication of arrays of blazed grating elements at a fraction of the cost of fabricating a single device, this aspect of the invention provides significant cost savings in processing signals carrying information on multiple channels or wavelengths.

The novel configuration shown in FIG. 12 can also apply to an electro-optic switching system. FIG. 15 is a block diagram of an exemplary electro-optic switch 1000. Electro-optic router 1000 may include one or more optical amplifiers 1010. In the illustrated embodiment, an optical amplifier 1010 resides at the ingress end of the switch, which receives optical signals 1012 over a communication link 1020. Electro-optic switch 1000 could also or alternatively include optical amplifiers at the egress end of the switch, or at various other points within the switch. Optical amplifiers 1010 compensate for losses in the signal and line rates of, for example, OC-48 and OC-192 or higher. In the illustrated embodiment, communication link 1020 comprises a single mode fiber carrying, for example, 100 wavelengths ranging from 1500 to 1600 nanometers and 2.5 Gb/s or 10 Gb/s per channel.

Optical signal 1012 comprises header information 1014 and signal payload 1016. Electro-optic switch includes a fiber optic tap operable to communicate a first portion of optical signal 1012 to a delay line 1022 and a second portion of optical signal 1012 to a demultiplexer 1024. In the illustrated embodiment, demultiplexer 1024 may comprise, for example, a wavelength grating router, operable to split the incoming signal into a plurality of wavelengths and send the plurality of wavelengths to an array of wavelength detectors 1026.

Electro-optic switch 1000 also includes an electronic processor 1028 operable to receive optical signals from detectors 1026, to convert the optical signals to electronic signals, and perform various switching, routing, or other processing functions on the converted electronic signals. Electronic processor 1028 is further operable to convert processed electronic signals into optical signals for transmission to an optical add/drop multiplexer array 1030.

Electro-optic switch 1000 further includes a demultiplexer coupled to delay line 1022. In this embodiment, demultiplexer 1032 comprises one or more wavelength grating routers. Both demultiplexer 1032 and electronic processor 1028 communicate with an optical add/drop multiplexer array 1030. In this example, optical add/drop multiplexer array 1030 comprises an array of blazed grating based add/drop multiplexers, such as those described with respect to FIGS. 12a-12h.

Each optical add/drop multiplexer of array 1030 receives processed optical header information from electronic processor 1028 and optical payload information from delay line 1022, and performs various switching functions on those signals. A multiplexer 1036 receives switched optical signals from optical add/drop multiplexer array 1030 and transmits switched optical signals 1040 to other network elements.

In operation, electro-optical switch 1000 receives a plurality of optical signals 1012 and depending on, for example, the signal and line rates, may amplify those signals at optical amplifier 1010. Fiber optic tap 1018 receives optical signals 1012 and sends one copy of the signal including at least header information 1014 to demultiplexer 1024, and sends another copy of the signal including at least payload information 1016 to delay line 1022.

Delay line 1022 serves as a first-in-first-out (FIFO) buffer. The FIFO buffer length is set so as to provide enough time for electronic processor 1028 to process the various header information 1014. While payload information 1016 is delayed in FIFO buffer 1022, electronic processor 1028 converts optical header information 1014 into electronic signals, and performs various processing on that header information. After completing processing of the electronic header information, electronic processor 1028 converts the electronic header information back into one or more optical signals and transmits those signals to optical add/drop multiplexer array 1030.

Optical add/drop multiplexer array 1030 receives processed header information and unprocessed payload information 1016, and associates the related payload and header information. Optical add/drop multiplexer array 1030 then switches the processed optical signals at rates ranging, for example, from approximately 10 to 100 nanoseconds or longer. Multiplexer 1036 receives switched optical signals 1040 from optical add/drop multiplexer array 1030 and transmits the switched optical signals to other network elements.

By transmitting the optical payload information transparently to electronic processor 1028, electro-optical switch 1000 advantageously facilitates field coding. As such, header information can be electronically processed at rates on the order of 2.5 Gigabytes per second, while transparent optical payload information communicates at rates of 10 Gigabytes per second or higher. Electro-optic switch 1000 also facilitates parallel processing of multiple wavelength channels, increasing the speed and efficiency of the switch. In a particular embodiment, differential logic such as Manchester coding can be used to compensate for switching contrast ratio.

Figure 16:
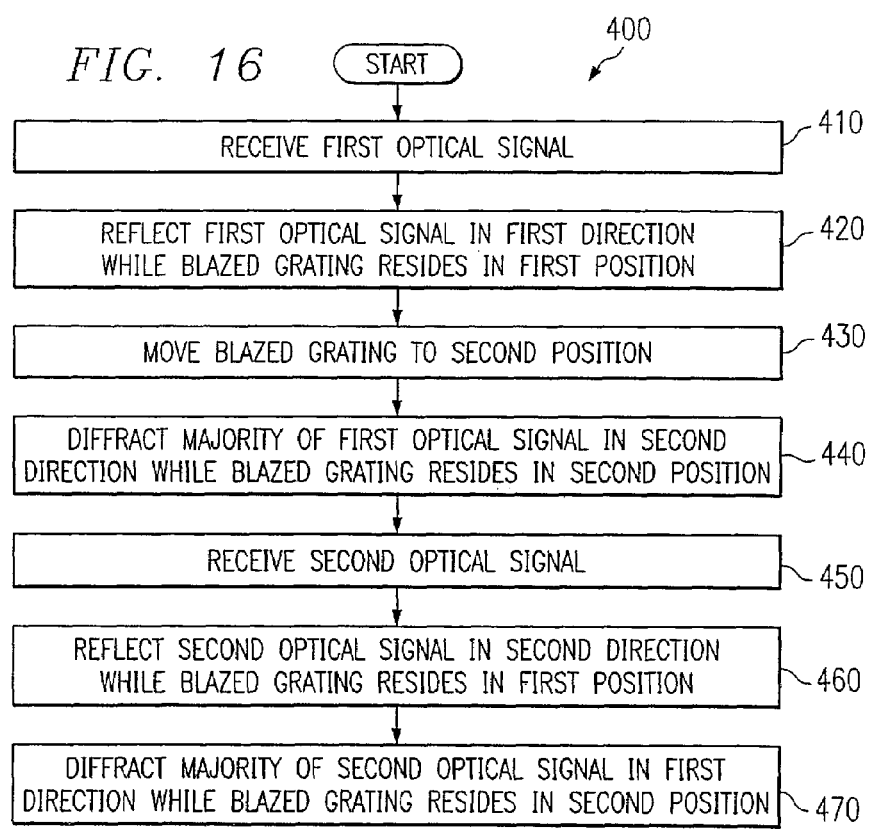
FIG. 16 is a flow chart illustrating one example of a method of optical signal processing using a blazed grating based apparatus.

FIG. 16 is a flow chart illustrating one example of a method 400 of optical signal processing using a variable blazed grating based apparatus. Although specific examples of this method use blazed grating 100 as a particular illustrative embodiment, the method could also be applied to other blazed grating devices, such as those depicted in FIGS. 2-7, as well as systems such as those shown in FIGS. 8-15, and variations of those devices and systems.

In this example, the method 400 begins at step 410 where blazed grating device 10 receives a first optical signal while residing at a first position 14'. In one particular example, blazed grating 10 could comprise a plurality of at least partially reflective adjacent mirror strips 14. To enhance system speed and flexibility, in one embodiment, each of the strips could be constructed to have a width of no more than 40 microns. While residing at position 14', mirror strips 14 comprising this example of variable blazed grating 10 may reside approximately parallel to an inner conductive layer. In another mode of operation, blazed grating 10 can reside at a second position 14", rotated by an angle THETA from the first position 14'.

While blazed grating 10 resides in the first position 14', it operates to reflect the first optical signal in a first direction at step 420. Where first optical signal comprises a normal incident signal, blazed grating 10 operates to reflect signal 20 back in the direction from which it came. Where first optical signal comprises a non-normal incident signal, blazed grating 10 may operate to reflect signal 20 at an angle equal to 180 degrees minus the angle of incidence between signal 20 and strips 14 at position 14'.

At any desired time, blazed grating 10 can be displaced to second position 14" at step 430. As discussed above, while in second position 14", blazed grating 10 resides at an angle THETA from position 14'. While blazed grating 10 resides in second position 14", it diffracts a majority of the first optical signal 20 in a second direction at step 440. Where first optical signal 20 comprises a normal incident signal, blazed grating 10 may diffract a majority of signal 20 at an output angle as shown by output rays 30 and 32 in FIG. 1b. Where input signal 20 comprises a non-normal incident signal, blazed grating 10 at position 14" may operate to diffract signal portions 30 and 32 as shown, for example, in FIG. 1c. FIG. 1c illustrates the Littrow condition, wherein the angle of diffraction equals the angle of incidence of optical signal 20 to blazed grating 10 at position 14". In any case, output rays 30 and 32 exhibit a phase difference that results in a constructive or a destructive interference between those diffracted signal portions.

Where variable blazed grating 10 operates to reflect or diffract signals back in the direction of any input signal to the system, circulators could be used to redirect the reflected or diffracted signals to enhance system performance.

In one aspect of operation, blazed grating device 10 can operate as a variable attenuator by controlling angle THETA to result in a particular phase difference between portions of the majority of the diffracted beam. In another aspect of operation, blazed grating device 10 can operate as an optical switch. In that case, it may be desirable to create a phase difference between diffracted output rays 30 and 32 resulting in a constructive interference between those beam portions to maximize the output signal.

Method 400 applies not only to variable attenuators and 1×2 optical switches, but also to n×n optical switches and optical add/drop multiplexers. For example, method 400 may continue at step 450 where blazed grating device 10 receives a second optical signal. While blazed grating 10 resides in first position 14', it may reflect a second optical signal in a second direction at step 460. For example, as shown in FIGS. 12a-12b, blazed grating 10 residing at position 14' may reflect first input signal 20a back to circulator 702 and reflect second input signal 20b to second circulator 708. In the case of an optical ad/drop multiplexer, for example, FIGS. 12a, 12c, and 12e show that input signals and added signals 820a and 820b are reflected by blazed grating 10 at position 14' to circulators 802 and 808 to result in pass-through or add/drop operation, depending on the configuration of the input signals relative to circulators 802 and 808.

While blazed grating 10 is displaced to position 14", blazed grating 10 diffracts a majority of the second optical signal in the first direction at step 470. In the case of an optical switch, as shown in FIGS. 12a-12b, when blazed grating 10 is displaced to position 14", it diffracts a majority of first input signal 20a toward second circulator 708, while diffracting a majority of second input signal 20b toward first circulator 702. In the case of an add/drop multiplexer, as shown, for example, in FIGS. 12b, 12d, and 12f, input and added signals 820a and 820b (which may vary depending on the configuration) can be selectively added or passed through by diffracting the majority of the signals toward circulators 802 and 808.

Although this method has been described by referencing particular examples of variable attenuators, optical switches, and optical add/drop multiplexers, various substitutions, alterations and modifications can be made to the configurations described herein without departing from the scope of the invention.

Figure 17:
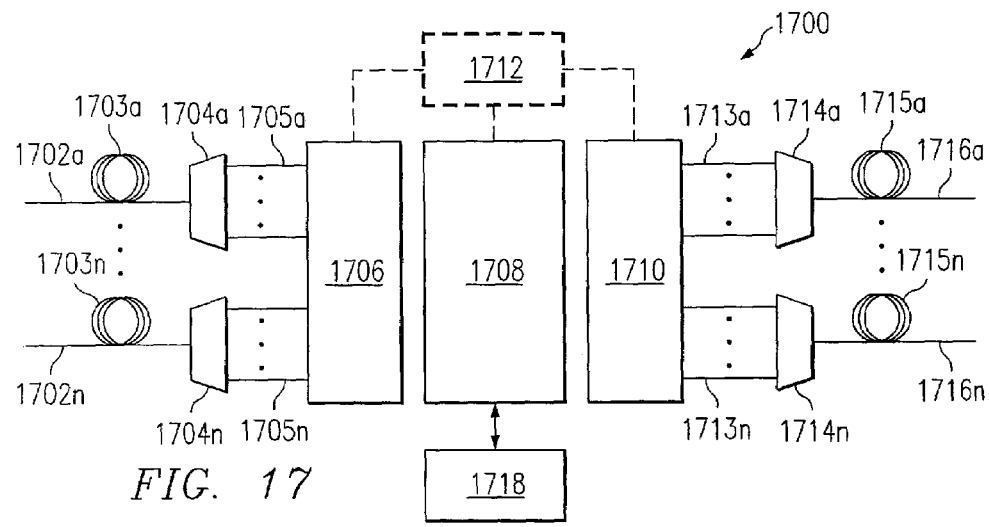
FIG. 17 is a block diagram of one embodiment of an optical data router.

FIG. 17 is a block diagram of one embodiment of an optical data router 1700. Router 1700 may include one or more separators 1704 each capable of separating an input optical signal 1703 communicated over a communication link 1702. Separator 1704 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals.

Communication link 1702 can comprise, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 1702 can operate to couple router 1700 to other optical and/or electro-optical components. For example, link 1702 could couple router 1700 to a cross-connect or another device operable to terminate, switch, route, process, and/or provide access to and/or from communication link 1702 and another communication link or communication device. As used throughout this document, the term "couple" and or "coupled" refers to any direct or indirect communication between two or more elements, whether or not those elements are physically connected to one another. In some embodiments, communication link 1702 can comprise a point-to-point communication link or a portion of a larger communication network, such as a ring network, a mesh network, a star network, or other network configuration.

Optical signal 1703 may comprise a multiple wavelength optical signal. For example, optical signal 1703 can comprise at least 5 wavelength channels, at least 100 wavelength channels, or at least 250 wavelength channels. In one particular embodiment, optical signal 1703 comprises 250 wavelengths having a 50 GHz spacing within a 100 nm spectral window. In that example, the 100 nm spectral window can be located within the 1400 nm to 1650 nm low-loss window associated with optical fibers. In various embodiments, optical signal 1703 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In various embodiments, separator 1704 operates to separate optical signal 1703 into individual wavelength channels 1705 and to couple each wavelength channel 1705 to an input interface 1706. In an alternative embodiment, separator 1704 can separate optical signal 1703 into separate multiple-wavelength channels and couple those multiple-wavelength channels to input interface 1706. Wavelength channels 1705 can comprise, for example, Internet Protocol (IP) packets, voice data, video data, or any other data type and/or data format. In this particular embodiment, each wavelength channel 1705 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 1705, however this format is not required. In this example, each wavelength channel 1705 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In this example, input interface 1706 operates to receive and process each wavelength channel 1705 associated with optical signal 1703. Input interface 1706 can comprise any optical and/or electrical components—including any hardware, software, and/or firmware—capable of processing, converting, replicating, updating, and/or swapping one or more packet labels associated with each wavelength channel 1705. In various embodiments, input interface 1706 can determine a desired routing for a packet data associated with each wavelength channel 1705 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 1706 may include a controller that receives an electrical representation of a packet label and generates a control signal that functions to modulate a swapping sequence on an optical signal.

Router 1700 further includes a switching element 1708 capable of processing one or more packet data associated with wavelength channels 1705 received from input interface 1706 and directing those packet data to a desired destination. Switching element 1708 can comprise any optical and/or electrical components—including any hardware, software, and/or firmware—capable of switching, routing, error checking, and/or managing the one or more packet data or packet labels associated with each wavelength channel 1705. In this particular embodiment, switching element 1708 can comprise a ring configuration having one or more core router nodes and at least one management node. Although this example implements a ring configuration, switching element 1708 could implement a mesh configuration, a star configuration, or any other configuration without departing from the scope of the present disclosure. In various embodiments, switching element 1708 can operate to process wavelength channels 1705 at processing speeds of, for example, at least 10 Gb/s, at least 40 Gb/s, at least 100 Gb/s, or at least 160 Gb/s.

In various embodiments, switching element 1708 can route and/or receive one or more packet data associated with wavelength channels 1705 to and/or from an edge router 1718. In one non-limiting example, edge router 1718 may comprise an electro-optic router capable of providing an optical-to-electrical interface. In other embodiments, switching element 1708 can route one or more packet data associated with wavelength channels 1705 to an output interface 1710. Output interface 1710 can comprise any optical and/or electrical components—including any hardware, software, and/or firmware—capable of preparing one or more packet data associated with wavelength channels 1705 for communication from router 1700. In this example, output interface 1710 operates to communicate the one or more packet data from router 1700 to a desired destination through an appropriate wavelength channel 1713.

Router 1700 may also include one or more combiners 1714 each capable of combining output wavelength channels 1713 into one or more output optical signals 1715 for communication over a communication links 1716. Combiner 1714 may comprise, for example, a wavelength division multiplexer. The structure and function of communication link 1716 can be substantially similar to the structure and function of communication link 1702. In this example, communication links 1716 operate to couple router 1700 to other optical and/or electro-optical components.

In this example, router 1700 also includes a controller 1712 capable of at least partially contributing to controlling one or more functionalities associated with router 1700. That is, controller 1712 is not required to be capable of performing the desired functionality alone, but may contribute to the performance of the function as part of a larger routine. Controller 1712 can comprise any communication and/or computational device or devices, including any hardware, software, firmware, or combination thereof.

In operation, the packet data associated with wavelength channels 1705 are transparent to the processing functions of router 1700. That is, in operation router 1700 does not examine the content of the packet data associated with each wavelength channel 1705. In some cases, router 1700 does examine the contents of one or more packet labels and/or other elements of a frame format associated with wavelength channels 1705. In most cases, router 1700 operates to maintain the packet data associated with wavelength channels 1705 in the optical domain. That is, the packet data associated with each wavelength channel 1705 are not subjected to an optical-to-electrical conversion by router 1700. In some cases, one or more of the packet labels and/or other elements of a frame format associated with wavelength channels 1705 can be subjected to one or more optical-to-electrical and/or electrical-to-optical conversions. In various embodiments, router 1700 may be capable of an aggregate capacity of, for example, at least 5 Tb/s, at least 25 Tb/s, at least 50 Tb/s, or at least 100 Tb/s.

In this particular embodiment, input interface 1706, switching element 1708, and/or output interface 1710 can implement one or more semiconductor optical amplifier (SOA) components. Implementing one or more SOA components within input interface 1706, switching element 1708, and/or output interface 1710 can, in some cases, allow at least a portion of these devices to be amenable to semiconductor chip level integration. In some embodiments, input interface 1706, switching element 1708, and/or output interface 1710 can implement one or more semiconductor optical amplifier Mach Zehnder Interferometer (SOA-MZI) based all-optical logic gates capable of 2R regeneration, 3R regeneration, and/or wavelength conversion. The phrase "2R regeneration" as used herein refers to the re-amplification and re-shaping of an optical signal wavelength. As used throughout this document, the phrase "3R regeneration" refers to the re-amplification, re-shaping, and re-timing of an optical signal wavelength.

In some embodiments, router 1700 can operate to minimize and/or avoid contention between packet data associated with optical signals 1703 and 1715 and/or wavelength channels 1705 and 1713 within switching element 1708 and/or communication links 1702 and 1716. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

Figure 18:
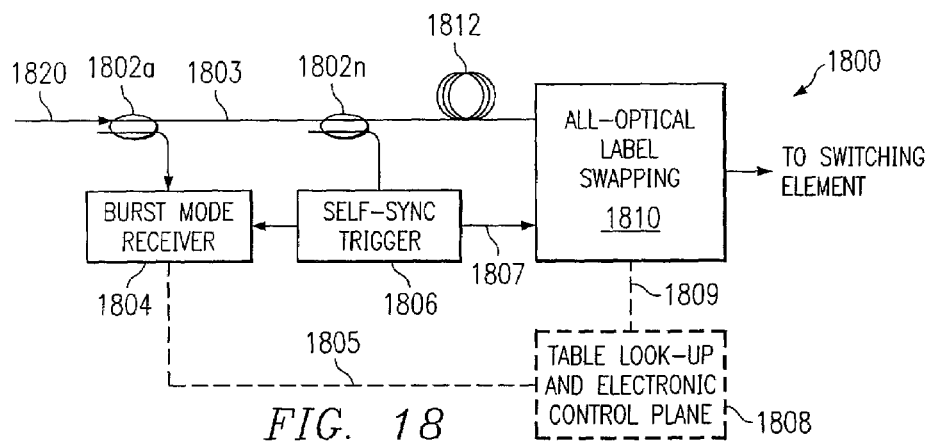
FIG. 18 is a block diagram of one embodiment of an input interface.

FIG. 18 is a block diagram of one embodiment of an input interface 1800. In this example, input interface 1800 includes at least a first optical tap 1802*a* and a second optical tap 1802*n*. Although this example implements two optical tap 1802*a* and 1802*n*, any number of optical taps can be used without departing from the scope of the present disclosure. Optical taps 1802 can comprise any optical component or components capable of de-coupling or removing at least a fraction of an optical signal 1820 from an optical fiber 1803. As a non-limiting example, optical taps 1802 can comprise a wavelength division demultiplexer or a power splitter. In various embodiments, the structure and function of optical signal 1820 can be substantially similar to wavelength channel 1705 of FIG. 17. In this particular embodiment, optical signal 1820 implements a frame format that comprises one or more framing bits, a first packet label that precedes packet data, and a second packet label that follows the packet data.

Input interface 1800 also includes a receiver 1804 capable of receiving at least a portion of optical signal 1820 from optical tap 1802*a*. Receiver 1804 can comprise any optical and/or electrical component—including any hardware, software, and/or firmware—capable of identifying and capturing a packet label associated with optical signal 1820. In this example, receiver 1804 converts the received portion of optical signal 1820 to an electronic signal 1805 representing the packet label and communicates electronic signal 1805 to a controller 1808. Controller 1808 can comprise any device capable of determining one or more routing properties and/or routing rules associated with electronic signal 1805. In this particular embodiment, controller 1808 accesses to a look-up table and determines where to route optical signal 1820 based at least in part on data contained within the look-up table.

Input interface 1800 further includes a self-sync module 1806 capable of receiving at least a portion of optical signal 1820 from optical tap 1802n. Self-sync module 1806 can comprise any optical and/or electrical component—including any hardware, software, and/or firmware—capable of extracting, processing, and/or synchronizing a first bit associated with a packet label optical signal 1820. In various embodiments, self-sync module 1806 can comprise one or more semiconductor optical amplifiers (SOA) capable of functioning as a fast-saturated slow recovery gain medium and/or an intensity discriminator. Implementing SOA components within self-sync module 1806 advantageously enables at least portions of self-sync module 1806 to be amenable to semiconductor chip level integration.

In this particular embodiment, self-sync module 1806 synchronizes the first bit associated with a packet label of optical signal 1820 and communicates a synchronized signal 1807 to an all-optical label swapping module 1810. In one non-limiting example, synchronized signal 1807 comprises the first bit associated with the packet label of optical signal 1820. Label swapping module 1810 may comprise any optical and/or electrical component—including any hardware, software, and/or firmware—capable of processing, replicating, converting, updating, and/or swapping one or more packet labels associated with optical signal 1820. In various embodiments, swapping module 1810 can comprise one or more semiconductor optical amplifiers (SOA) capable of functioning as an optical logic gate.

Label swapping module 1810, in this example, operates to replicate synchronized signal 1807 once for each bit in the packet label associated with optical signal 1820. For example, if the packet label comprises eight bits, then label swapping module 1810 replicates synchronized signal 1807 eight times. In various embodiments, label swapping module 1810 may comprise, for example, a multi-mode interference coupler or any other device capable of replicating synchronized signal 1807. In addition, label swapping module 1810 operates to encode these replicated bits with a swapping sequence based at least in part on a control signal 1809 received from controller 1808. Label swapping module 1810 may comprise, for example, a modulator or any other device capable of encoding the swapping sequence onto the replicated bits.

In this example, label swapping module 1810 receives optical signal 1820 from a delay line 1812. Delay line 1812 may comprise, for example, a sufficient length of optical fiber capable of compensating for any processing latency associated with receiver 1804, module 1806, and/or controller 1808. In some cases, delay line 1812 may operate as a first-in-first-out (FIFO) buffer having an appropriate length.

In this particular embodiment, label swapping module 1810 implements an all-optical XOR gate capable of updating and/or swapping the packet labels associated with optical signal 1820 based at least in part on control signal 1809. In some cases, the all-optical XOR gate can operate at processing speeds of up to 160 Gb/s. In various embodiments, the all-optical XOR gate may comprise, for example, a semiconductor optical amplifier Mach Zehnder Interferometer (SOA-MZI) capable of 2R regeneration, 3R regeneration, and/or wavelength conversion. Implementing an all-optical XOR gate in label swapping module 1810 can improve, in some cases, the processing efficiency of label swapping module 1810. That is, if the packet label and packet data have the same bit rate, then frame generation and synchronization can be simplified. In addition, implementing an all-optical XOR gate can minimize and/or eliminate the need for a time guard band between the packet label and the packet data.

In this particular embodiment, label swapping module 1810 is configured to optionally update and/or swap the packet labels associated with optical signal 1820, improve the optical signal-to-noise ratio (OSNR) through re-amplification of optical signal 1820, and communicate optical signal 1820 to a switching element coupled to input interface 1800. In some embodiments, label swapping module 1810 can convert the wavelength associated with optical signal 1820 to another wavelength. In some cases, converting the wavelength associated with optical signal 1820 can advantageously reduce and/or minimize contention within a switching module coupled to input interface 1800.

Figure 19:
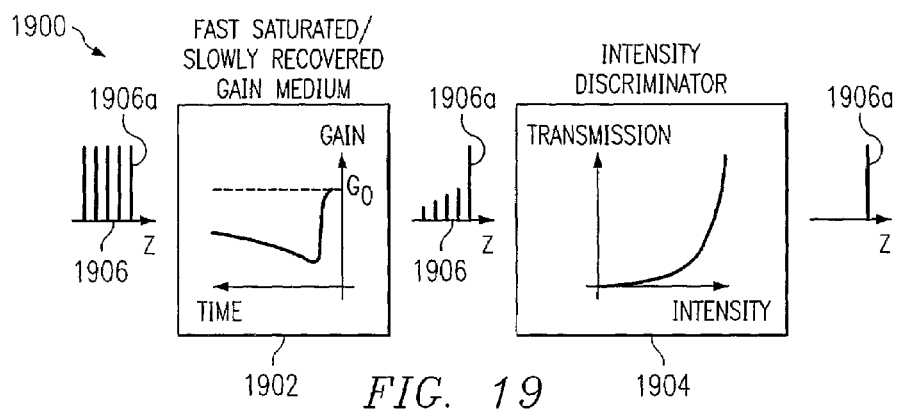
FIG. 19 is a block diagram of one embodiment of a self-sync module.

FIG. 19 is a block diagram of one embodiment of a self-sync module 1900. In various embodiments, the structure and function of self-sync module 1900 can be substantially similar to the structure and function of self-sync module 1806 of FIG. 18. In this example, module 1900 includes a gain medium 1902 capable of receiving an optical signal 1906. In this particular embodiment, gain medium 1904 comprises a fast-saturated slow recovery gain medium having a time decaying transmission function that operates to create higher intensity within a first bit 1906a associated with optical signal 1906. In some embodiments, gain medium 1902 can comprise a semiconductor optical amplifier (SOA) having a fast-saturated slow recovery transmission function. In various embodiments, the structure and function of optical signal 1906 can be substantially similar to wavelength channel 1705 of FIG. 17. In this particular example, optical signal 1906 comprises a packet label having five bits, where first bit 1906a comprises a value of '1'. In some cases, optical signal 1906 may comprise a time guard band capable of allowing gain medium 1902 to recover before processing a subsequently received optical signal. In those cases, the time guard band may comprise, for example, approximately 100 picoseconds (ps) or more, 400 ps or more, or any other appropriate period.

Module 1900 also includes an intensity discriminator module 1904 capable of selecting one or more bits having an intensity above a desired threshold. Intensity discriminator may comprise, for example, a nonlinear optical loop mirror having a nonlinear phase shift, a dispersion-shifted fiber having a nonlinear spectral shift, or any other device capable of selecting one or more bits having an intensity above a desired threshold. In one particular embodiment, intensity discriminator module 1904 comprises an SOA-MZI having a sine-squared transfer function at relatively low intensities. Implementing SOA components within gain medium 1902 and intensity discriminator module 1904 advantageously enables at least portions of module 1900 to be amenable to semiconductor chip level integration. In various embodiments, implementing SOA components within gain medium 1902 and intensity discriminator module 1904 can result in the synchronization of the processed portion of optical signal 1906 being desensitized to inter-packet jitter before use by an all-optical logic gate.

In operation, gain medium 1902 receives optical signal 1906 comprising five bits from an optical tap and creates a higher and/or desired intensity within first bit 1906a. Intensity discriminator receives the five bits associated with optical signal 1906 and selects first bit 1906a. In this example, first bit 1906a comprises an intensity that is above a desired threshold, while the remaining four bits have intensities below the desired threshold. In one example, module 1900 can communicate first bit 1906*a* to an all-optical label swapping module.

Figure 20:
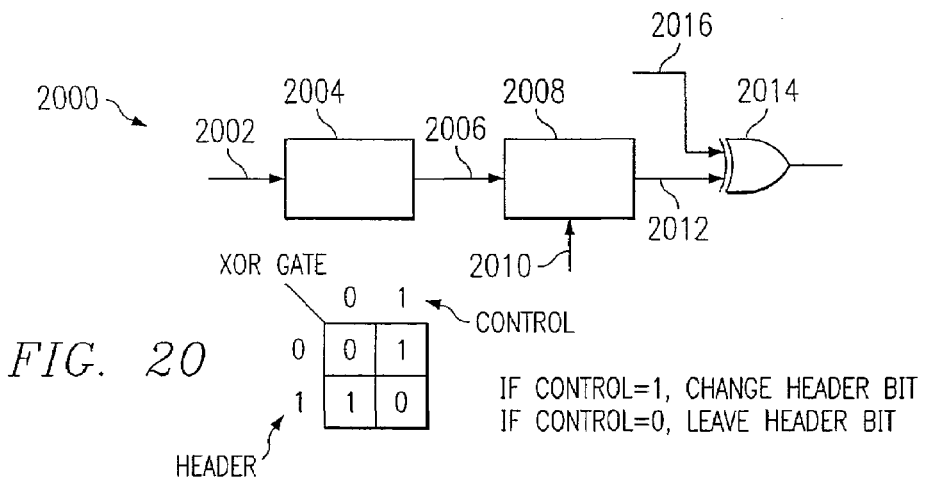
FIG. 20 is a block diagram of one embodiment of an all-optical label swapping module.

FIG. 20 is a block diagram of one embodiment of an all-optical label swapping module 2000. In various embodiments, the structure and function of label swapping module 2000 can be substantially similar to the structure and function of label swapping module 1810 of FIG. 18. In this example, label swapping module 2000 includes a synchronized signal replication module 2004 capable of replicating synchronized signal 2002 once for each bit in the packet label associated with optical signal 2016. For example, if the packet label comprises ten bits, then replication module 2004 replicates synchronized signal 2002 ten times. Replication module 2004 may comprise any optical and/or electrical components—including any hardware, software, and/or firmware—capable of replicating synchronized signal 2002. In this particular embodiment, replication module 2004 comprises a multi-mode interference coupler. In various embodiments, the structure and function of synchronized signal 2002 can be substantially similar to the structure and function of optical signal 1906 of FIG. 19.

In this example, replication module 2004 communicates a replicated signal 2006 comprising a plurality of bits to an encoding module 2008. In this example, the number of bits of the replicated signal equal the number of bits in the corresponding packet label. Encoding module 2008 may comprise, for example, a modulator or any other device capable of encoding a swapping sequence onto the replicated bits. In this particular embodiment, encoding module 2008 operates to encode replicated signal 2006 based at least in part on a control signal 2010 comprising a swapping sequence.

Label swapping module 2000 also includes an all-optical XOR gate 2014. In this example, gate 2014 operates to update and/or swap the packet labels associated with optical signal 2016 based at least in part on an encoded signal 2012. All-optical XOR gate 2014 may comprise, for example, a semiconductor optical amplifier Mach Zehnder Interferometer (SOA-MZI) capable of 2R regeneration, 3R regeneration, and/or wavelength conversion. Implementing SOA components within XOR gate 2014 advantageously enables at least portions of module 2000 to be amenable to semiconductor chip level integration. In addition, implementing all-optical XOR gate 2014 in label swapping module 2000 can improve, in some cases, the processing efficiency of label swapping module 2000. That is, if the packet label and packet data have the same bit rate, then frame generation and synchronization can be simplified. Moreover, implementing XOR gate 2014 can minimize and/or eliminate the need for a time guard band between the packet label and the packet data of optical signal 2016. Furthermore, implementing XOR gate 2014 allows label swapping to be transparent to the frame format containing the packet data and the bit rate.

In this particular embodiment, label swapping module 2000 is configured to optionally update and/or swap the packet labels associated with optical signal 2016 and to improve the optical signal-to-noise ratio (OSNR) through re-amplification and re-shaping of optical signal 2016. In some embodiments, label swapping module 2000 can also operate to convert the wavelength associated with optical signal 2016 to another wavelength.

In operation of this example, XOR gate 2014 updates and/or swaps each bit of the packet label associated with optical signal 2016 when the corresponding bit associated with encoded signal 2012 comprises a value of "1." by contrast, XOR gate 2014 does not update and/or swap the bits of the packet label associated with optical signal 2016 when the corresponding bit associated with encoded signal 2012 comprises a "0." For example, if a packet label associated with optical signal 2016 comprises 110010 and the desired output packet label is 100111. Then, the swapping sequence encoded on signal 2012 would comprise 010101. In an alternative embodiment, XOR gate 2014 can operate to swap and/or update each bit of the packet label associated with optical signal 2016 when the corresponding bit associated with encoded signal 2012 comprises a value of "0" and not to swap values then the corresponding bit of encoded signal 2012 has a value of "1."

Figure 21:
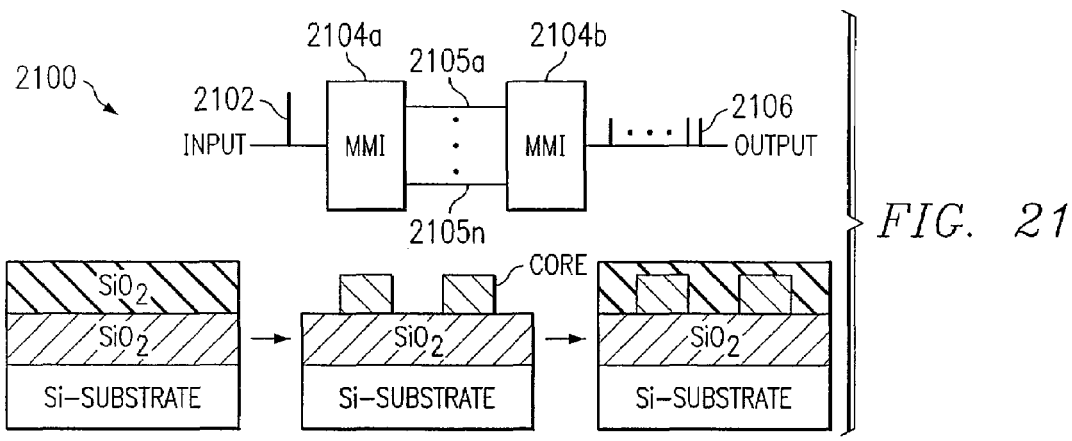
FIG. 21 is a block diagram of one embodiment of a replication module implementing a multi-mode interference coupler.

FIG. 21 is a block diagram of one embodiment of a replication module 2100 implementing a multi-mode interference coupler 2104. In various embodiments, the structure and function of replication module 2100 can be substantially similar to the structure and function of replication module 2004 of FIG. 20. In this example, replication module 2100 operates to replicate synchronized signal 2102 once for each bit in the packet label associated with an optical signal. For example, if the packet label comprises four bits, then replication module 2100 replicates synchronized signal 2102 four times resulting, in this example, in four replicated signals, each comprising one bit. In various embodiments, the structure and function of synchronized signal 2102 can be substantially similar to the structure and function of synchronized signal 2002 of FIG. 20.

In this example, replication module 2100 includes at least a first multi-mode interference (MMI) coupler 2104*a* and a second MMI coupler 2104*b*. Although this example implements two MMI couplers, any number of MMI couplers may be used without departing from the scope of the present disclosure. In this example, first MMI coupler 2104*a* is capable of replicating the bit associated with synchronized signal 2102 into a desired number of bits and communicates those bits to second MMI coupler 2104*b* through waveguides 2105*a*-2105*n*. Second MMI coupler 2104*b* operate to combine the replicated bits into a replicated optical signal 2106 for further processing. In this example, replicated optical signal 2106 comprises four bits, with appropriate delay between bits.

Waveguides 2105 operate to provide adequate delay between the replicated bits. In some cases, waveguides 2105 can operate to provide a delay between bits of at least 25 ps for packet labels communicated at approximately 40 Gb/s. That is, where a packet label is communicated at approximately 40 Gb/s, waveguide 2105*b* operates to cause a bit traversing waveguide 2105*b* to take approximately 25 ps longer than a bit traversing waveguide 2105*a*. In other cases, waveguides 2105 can operate to provide a delay between bits of at least 6.25 ps for packet labels communicated at approximately 160 Gb/s. In various embodiment, waveguides 2105*a*-2105*n* can be formed on a common photonic integrated circuit using silica-on-silicon optical bench technology and standard semiconductor processing techniques. In other embodiments, waveguides 2105*a*-2105*n* can be formed on a plurality of photonic integrated circuits using silica-on-silicon optical bench technology and standard semiconductor processing techniques.

FIGS. 22A-22D are block diagrams of example embodiments of all-optical logic gates for bit level processing. In these examples, the all-optical logic gates implement an SOA-MZI capable of 2R regeneration, 3R regeneration, and/or wavelength conversion. In other examples, the all-optical logic gates implement a Michelson interferometer, a Sagnac interferometer, or another interferometer. Implementing SOA components within the all-optical logic gates advantageously enables the logic gates to be amenable to semiconductor chip level integration. In one particular embodiment, a plurality of logic gates can be formed on a single semiconductor chip using standard semiconductor processing techniques.

Figure 22A:
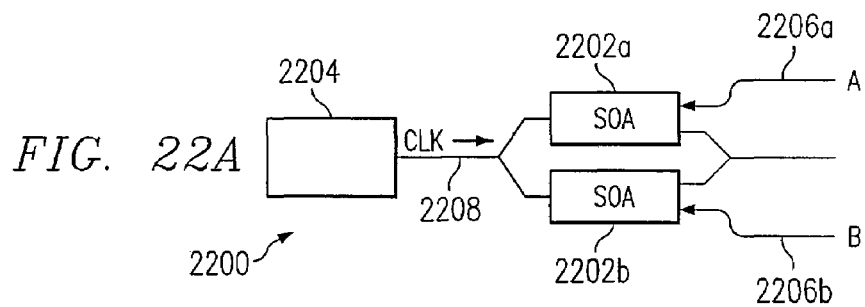
FIGS. 22A through 22D are block diagrams of example embodiments of all-optical logic gates for bit level processing.

FIG. 22A is a block diagram of one embodiment of an all-optical XOR gate 2200. In this example, XOR gate 2200 includes at least a first SOA 2202a and a second SOA 2202b. As one non-limiting example, SOA 2202a and SOA 2202b can each comprise an InGaAsP semiconductor optical amplifier. In this particular embodiment, SOA 2202a receives a first data signal 2206a and SOA 2202b receives a second data signal 2206b. In this particular example, SOA 2202a and SOA 2202b are arranged symmetrically to form an integrated semiconductor optical amplifier Mach Zehnder Interferometer (SOA-MZI). In various embodiments, XOR gate 2200 can be formed on a single semiconductor substrate using standard semiconductor processing techniques. In those cases, the semiconductor substrate may comprise, for example, silicon, poly-silicon, indium phosphide, gallium arsenide, or any other suitable substrate material or combination of materials.

First data signal 2206a and second data signal 2206b can each comprise, for example, an optical signal having a swapping sequence, an optical signal having at least packet data, an optical signal having at least a packet label, or a combination of these or other data types. In various embodiments, the structure and function of first data signal 2206a and second data signal 2206b can be substantially similar to the structure and function of encoded signal 2012 and/or optical signal 2016 of FIG. 20. In some cases, control pulses associated with the bits of data signals 2206a and/or 2206b can comprise a pulse width that is longer than a length associated with SOA 2202a and/or 2202b. For example, if SOA 2202a comprises a length of approximately 500 microns, the pulse width associated with data signal 2202a could comprise approximately five (5) ps.

XOR gate 2200 also includes a light source 2204 capable of generating a CLK signal 2208 at one or more desired wavelengths. In one particular embodiment, light source 2204 and SOA's 2202a and 2202b can be formed on a single semiconductor chip using standard semiconductor processing techniques. Light source 2204 can comprise, for example, a continuous wave light source, a synchronized light source, a tunable light source, a semiconductor laser, a laser diode, a cladding pump fiber laser, or any combination of these or any other light source. The phrase "synchronized light source" a used herein refers to a light source that provides a pulsed and/or modulated output signal that is capable of being synchronized to an incoming data stream using a phase locked loop.

In various embodiments, CLK signal 2208 can comprise the same wavelength as data signals 2206 or can comprise a different wavelength than data signals 2206. Implementing CLK signal 2208 at the same wavelength as data signals 2206 can allow system designers to implement multiple levels of logic without the need for wavelength conversion at each logic level. In some cases, implementing a different CLK signal 2208 wavelength can result in a wavelength shift and possibly minimize or avoid contention within a network, optical device, and/or switching element coupled to XOR gate 2200.

In this particular embodiment, CLK signal 2208 traverses SOA 2202a and SOA 2202b in a direction that is counter to a direction that data signals 2206 traverse SOA 2202a and 2202b. Implementing a counter-propagating CLK signal 2208 allows CLK signal 2208 and data signals 2206 to use the same optical signal wavelength. In addition, counter-propagating CLK signal 2208 and data signals 2206 allows data signals 2206 to be de-coupled from XOR gate 2200 using an isolator or circulator. In some embodiments, counter-propagating CLK signal 2208 and data signals 2206 can achieve polarization independence. In those cases, SOA 2202a and SOA 2202b may comprise a polarization independent SOA. In other embodiments, SOA 2202a and 2202b can comprise a polarization dependent loss of, for example, no more than three (3) dB, two (2) dB, or one-half (0.5) dB. Thus, implementing a counter-propagating CLK signal 2208 can advantageously enable XOR gate 2200 to provide three-terminal, cascadable, and polarization independent operation.

In operation, when XOR gate 2200 receives either data signal 2206a or 2206b a change in phase associated with one arm of XOR gate 2200 results in an imbalance in the interferometer and an output from XOR gate 2200. For example, when SOA 2202a receives data signal 2206a a change phase occurs in the arm of XOR gate 2200 comprising SOA 2202a, which results in an output from XOR gate 2200. The change in phase associated with one arm of XOR gate 2200 results from cross-phase modulation. On the other hand, when XOR gate 2200 receives both data signals 2206a and 2206b the cross-phase modulation phase shift is equal in the two arms of XOR gate 2200 resulting in a null output. In this example, XOR gate 2200 is biased such that when both of data signals 2206a and 2206b are not received by XOR gate 2200 then a null output is achieved.

In this particular embodiment, XOR gate 2200 is capable of functioning as a regenerative logic gate. XOR gate 2200 is capable of achieving a regenerative function by replacing the incoming photons associated with data signals 2206 with new photons from light source 2204. Implementing a regenerative function within XOR gate 2200 can operate to minimize the accumulation of distortions when several logic gate are cascaded. In addition, XOR gate 2200 is capable of functioning as a 2R regenerator data signals 2206, because the transfer function of XOR gate 2200 comprises a sine-squared, non-linear operation. That is, the transfer function of XOR gate 2200 can operate to suppress noise at low intensity since the sine-squared function is approximately quadratic at low intensities. Power levels of data signals 2206 and/or CLK signal 2208 can be biased to be in the approximately linear regime of the transfer function for high throughput.

In this particular embodiment, XOR gate 2200 is capable of ultrafast operation. XOR gate 2200 is capable of ultrafast operation by implementing a symmetric structure and biasing at the gain transparency of SOA 2202a and SOA 2202b. Implementing a symmetric structure in XOR gate 2200 advantageously minimizes and/or cancels the slow non-linearity effects, which leads to switching based only on the fast non-linearity effects of the SOAs. In addition, biasing SOA 2202a and SOA 2202b at transparency advantageously minimizes and/or reduces bit-pattern dependence and inter-symbol interference (ISI) because few or no net carriers remain after the pulses pass through. In various embodiments, carrier heating and two-photon absorption can aid in the fast non-linearity operation of XOR gate 2200. In some cases, XOR gate 2200 can perform switching operation at speeds of, for example, at least 10 Gb/s, at least 40 Gb/s, at least 100 Gb/s, or at least 160 Gb/s.

In this particular embodiment, XOR gate 2200 is capable of 2R regeneration that is substantially transparent to a bit rate and data format associated with data signals 2206. In an alternative embodiment, XOR gate 2200 is capable of 3R regeneration. In that case, light source 2204 comprises a synchronized light source capable of generating a pulsed and/or modulated CLK signal 2208 that is synchronized to data signals 2206 by a phase locked loop. In that case, the synchronized light source operates to provide a re-timing function.

Figure 22B:
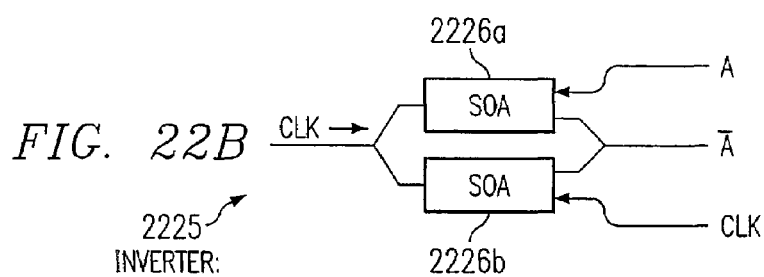

FIG. 22B is a block diagram of one embodiment of an all-optical inverter 2225. In various embodiments, the structure and function of inverter 2225 can be substantially similar to the structure and function of XOR gate 2200 of FIG. 22A. In this example, inverter 2226 includes at least a first SOA 2226a and a second SOA 2226b. The example illustrated in FIG. 22B differs from the example illustrated in FIG. 22A in that the CLK signal is inputted into SOA 2226b. Inputting the CLK signal into SOA 2226b and the 'A' signal into SOA 2226a causes the logic gate to function as an inverter.

Figure 22C:
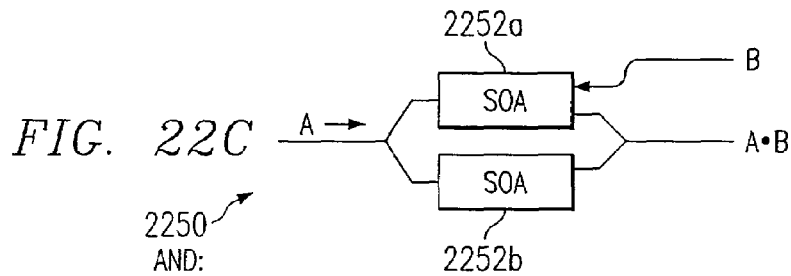

FIG. 22C is a block diagram of one embodiment of an all-optical AND gate 2250. In various embodiments, the structure and function of AND gate 2250 can be substantially similar to the structure and function of XOR gate 2200 of FIG. 22A. In this example, gate 2250 includes at least a first SOA 2252a and a second SOA 2252b. The example illustrated in FIG. 22C differs from the example illustrated in FIG. 22A in that the 'A'0 signal traverses gate 2250 in a direction counter to the 'B' signal. Counter propagating the 'A' signal and the 'B' signal as illustrated causes the logic gate to function as an AND gate.

Figure 22D:
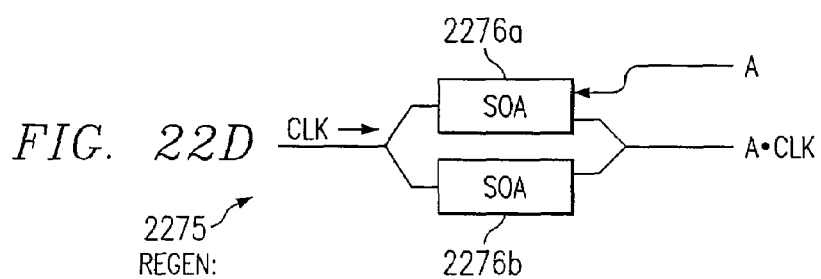

FIG. 22D is a block diagram of one embodiment of an all-optical regenerator 2275. In various embodiments, the structure and function of regenerator 2275 can be substantially similar to the structure and function of XOR gate 2200 of FIG. 22A. In this example, gate 2200 includes at least a first SOA 2276a and a second SOA 2276b. The example illustrated in FIG. 22D differs from the example illustrated in FIG. 22A in that the 'B' signal does not propagate within regenerator 2275. Counter propagating only the 'A' signal and the CLK signal as illustrated causes the logic gate to function as a buffer switch or regenerator.

Figure 23:
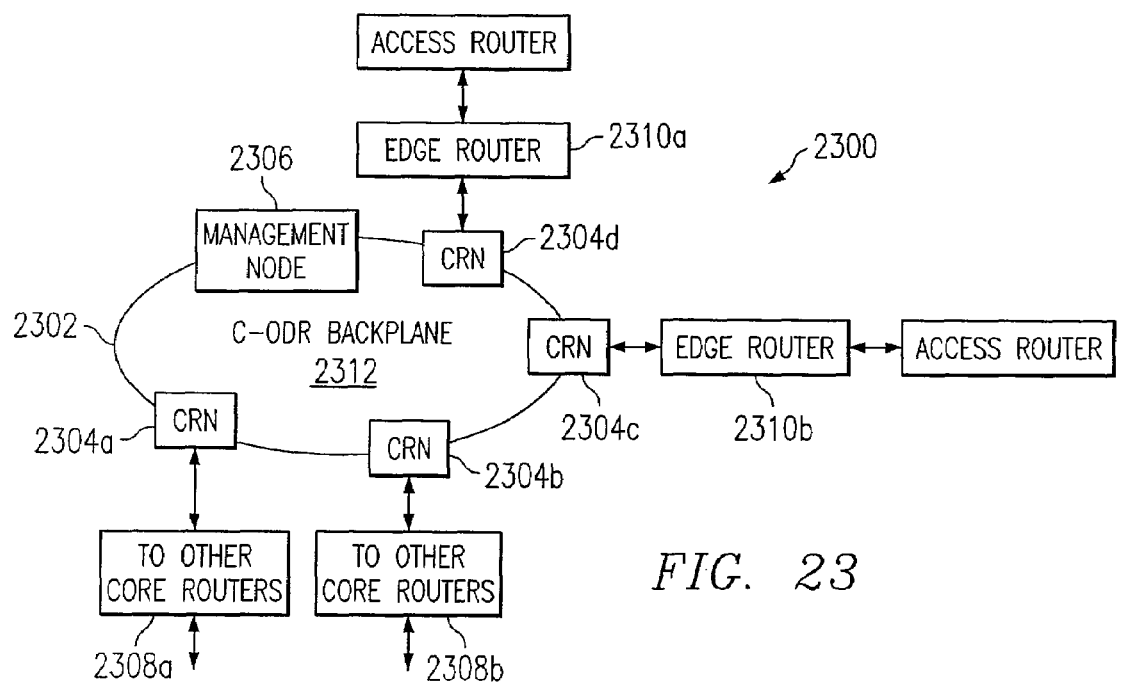
FIG. 23 is a block diagram of one example of an optical switching element.

FIG. 23 is a block diagram of one example of an optical switching element 2300. In various embodiments, the structure and function of optical switching element 2300 can be substantially similar to the structure and function of switching element 1708 of FIG. 17. In some embodiments, switching element may be capable of an aggregate capacity of, for example, 100 Tb/s or more. In this example, switching element 2300 includes a backplane 2302 capable of communicating optical signal 2312 within switching element 2300.

Backplane 2302 can comprise one or more optical fibers, such as, for example, standard single mode fiber (SMF), dispersion-shifted fiber (DSF), non-zero dispersion-shifted fiber (NZDSF), dispersion compensating fiber (DCF), or another fiber type or combination of fiber types.

In this particular embodiment, optical signal 2312 implements a frame format that comprises one or more framing bits, a first packet label that precedes packet data, and a second packet label that follows the packet data. In various embodiments, the structure and function of optical signal 2312 can be substantially similar to optical signal 1703, optical signal 1715, wavelength channel 1705, or wavelength channel 1713 of FIG. 17. In other embodiments, optical signal 2312 can implement a time guard band that separates optical signal 2312 from a later received optical signal.

Switching element 2300 also includes core router nodes 2304a-2304d capable of processing packets of data associated with optical signal 2312 and communicating those packets to a desired destination. Although this example includes four (4) core router nodes, any number of core router nodes may be used without departing from the scope of the present disclosure. Core router nodes 2304a-2304d may comprise any optical and/or electrical component—including any hardware, software, and/or firmware—capable of processing, replicating, storing, converting, routing, and/or error checking one or more packet data associated with optical signal 2312.

In some embodiments, core router nodes 2304a-2304d may be capable of routing and/or receiving one or more packets to and/or from other core router nodes 2308. In other embodiments, core router nodes 2304a-2304d may be capable of routing and/or receiving one or more packets to and/or from one or more edge routers 2310. In various embodiments, core router nodes 2304a-2304d may be capable of processing optical signal 2312 at a processing speed of, for example, at least 10 Gb/s, at least 40 Gb/s, at least 100 Gb/s, or at least 160 Gb/s.

Switching element 2300 further includes management node 2306 capable of initializing switching element 2300 at start-up and of performing clean-up of unwanted packets. Management node 2306 may comprise any optical and/or electrical component—including any hardware, software, and/or firmware—capable of processing, replicating, storing, converting, routing, and/or managing one or more packets associated with optical signal 2312.

In some embodiments, management node 2306 may be capable of dropping and/or removing a packet comprising an illegal or inoperative packet label. In other embodiments, management node 2306 can operate to minimize the recirculation of optical signal 2312 through backplane 2302 by removing and/or dropping a packet that has circulated backplane 2302 more than one time. In various embodiments, management node 2306 may be capable of processing optical signal 2312 at a processing speed of, for example, at least 10 Gb/s, at least 40 Gb/s, at least 100 Gb/s, or at least 160 Gb/s.

In various embodiments, core router nodes 2304a-2304d and/or management node 2306 can comprise one or more semiconductor optical amplifiers (SOA). Implementing SOA components within core router nodes 2304a-2304d advantageously enables at least portions of core router nodes 2304a-2304d to be amenable to semiconductor chip level integration. In some cases, the implementation of one or more SOA's can allow packets associated with optical signal 2312 to be substantially transparent to the processing functions of core router nodes 2304a-2304d and/or management node 2306. In addition, core router nodes 2304a-2304d and/or management node 2306 can operate to maintain the packets associated with optical signal 2312 in the optical plane. In other cases, core router nodes 2304a-2304d and/or management node 2306 can examine the contents of one or more packet labels and/or other elements of a frame format associated with wavelength channels 105. In those cases, one or more of the packet labels and/or other elements of a frame format associated with optical signal 2312 can be subjected to one or more optical-to-electrical and/or electrical-to-optical conversions.

In this particular embodiment, switching element 2300 comprises a ring network architecture where each wavelength associated with optical signal 2312 has its own virtual ring. Although this example implements a ring network architecture, any other network architecture, such as a star or mesh architecture, can be implemented without departing from the scope of the present disclosure. Implementing a ring network architecture within switching element 2300 can result in a minimization and/or avoidance of contention within backplane 2302. In some cases, minimizing and/or avoiding contention can reduce the need for buffering within switching element 2300. Minimizing and/or avoiding contention can result in a reduction in the congestion associated with an optical signal wavelength. In addition, the inherent symmetry of the ring network can operate to form a natural basis for fairness guarantee mechanisms. Moreover, at relatively higher transmission rates, the ring network architecture allows for the synchronous transmission of packet data having relatively simple protocol.

In operation, the ring network architecture associated with backplane 2302 can enable core router nodes 2304a-2304d and/or management node 2306 to implement relatively simple routing protocols. For example, in the "off-ramp," core router nodes 2304 can check to see if the local address matches the incoming packet label associated with optical signal 2312, in which case the frame is down-loaded. In addition, for bandwidth-on-availability users, an empty slot algorithm can be employed. In such a case, a bandwidth-on-demand user waits for one of core router nodes 2304 to receive an empty packet data, in which case the empty packet data is replaced by a waiting packet data contained within a frame format. In various embodiments, if empty packets are required within switching element 2300, then management node 2306 can operate to insert empty packets into backplane 2302. In an alternative embodiment, switching element 2300 can implement a Quality of Service (QoS) routing protocol in which case higher QoS traffic can be placed on wavelengths that have a lighter loading.

Figure 24:
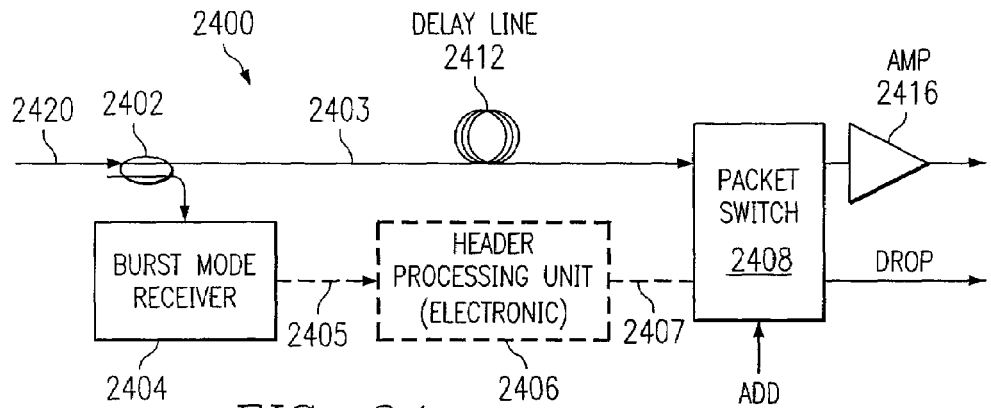
FIG. 24 is a block diagram of one embodiment of an electro-optic core router node.

FIG. 24 is a block diagram of one embodiment of an electro-optic core router node 2400. In this example, core router node 2400 includes an optical tap 2402 capable of de-coupling at least a fraction of an optical signal 2420 from an optical fiber 2403. The structure and function of optical tap 2402 can be substantially similar to the structure and function of optical tap 1802 of FIG. 18. In various embodiments, the structure and function of optical signal 2420 can be substantially similar to wavelength channel 1705 of FIG. 17. In this particular embodiment, optical signal 2420 implements a frame format that comprises one or more framing bits, a first packet label that precedes packet data, and a second packet label that follows the packet data.

Node 2400 also includes a receiver 2404 capable of receiving at least a portion of optical signal 2420 de-coupled from optical fiber 2403. Receiver 2404 can comprise any optical and/or electrical component—including any hardware, software, and/or firmware—capable of identifying and capturing a packet label associated with optical signal 2420. In this example, receiver 2404 converts the received portion of optical signal 2420 to an electronic signal 2405 representing the packet label and communicates electronic signal 2405 to a controller 2406. Controller 2406 can comprise any device capable of comparing electronic signal 2405 to a local address associated with node 2400. In various embodiments, controller 2406 may be capable of processing electronic signal 2405 at a processing speed of, for example, at least 10 Gb/s or at least 40 Gb/s.

In this particular embodiment, controller 2406 communicates a control signal 2407 to a packet switch 2408. Packet switch 2408 may comprise any optical and/or electrical component—including any hardware, software, and/or firmware—capable of processing, dropping, and/or adding one or more packet data from node 2400. In various embodiments, packet switch 2408 can comprise one or more semiconductor optical amplifiers (SOA) capable of functioning as an optical switch. In other embodiments, a plurality of packet switches can be formed on a single semiconductor substrate. In some cases, optical signal 2420 may comprise a time guard band capable of allowing packet switch 2408 time to process and switch optical signal 2420 before processing a subsequently received optical signal.

In this example, packet switch 2408 receives optical signal 2420 from a delay line 2412. Delay line 2412 may comprise, for example, a sufficient length of optical fiber capable of compensating for any processing latency associated with receiver 2404 and/or controller 2406. In some cases, delay line 2412 may operate as a first-in-first-out (FIFO) buffer having an appropriate length.

In this example, controller 2406 through control signal 2407 operates to control the state of packet switch 2408. For example, if the packet label associated with electronic signal 2405 matches the local address stored within controller 2406, then controller 2406 operates to cause packet switch 2408 to drop optical signal 2420 and add an empty packet. In addition, if the packet label associated with electronic signal 2405 is empty or comprises all '1' label and a new optical signal is waiting to be added at node 2400, then controller 2406 operates to cause packet switch 2408 to add the new optical signal. Moreover, if the packet label associated with electronic signal 2405 does not match the local address and/or is not empty, then controller 2406 operates to cause packet switch 2408 to pass optical signal 2420.

In this particular embodiment, node 2400 may further include an optical amplifier 2416 capable of at least partially compensating for any losses associated with optical signal 2420. In the illustrated embodiment, optical amplifier 2416 resides at the egress end of node 2400. Optical amplifier 2416 could also or alternatively reside at the ingress end of node 2400. Optical amplifier 2416 may comprise, for example, a Raman amplifier, a rare-earth doped amplifier, a semiconductor optical amplifier, or a combination of these or other amplifier types.

Figure 25:
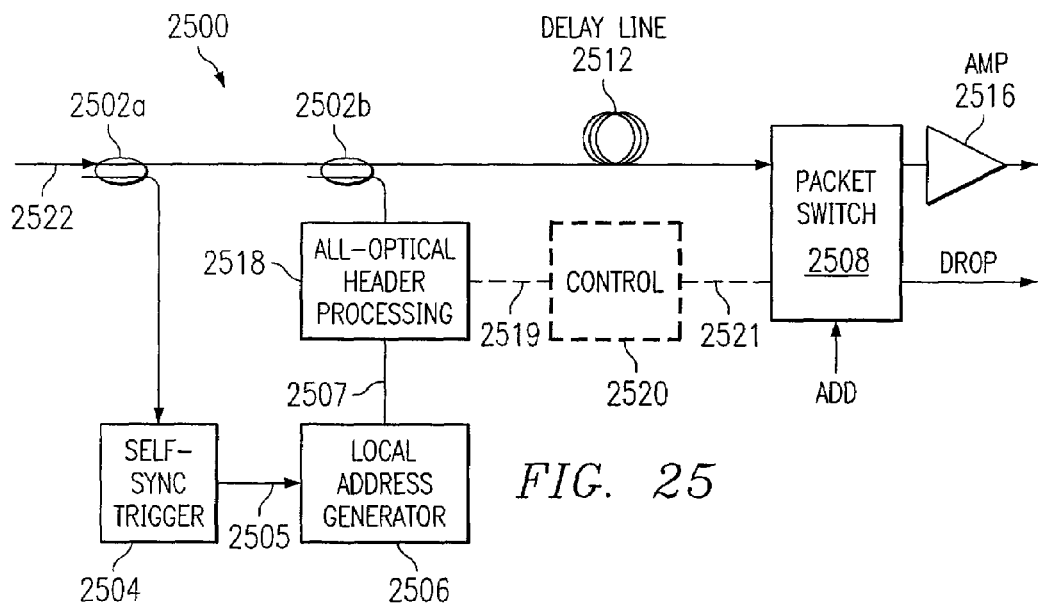
FIG. 25 is a block diagram of one embodiment of an all-optical core router node.

FIG. 25 is a block diagram of one embodiment of a core router node 2500. In this example, core router node 2500 includes optical taps 2502a and 2502n capable of de-coupling or removing at least a fraction of an optical signal 2522 from an optical fiber 2503. The structure and function of optical taps 2502a and 2502n can be substantially similar to the structure and function of optical tap 1802 of FIG. 18. Although this example implements two optical taps 2502a and 2502n, any number of optical taps can be used without departing from the scope of the present disclosure. In various embodiments, the structure and function of optical signal 2522 can be substantially similar to wavelength channel 1705 of FIG. 17. In this particular embodiment, optical signal 2522 implements a frame format that comprises one or more framing bits, a first packet label that precedes packet data, a second packet label that follows the packet data, and a time guard band that separates optical signal 2522 from a later received optical signal.

Node 2500 also includes a self-sync module 2504 capable of receiving at least a portion of optical signal 2522 de-coupled from optical fiber 2503. The structure and function of self-sync module 2504 can be substantially similar to the structure and function of self-sync module 1806 or module 1900 of FIGS. 18 and 19, respectively. In various embodiments, self-sync module 2504 can comprise one or more semiconductor optical amplifiers (SOA) capable of functioning as a fast-saturated slow recovery gain medium and/or an intensity discriminator. Implementing SOA components within self-sync module 2504 advantageously enables at least portions of self-sync module 2504 to be amenable to semiconductor chip level integration.

In this particular embodiment, self-sync module 2504 synchronizes the first bit associated with a packet label of optical signal 2522 and communicates a synchronized signal 2505 to a local address generator 2506. Generator 2506 may comprise any optical and/or electrical component—including any hardware, software, and/or firmware—capable of processing, replicating, storing and/or creating an empty header packet label and a local address packet label. In this example, generator 2506 operates to replicate synchronized signal 2505, one for each bit in the packet label associated with optical signal 2522. For example, if the packet label comprises six bits, then generator 2506 replicates synchronized signal 2505 six times. In various embodiments, generator can comprise a replication module that is substantially similar in structure and function to replication module 2004 of FIG. 20.

In this example, generator 2506 also operates to convert the replicated bits into an empty header packet label comprising an all '1' label and to communicate a generator signal 2507 to all-optical header processor 2518. Generator signal 2507 can comprises an empty header packet label and a local address packet label capable of being used by processor 2518. Processor 2518 can comprise, for example, any optical and/or electrical components, including any hardware, software, or firmware, capable of comparing generator signal 2507 to a packet label associated with optical signal 2522. In various embodiments, processor 2518 can comprise one or more SOAs capable of functioning as an optical logic gate.

Node 2500 may also include a controller 2520 capable of receiving a processor signal 2519 and generating a control signal 2521 capable of controlling the state of a packet switch 2508. In various embodiments, processor 2518 and controller 2520 may be capable of processing generator signal 2507 at a processing speed of, for example, at least 10 Gb/s, at least 40 Gb/s, at least 100 Gb/s, or at least 160 Gb/s. In this particular embodiment, controller 2520 communicates a control signal 2521 to packet switch 2508. In various embodiments, the structure and function of packet switch 2508 can be substantially similar to the structure and function of packet switch 2408 of FIG. 24. In some cases, optical signal 2522 may comprise a time guard band capable of allowing packet switch 2508 time to process and switch optical signal 2522 before processing a subsequently received optical signal.

In this example, packet switch 2508 receives optical signal 2522 from a delay line 2512. Delay line 2512 may comprise, for example, a sufficient length of optical fiber capable of compensating for any processing latency associated with module 2504, generator 2506, processor 2518, and/or controller 2520. In some cases, delay line 2512 may operate as a first-in-first-out (FIFO) buffer having an appropriate length.

In this example, processor 2518 through controller 2520 operates to control the state of packet switch 2508. For example, if the packet label associated with optical signal 2522 matches the local address communicated by signal 2507, then processor 2518 operates to cause packet switch 2508 to drop optical signal 2522 and add an empty packet. In addition, if the packet label associated with optical signal 2522 is empty or comprises all '1' label and a new optical signal is waiting to be added at node 2500, then processor 2518 operates to cause packet switch 2508 to add the new optical signal. Moreover, if the packet label associated with optical signal 2522 does not match the local address and/or is not empty, then processor 2518 operates to cause packet switch 2508 to pass optical signal 2522.

In this particular embodiment, node 2500 may further includes an optical amplifier 2516 capable of at least partially compensate for any losses associated with optical signal 2522. In the illustrated embodiment, optical amplifier 2516 resides at the egress end of node 2500. Optical amplifier 2516 could also or alternatively reside at the ingress end of node 2500. Optical amplifier 916 may comprise, for example, a Raman amplifier, a rare-earth doped amplifier, a semiconductor optical amplifier, or a combination of these or other amplifier types.

Figure 26:
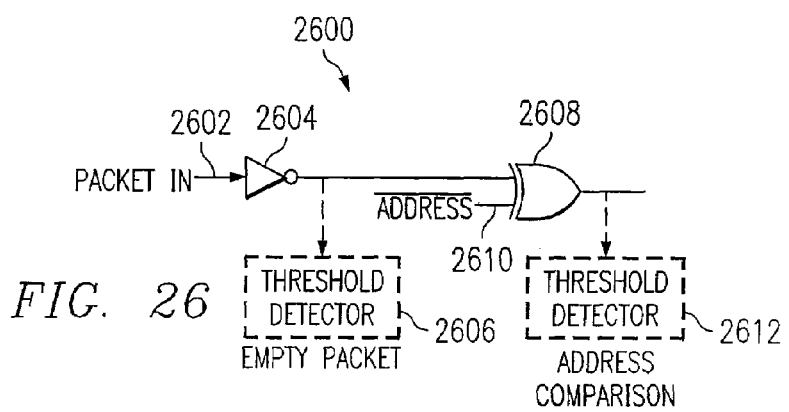
FIG. 26 is a block diagram of one embodiment of an all-optical header processing device.

FIG. 26 is a block diagram of one embodiment of an all-optical header processing device 2600. In various embodiments, the structure and function of header processing device 2600 can be substantially similar to the structure and function of processor 2518 of FIG. 25. In this example, header processing device 2600 includes an inverter 2604 capable of inverting a packet label associated with an optical signal 2602. The structure and function of optical signal 2602 can be substantially similar to the structure and function of optical signal 2522 of FIG. 25. In this particular embodiment, optical signal 2602 implements a frame format that comprises at least one packet label.

Header processing device 2600 also includes an all-optical XOR gate 2608 capable of comparing the inverted packet label associated with optical signal 2602 to a generator signal 2610. In various embodiments, the structure and function of XOR gate 2608 can be substantially similar to the structure and function of XOR gate 2200 of FIG. 22A or XOR gate 2014 of FIG. 20. The structure and function of generator signal 2610 can be substantially similar to the structure and function of generator signal 2507 of FIG. 25. In this particular embodiment, generator signal 2610 comprises a local address packet label and an empty header label.

In operation, inverter 2604 and XOR gate 2608 implement threshold detection schemes capable of determining if an output level associated with the inverted packet label falls below a threshold level. In this example, if the inverted packet label comprises an empty header packet label, then a first threshold detector 2606 operates to output an empty packet label. Otherwise, XOR gate 2608 operates to compare the inverted packet label associated with optical signal 2602 to a local address associated with a core router node. If the inverted packet label associated with optical signal 2602 matches the local address packet label, then XOR gate 2608 outputs an all zero packet label and a second threshold detector 2612 generates a control signal. In that example, the control signal is capable of being used by a packet switch to add and/or drop an associated optical signal.

Figure 27:
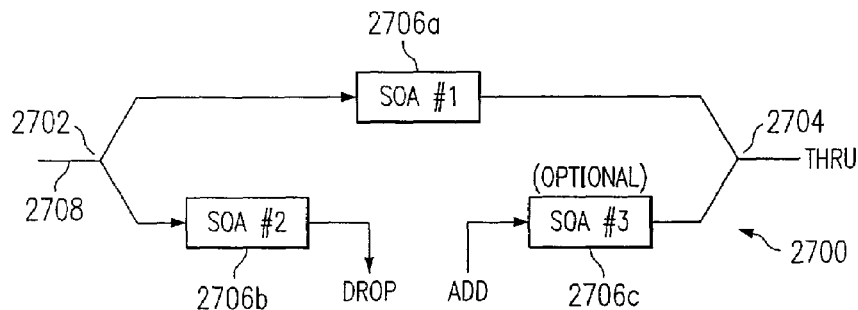
FIG. 27 is a block diagram of one embodiment of a packet switch.

FIG. 27 is a block diagram of one embodiment of a packet switch 2700. In various embodiments, the structure and function of packet switch 2700 can be substantially similar to the structure and function of packet switch 2508 of FIG. 25. In this example, packet switch 2700 includes a divider 2702 and a combiner 2704 capable of separating, dividing, combining, coupling, and/or routing an optical signal 2708. In one non-limiting example, divider 2702 may comprise a 50/50 power divider and combiner 2704 may comprise a 50/50 power combiner.

In various embodiments, the structure and function of optical signal 2708 can be substantially similar to wavelength channel 1705 of FIG. 17. In this particular embodiment, optical signal 2708 comprises a guard band that separates optical signal 2708 from a later received optical signal. In some cases, the guard band can comprise, for example, at least 0.5 nano-seconds or at least one (1) nano-second.

Packet switch 2700 also includes at least a first SOA 2706a, a second SOA 2706b, and a third SOA 2706c. As one non-limiting example, SOA's 2706 can comprise an InGaAsP semiconductor optical amplifier. In this example, SOA's 2706 operate in either gain or absorption enabling on/off functionality in each arm of packet switch 2700. Implementing SOA components within packet switch 2700 advantageously enables packet switch 2700 to be amenable to semiconductor chip level integration. In one particular embodiment, a plurality of packet switches can be formed on a single semiconductor chip using standard semiconductor processing techniques. In those cases, the semiconductor substrate may comprise, for example, silicon, poly-silicon, indium phosphide, gallium arsenide, or any other suitable substrate material or combination of substrate materials.

In this example, packet switch 2700 operates to control the state and functionality of SOA's 2706. For example, if optical signal 2708 is to pass through packet switch 2700, then SOA 2706a is turned on and SOA 2706b is turned off. In addition, if optical signal 2708 is to be removed or dropped from packet switch 2700, then SOA 2706a is turned off and SOA 2706b is turned on. Moreover, if a new optical signal is to be added to packet switch 2700, then SOA 2706c is turned on and SOA 2706a is turned off. Implementing a guard band between optical signal 2708 and a later received optical signal advantageously allows packet switch 2708 to accommodate the switching time associated with each of SOAs 2706. In other embodiments, SOAs 2706 can comprise a polarization dependent loss of, for example, no more than three (3) dB, two (2) dB, or one-half (0.5) dB.

Figure 28:
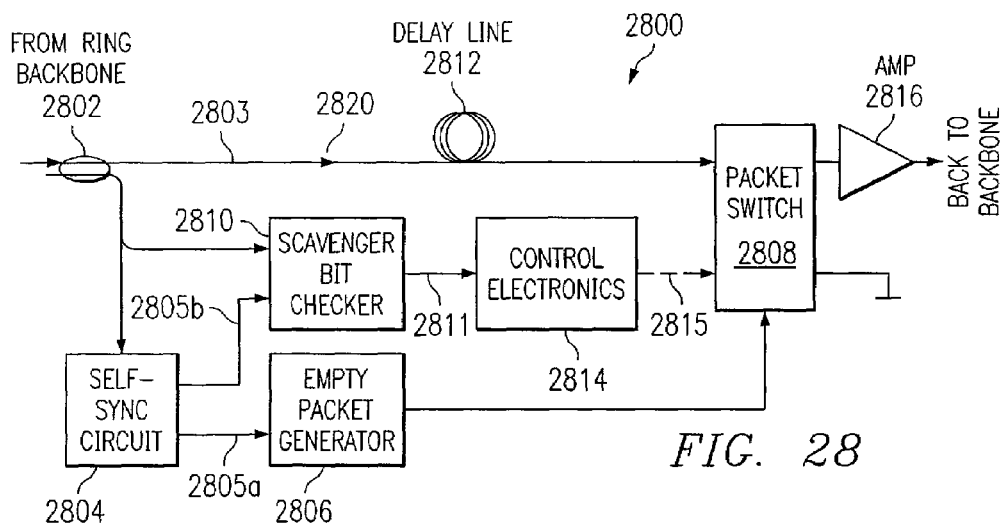
FIG. 28 is a block diagram of one embodiment of a management node.

FIG. 28 is a block diagram of one embodiment of a management node 2800. In some embodiments, management node 2800 operates to initialize a switching element at start-up and to perform clean-up of unwanted packets. In this example, management node 2800 includes an optical tap 2802 capable of de-coupling at least a fraction of an optical signal 2820 from an optical fiber 2803. The structure and function of optical tap 2802 can be substantially similar to the structure and function of optical tap 1802 of FIG. 18. In various embodiments, the structure and function of optical signal 2820 can be substantially similar to wavelength channel 1705 of FIG. 17. In this particular embodiment, optical signal 2820 implements a frame format that comprises one or more framing bits, a first packet label that precedes packet data, a second packet label that follows the packet data, and a time guard band that separates optical signal 2820 from a later received optical signal.

Node 2800 also includes a self-sync module 2804 capable of receiving at least a portion of optical signal 2820 de-coupled from optical fiber 2803. The structure and function of self-sync module 2804 can be substantially similar to the structure and function of self-sync module 1806 or module 1900 of FIGS. 18 and 19, respectively. In various embodiments, self-sync module 2804 can comprise one or more semiconductor optical amplifiers (SOA) capable of functioning as a fast-saturated slow recovery gain medium and/or an intensity discriminator. Implementing SOA components within self-sync module 2804 advantageously enables at least portions of self-sync module 2804 to be amenable to semiconductor chip level integration.

In this particular embodiment, self-sync module 2804 synchronizes the first bit associated with a packet label of optical signal 2820 and communicates a synchronized signal 2805a to an empty packet generator 2806. Generator 2806 may comprise any optical and/or electrical component—including any hardware, software, and/or firmware—capable of processing, replicating, and/or creating an empty header packet label. In this example, generator 2806 operates to replicate synchronized signal 2805, once for each bit in the packet label associated with optical signal 2820. In various embodiments, generator 2806 can comprise a replication module that is substantially similar in structure and function to replication module 2004 of FIG. 20.

In this example, generator 2806 also operates to convert the replicated bits into an empty header packet label comprising an all '1' label and to communicate a generator signal 2807 to a packet switch 2808. In various embodiments, the structure and function of packet switch 2808 can be substantially similar to the structure and function of packet switch 2508 of FIG. 25. In some cases, optical signal 2820 may comprise a time guard band capable of allowing packet switch 2808 time to process and switch optical signal 2820 before processing a subsequently received optical signal.

Self-sync module 2804 also operates to communicate a synchronized signal 2805b to a scavenger bit module 2810. Scavenger bit module 2810 may comprise any optical and/or electrical component—including any hardware, software, and/or firmware—capable of processing, comparing, and/or updating a monitor bit associated with optical signal 2820. In this particular embodiment, module 2810 communicates a scavenger bit signal 2811 to a controller 2814. Controller 2814 can comprise any optical and/or electrical components, including any hardware, software, or firmware, capable of controlling the state of packet switch 2808. In this particular embodiment, controller communicates a control signal 2815 to packet switch 2808. In various embodiments, module 2810 and controller 2814 may be capable of processing optical signal 2820 at a processing speed of, for example, at least 10 Gb/s, at least 40 Gb/s, at least 100 Gb/s, or at least 160 Gb/s.

In this example, packet switch 2808 receives optical signal 2820 from a delay line 2812. Delay line 2812 may comprise, for example, a sufficient length of optical fiber capable of compensating for any processing latency associated with node 2800. In some cases, delay line 2812 may operate as a first-in-first-out (FIFO) buffer having an appropriate length.

In this example, module 2810 and controller 2814 operate to control the state of packet switch 2808. For example, if management node 2800 receives a packet label with an illegal destination address or a packet label whose destination address is inoperative, then packet switch 2808 operates to drop the inoperative or illegal signal. In addition, if management node 2800 detects that an optical signal has traversed node 2800 more than once, then node 2800 assumes the intended destination is not on-line and drops the optical signal. Management node 2800 minimizes recirculation of optical signals by setting the monitor bit associated with the optical signal to '1' the first time the optical signal traverses node 2800. If management node 2800 receives a monitor bit comprising a '1', then it assumes that the destination address is not on-line. Implementing a minimization scheme can minimize congestion within an optical switching element.

In this particular embodiment, node 2800 may further include an optical amplifier 2816 capable of at least partially compensating for any losses associated with optical signal 2820. In the illustrated embodiment, optical amplifier 2816 resides at the egress end of node 2800. Optical amplifier 2816 could also or alternatively reside at the ingress end of node 2800. Optical amplifier 2816 may comprise, for example, a Raman amplifier, a rare-earth doped amplifier, a semiconductor optical amplifier, or a combination of these or other amplifier types.

Figure 29:
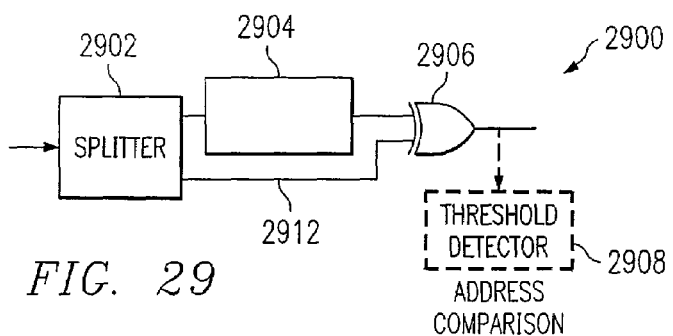
FIG. 29 is a block diagram of one embodiment of an all-optical error check device.

FIG. 29 is a block diagram of one embodiment of an all-optical error check device 2900. In various embodiments, error check device 2900 can be accessible to core router node 2400 of FIG. 24, core router node 2500 of FIG. 25, maintenance node 2800 of FIG. 28, or to any other optical device. In one particular embodiment, error check device 2900 can be accessible to edge router 2310 of FIG. 23. In this example, error check device 2900 includes an optical splitter 2902 capable of separating a first packet label from an optical signal 2910 received by splitter 2902. In various embodiments, the structure and function of optical signal 2910 can be substantially similar to the structure and function of optical signal 1703 or wavelength channel 1705 of FIG. 17. In this particular embodiment, optical signal 2910 implements a frame format that comprises a first packet label that precedes packet data and a second packet label that follows the packet data. Splitter 2902 can comprise any optical or electrical components capable of identifying, de-coupling, and/or capturing at least a fraction of a first packet label associated with optical signal 2910.

Error check device 2900 also includes a delay device 2904 capable of sufficiently delaying optical signal 2910 to allow an all-optical XOR gate 2906 to compare the first packet label and the second packet label associated with optical signal 2910. As a non-limiting example, delay device 2904 can comprise a sufficient length of optical fiber. In various embodiments, the structure and function of XOR gate 2906 can be substantially similar to the structure and function of XOR gate 2200 of FIG. 22A or XOR gate 2014 of FIG. 20. In this particular embodiment, XOR gate 2906 comprises an SOA-MZI.

In operation, XOR gate 2906 implements threshold detection scheme capable of determining if an output level associated with optical signal 2910 falls below a threshold level. For example, if the first packet label and the second packet label match, then an all '0' output is achieved and optical signal 2910 proceeds to its destination address. However, if the first packet label and the second packet label do not match, then threshold detector 2908 generates a warning signal that the data may be corrupted.

Figure 30:
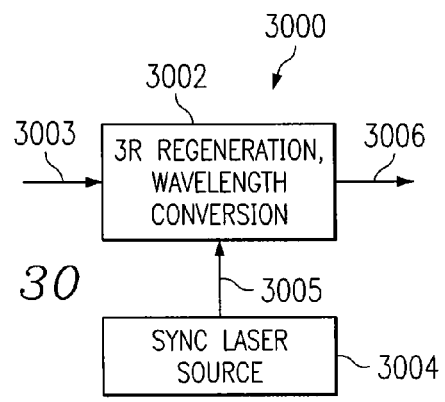
FIG. 30 is a block diagram of one embodiment of an output interface.

FIG. 30 is a block diagram of one embodiment of an output interface 3000. In various embodiments, output interface 3000 may be capable of preparing an optical signal 3003 for communication over a communication link 3006 and/or to minimize contention within communication link 3006. Although this example illustrates communication link 3006 as being directly coupled to output interface 3000, communication link 3006 can be indirectly coupled to output interface 3000 without departing from the scope of the present disclosure. The structure and function of communication link 3006 can be substantially similar to the structure and function of communication link 1702 or communication link 1716 of FIG. 17. In various embodiments, the structure and function of optical signal 3003 can be substantially similar to the structure and function of optical signal 1703, optical signal 1715, optical signal 1715, wavelength channel 1705, or wavelength channel 1713 of FIG. 17.

In this example, output interface 3000 includes a regeneration module 3002 capable of 3R regeneration and/or wavelength conversion. In one non-limiting example, regeneration module 3002 can comprise, for example, an SOA-MZI capable of 3R regeneration and/or wavelength conversion. In various embodiments, the structure and function of regeneration module 3002 can be substantially similar to the structure and function of logic gates 2200, 2225, 2250, or 2275 of FIGS. 22A-22D. Implementing SOA components within regeneration module 3002 can, in some cases, allow regeneration module 3002 and/or output interface 3000 to be amenable to semiconductor chip level integration. In one particular embodiment, a plurality of regeneration modules 3002 and/or output interfaces 3000 can be formed on a common semiconductor chip using standard semiconductor processing techniques.

Output interface 3000 also includes a synchronized light source 3004 capable of generating a pulsed and/or modulated output signal 3005. Synchronized light source 3004 can comprise, for example, a tunable light source, a semiconductor laser, a laser diode, a cladding pump fiber laser, or any combination of these or any other light source. In various embodiments, output signal 3005 is capable of being synchronized to optical signal 3003 using a phase locked loop. The synchronized light source operates to provide a re-timing function. In some embodiments, output signal 3005 can comprise the same wavelength as optical signal 3003 or can comprise a different wavelength than data optical signal 3003. In some cases, implementing a different output signal 3005 wavelength can result in a wavelength shift and possibly minimize or avoid contention within a network or optical device coupled to output interface 3000.

Figure 31:
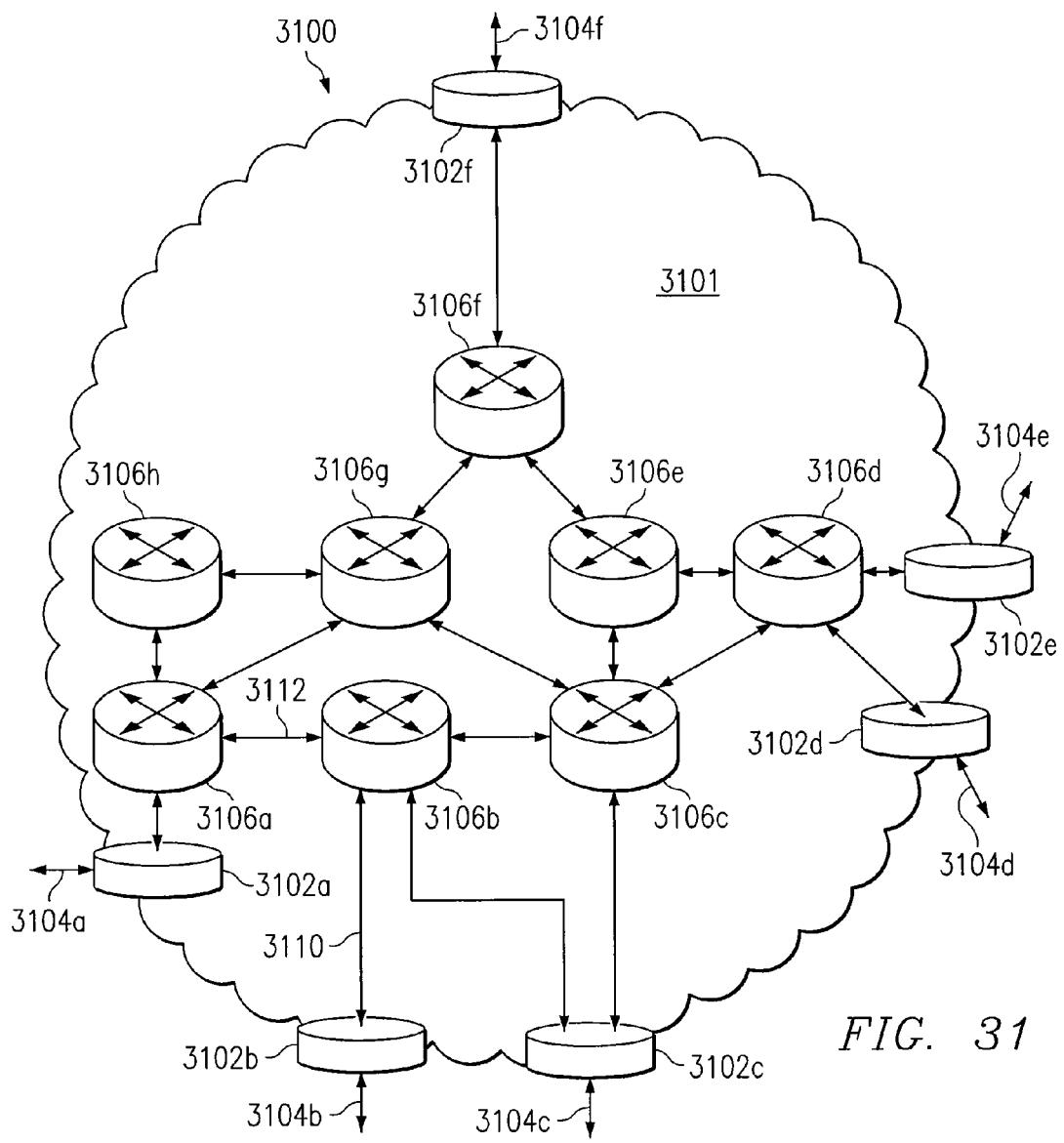
FIG. 31 is a block diagram of one embodiment of an optical communication network capable of implementing one or more core optical data routers.

FIG. 31 is a block diagram of an optical communication network 3100 capable of implementing one or more core optical data routers 3106. Network 3100 may comprise any wireless network, wireline network, or combination of wireless and wireline networks capable of supporting communication between network elements using ground-based and/or space-based components. For example, network 104 may comprise a data network, an optical network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. In various embodiments, network 3100 may be capable of an aggregate capacity of, for example, at least 5 Tb/s, at least 10 Tb/s, at least 25 Tb/s, at least 50 Tb/s, or at least 100 Tb/s. In other embodiments, network 3100 may be capable of transmitting packet data at transmission rates of, for example, at least 10 Gb/s, at least 40 Gb/s, at least 100 Gb/s, or at least 160 Gb/s.

In this example, communication network 3100 includes access nodes 3102a-3102f. Access nodes 3102 may comprise any optical and/or electrical components—including any hardware, software, and/or firmware—capable of receiving and/or converting any analog and/or digital signals in an electrical or optical format to an optical format for transmission through communication network 3100. In this particular embodiment, access nodes 3102 are capable of providing electronic and/or optical buffering until an optical signal 3110 is ready to be communicated through communication network 3100. In addition, access nodes 3102, in some cases, may be capable of placing packet data in a frame format and/or compressing the frame. When the packet is unloaded, access nodes 3102 can operate to decompress the frame, remove the packet data from the frame format and/or generate an error warning.

Access nodes 3102a-3102f, in some cases, may also examine header data of signals received from communication links 3104a-3104f to identify at least an initial signal path through all or part of communication network 3100. Accordingly, access nodes 3102a-3102h may attach a destination address to a packet and frame or encapsulate the data for transmission across communication network 3100. Access nodes receiving encapsulated packets at egress points from communication network 3100 can remove the framing that was attached at the ingress edge node and facilitate transmission of the signal toward a destination external network element. For example, where the signal received at an ingress access node was an electrical signal, an egress access node can convert the optical signal received from communication network 3100 to an electrical signal for transmission toward a destination external network element in an electrical format.

Communication links 3104a-3104f may comprise any communications medium capable of assisting in the communication of analog and/or digital signals. Communications links 3104 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information to and/or from network 3100.

In this particular example, at least a portion of communication network 3100 includes an optical data network 3101 comprising core optical data routers 3106a-3106h. In this example, optical data network 3101 comprises a transparent network in the sense that data network 3101 is not required to examine the contents and/or the format of the data in the packet. That is, the data portion of the packet can remain in an optical format from the ingress access node to the egress access node. In various embodiments, the structure and function of core optical data routers 3106 can be substantially similar to the structure and function of optical data router 1700 of FIG. 17. Although this example includes eight core optical data routers, any number of core optical data routers can be used without departing from the scope of the present disclosure. In this particular embodiment, core optical data router 3106a-3106h can implement one or more semiconductor optical amplifier (SOA) components. Implementing one or more SOA components within core optical data routers 3106 can, in some cases, allow at least a portion of these devices to be amenable to semiconductor chip level integration. In some embodiments, core optical data routers 3106 can implement one or more semiconductor optical amplifier Mach Zehnder Interferometer (SOA-MZI) based all-optical logic gates capable of 2R regeneration, 3R regeneration, and/or wavelength conversion.

In various embodiments, core optical data routers 3106a-3106h can operate to maintain the packet data associated with optical signals 3110 in the optical domain. That is, the packet data associated with optical signal 3110 is not subjected to an optical-to-electrical conversion within routers 3106a-3106h. In some cases, one or more of the packet labels and/or other elements of a frame format associated with optical signals 3110 can be subjected to one or more optical-to-electrical and/or electrical-to-optical conversions. In this particular embodiment, core optical data routers 3106a-3106h can also operate to minimize and/or avoid contention between packet data associated with one or more optical signals 3110 within optical network 3101. Minimizing and/or avoiding contention can result in a reduction in the congestion associated with an optical signal wavelength.

Optical signals 3110 may comprise a multiple wavelength optical signal. In one particular embodiment, optical signals 3110 can comprise at least 250 wavelength channels. In various embodiments, the structure and function of optical signals 3110 can be substantially similar to optical signal 1703 of FIG. 17. In other embodiments, optical signal 3110 can implement one or more data formats, such as, polarization shift keying (PLSK), pulse position modulation (PPM), Generalized Multi-Protocol Label Swapping (GMPLS), non-return to zero (NRZ), return to zero (RZ), differential phase shift key (DPSK), or a combination of these or other format types.

In this example, each core optical data router 3106 is coupled to another core optical data router through a communication link 3112. Communication link 3112 can comprise, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication links 3112 can operate to couple core optical data routers 3106 to an edge router 3104.

In operation, each of access nodes 3102a-3102f communicates with one or more external network elements via communication links 3104a-3104f, respectively. Ingress access nodes of optical data network 3101 receive electrical and/or optical signals from communication links 3104a-3104f, convert any electrical signals received to optical signals, determine destination addresses associated with the signals, frame the signals appending the destination addresses to the signals (if not already framed), and route the optical signals toward an egress access node of communication network 3100. Optical signals 3110 traversing optical data network 3101 pass through one or more core optical data routers 3106. Each core optical data router 3106 routes optical signals 3110 toward the egress access node using one or more SOA components capable of implementing all-optical processing.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical processing system comprising:
   an input interface comprising at least one or more light sources capable of generating a multiple wavelength optical signal;
   a switching element coupled to the input interface, the switching element operable to receive the multiple wavelength optical signal and to generate a switching element optical output signal, wherein the switching element comprises:
      an optical signal separator operable to separate the multiple wavelength optical signal into one or more optical signal wavelengths;
      a plurality of semiconductor devices located on a single semiconductor substrate, the plurality of semiconductor devices capable of performing an optical switching operation on at least one of the optical signal wavelengths;
      a controller operable to generate a control signal that affects the optical switching operation performed by one or more of the plurality of semiconductor devices; and
      a plurality of optical fibers forming at least a portion of a star configuration; and
   a plurality of output interfaces coupled to respective ones or more of the plurality of optical fibers, wherein the star configuration is capable of communicating the switching element optical output signal from the switching element to at least one of the plurality of output interfaces, and wherein at least one of the plurality of output interfaces comprises:
      a synchronized light source operable to generate a modulated light signal based at least in part on a portion of the switching element optical output signal, wherein the modulated light signal is at a different wavelength than the switching element optical output signal and wherein the synchronized light source operates to substantially avoid interference between the modulated light signal and another modulated light signal generated by another one of the plurality of output interfaces.

2. The optical processing system of claim 1, wherein the semiconductor device comprises a semiconductor optical amplifier operating in gain.

3. The optical processing system of claim 1, wherein the semiconductor device operates in absorption.

4. The optical processing system of claim 1, wherein the semiconductor device comprises a micro-mirror device.

5. The optical processing system of claim 1, wherein at least a portion of the semiconductor substrate is silicon, poly-silicon, indium phosphide, or gallium arsenide.

6. The optical processing system of claim 1, further comprising an optical amplifier coupled to the star configuration and capable of at least partially compensating for any losses associated with at least a portion of the switching element optical output signal.

7. The optical processing system of claim 1, wherein the switching element optical output signal is comprised at least in part of frames comprising one or more framing bits, a first packet label and a second packet label allowing for simple error checking at a destination.

8. The optical processing system of claim 7, wherein at least one or more of the frames comprise video data.

9. A method of processing optical signals comprising the steps of:
- generating a multiple wavelength signal at an input interface;
- separating the multiple wavelength signal into one or more optical signal wavelengths;
- switching optically at least one of the optical signal wavelengths using a switching element comprising a plurality of semiconductor devices located on a single semiconductor substrate and a plurality of optical fibers forming at least a portion of a star configuration;
- controlling the switching element using a control signal;
- communicating a switching element optical output signal from the switching element through the star configuration to a plurality of output interfaces coupled to the at least a portion of the star configuration; and
- generating, at a synchronized light source in at least one of the plurality of output interfaces, a modulated light signal based at least in part on a portion of the switching element optical output signal, wherein the modulated light signal is at a different wavelength than the switching element optical output signal and wherein the synchronized light source operates to substantially avoid interference between the modulated light signal and another modulated light signal generated by another one of the plurality of output interfaces.

10. The method of claim 9, wherein the semiconductor device operates in gain or loss.

11. The method of claim 9, wherein the semiconductor device comprises a micro-mirror device.

12. The method of claim 9, wherein at least a portion of the semiconductor substrate is silicon, poly-silicon, indium phosphide, or gallium arsenide.

13. The method of claim 9, further comprising an optical amplifier coupled to the star configuration and capable of at least partially compensating for any losses associated with at least a portion of the switching element optical output signal.

14. The method of claim 9, wherein the switching element optical output signal is comprised, at least in part, of frames comprising one or more framing bits, a first packet label, and a second packet label allowing for simple error checking at a destination, and wherein at least one or more of the frames comprise video data.

15. An optical processing system comprising:
- an input interface comprising at least one or more light sources capable of generating a multiple wavelength optical signal;
- a switching element coupled to the input interface, the switching element operable to receive the multiple wavelength optical signal and to generate a switching element optical output signal, wherein the switching element comprises:
  - an optical signal separator operable to separate the multiple wavelength optical signal into one or more optical signal wavelengths;
  - a plurality of semiconductor devices located on a single semiconductor substrate, the plurality of semiconductor devices capable of performing an optical switching operation on at least one of the optical signal wavelengths;
  - a controller operable to generate a control signal that affects the optical switching operation performed by one or more of the plurality of semiconductor devices; and
  - a plurality of optical fibers forming at least a portion of a star configuration; and
- a plurality of output interfaces coupled to respective ones or more of the plurality of optical fibers, wherein the star configuration is capable of communicating the switching element optical output signal from the switching element to at least one of the plurality of output interfaces, wherein the switching element optical output signal comprises, at least in part, frames comprising one or more framing bits, a first packet label, and a second packet label allowing for error checking at a destination; and
- wherein the at least one of the plurality of output interfaces comprises a synchronized light source operable to generate a modulated light signal based at least in part on a portion of the switching element optical output signal, wherein the modulated light signal is at a different wavelength than the switching element optical output signal, and wherein the synchronized light source operates to substantially avoid interference between the modulated light signal and another modulated light signal generated by another one of the plurality of output interfaces.

16. The optical processing system of claim 15, wherein at least one or more of the frames comprise video data.

17. The optical processing system of claim 15, wherein the semiconductor device operates in gain or loss.

18. The optical processing system of claim 15, wherein the semiconductor device comprises a micro-mirror device.

19. The optical processing system of claim 15, wherein at least a portion of the semiconductor substrate is silicon, poly-silicon, indium phosphide, or gallium arsenide.

20. The optical processing system of claim 15, further comprising an optical amplifier coupled to the at least a portion of the star configuration and capable of at least partially compensating for any losses associated with at least a portion of the switching element optical output signal.

* * * * *